(12) United States Patent
King et al.

(10) Patent No.: US 9,811,728 B2
(45) Date of Patent: *Nov. 7, 2017

(54) ADDING VALUE TO A RENDERED DOCUMENT

(71) Applicant: Google Inc., Mountain View, CA (US)

(72) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 13/966,236

(22) Filed: Aug. 13, 2013

(65) Prior Publication Data

US 2017/0140219 A1    May 18, 2017

Related U.S. Application Data

(63) Continuation of application No. 11/547,835, filed as application No. PCT/US2005/012510 on Apr. 12, 2005, and a continuation-in-part of application No. 11/004,637, filed on Dec. 3, 2004, now Pat. No. 7,707,039, and a continuation-in-part of application No. PCT/US2005/011533, filed on Apr. 1, 2005, and a continuation-in-part of application No. PCT/US2005/013586, filed on Apr. 6, 2005.

(Continued)

(51) Int. Cl.
*G06F 17/00* (2006.01)
*G06K 9/00* (2006.01)
*G06F 17/30* (2006.01)
*G06F 17/24* (2006.01)
*G06F 17/22* (2006.01)
*G06F 17/21* (2006.01)

(52) U.S. Cl.
CPC ......... *G06K 9/00483* (2013.01); *G06F 17/21* (2013.01); *G06F 17/2229* (2013.01); *G06F 17/24* (2013.01); *G06F 17/30* (2013.01); *G06F 17/30011* (2013.01); *G06F 17/30637* (2013.01); *G06F 17/30675* (2013.01); *G06F 17/30699* (2013.01)

(58) Field of Classification Search
CPC ......... G06F 17/30011; G06F 17/30637; G06F 17/30675; G06F 17/30699; G06F 17/24; G06F 17/30
See application file for complete search history.

(56) References Cited

U.S. PATENT DOCUMENTS 6,097,834 A * 8/2000 Krouse ................. G06Q 20/04
382/137
6,473,523 B1 * 10/2002 Newman .............. G06K 9/2054
348/333.12

(Continued)

*Primary Examiner* — Chau Nguyen
(74) *Attorney, Agent, or Firm* — Fish & Richardson P.C.

(57) ABSTRACT

A system for processing data captured from rendered documents is described. The system provides a way for authors and publishers to add value to printed documents using associated supplemental material. The system can use text scanned from a document and context to identify an electronic document that corresponds to the scanned document. A user can then access supplemental material associated with the digital document.

18 Claims, 30 Drawing Sheets

Related U.S. Application Data

(60) Provisional application No. 60/561,768, filed on Apr. 12, 2004, provisional application No. 60/563,520, filed on Apr. 19, 2004, provisional application No. 60/563,485, filed on Apr. 19, 2004, provisional application No. 60/564,688, filed on Apr. 23, 2004, provisional application No. 60/564,846, filed on Apr. 23, 2004, provisional application No. 60/566,667, filed on Apr. 30, 2004, provisional application No. 60/571,381, filed on May 14, 2004, provisional application No. 60/571,560, filed on May 14, 2004, provisional application No. 60/571,715, filed on May 17, 2004, provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,930, filed on Aug. 18, 2004, provisional application No. 60/602,898, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,098, filed on Aug. 23, 2004, provisional application No. 60/604,100, filed on Aug. 23, 2004, provisional application No. 60/604,102, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,486, filed on Dec. 6, 2004, provisional application No. 60/633,453, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

(56) References Cited

U.S. PATENT DOCUMENTS

| | | | | |
|---|---|---|---|---|
| 7,076,495 | B2* | 7/2006 | Dutta | G06F 17/30899 |
| 7,298,931 | B2* | 11/2007 | Kim | G06F 17/30247 |
| | | | | 340/5.52 |
| 7,643,705 | B1* | 1/2010 | Erol | G06F 17/30056 |
| | | | | 382/305 |
| 2001/0053252 | A1* | 12/2001 | Creque | G06F 17/30011 |
| | | | | 382/305 |
| 2002/0001393 | A1* | 1/2002 | Jones | G06Q 20/042 |
| | | | | 382/100 |
| 2002/0091671 | A1* | 7/2002 | Prokoph | G06F 17/30616 |
| 2002/0099552 | A1* | 7/2002 | Rubin | G09F 27/00 |
| | | | | 704/270 |
| 2002/0143875 | A1* | 10/2002 | Ratcliff, III | G06Q 10/10 |
| | | | | 709/205 |
| 2003/0004626 | A1* | 1/2003 | Lipowicz | G01M 17/00 |
| | | | | 701/36 |
| 2003/0190145 | A1* | 10/2003 | Copperman | G06F 17/30017 |
| | | | | 386/241 |
| 2004/0174434 | A1* | 9/2004 | Walker | G06F 17/30265 |
| | | | | 348/211.3 |
| 2004/0262051 | A1* | 12/2004 | Carro | G06F 3/044 |
| | | | | 178/18.05 |
| 2005/0036681 | A1* | 2/2005 | Lenoir | G06F 17/243 |
| | | | | 382/176 |
| 2005/0104976 | A1* | 5/2005 | Currans | G06F 17/30265 |
| | | | | 348/231.5 |
| 2005/0114521 | A1* | 5/2005 | Lee | G06F 17/241 |
| | | | | 709/228 |
| 2005/0154760 | A1* | 7/2005 | Bhakta | G06F 17/2229 |

* cited by examiner

| WORD PAIR: | NUMBER OF DOCUMENTS | CORRECT % | COMBINED NUMBER | COMBINED CORRECT % |
|---|---|---|---|---|
| Unpleasant expression | 629 | 0.4769% | 6 | 50% |
| Tearing up | 125,000 | 0.0024% | | |
| Those three | 604,000 | 0.0005% | 2 | 100 |
| Overbearing Susan | 2 | 100% | | |
| Annie behaved | 2 | 100% | 2 | 100 |
| Immediately scream | 543 | 0.5525% | | |
| Not meddle | 31,800 | 0.0094% | 4 | 50 |
| Abrupt manner | 5,400 | 0.0555% | | |
| The grandmother | 130,000 | 0.0023% | 2 | 100 |
| Rosewood, inlaid | 771 | 0.3891% | | |
| Total Average % | | 20.1573% | | 80% |

Fig.25.

ADDING VALUE TO A RENDERED DOCUMENT

CROSS-REFERENCE TO RELATED APPLICATIONS

This application is a continuation of U.S. patent application Ser. No. 11/547,835 filed on Oct. 26, 2007, which is a National Stage Entry of International Application No. PCT/US2005/012510 filed on Apr. 12, 2005. International Application No. PCT/US2005/012510 is a continuation-in-part of U.S. patent application Ser. No. 11/004,637 filed on Dec. 3, 2004, which is hereby incorporated by reference in its entirety.

International Application No. PCT/US2005/012510 is also a Continuation-In-Part of PCT Application No. PCT/US05/11533 filed on Apr. 1, 2005, entitled A METHOD AND SYSTEM FOR CHARACTER RECOGNITION.

International Application No. PCT/US2005/012510 is also a Continuation-In-Part of PCT Application No. PCT/US05/13586 filed on Apr. 6, 2005, entitled SCANNING APPARATUS AND RELATED TECHNIQUES.

This application is related to, and incorporates by reference in their entirety, the following U.S. patent applications: U.S. patent application Ser. No. 11/097,961, filed on Apr. 1, 2005, entitled METHODS AND SYSTEMS FOR INITIATING APPLICATION PROCESSES BY DATA CAPTURE FROM RENDERED DOCUMENTS, U.S. patent application Ser. No. 11/097,093, filed on Apr. 1, 2005, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed on Apr. 1, 2005, entitled CONTENT ACCESS WITH HANDHELD DOCUMENT DATA CAPTURE DEVICES, U.S. patent application Ser. No. 11/098,014, filed on Apr. 1, 2005, entitled SEARCH ENGINES AND SYSTEMS WITH HANDHELD DOCUMENT DATA CAPTURE DEVICES, U.S. patent application Ser. No. 11/097,103, filed on Apr. 1, 2005, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, filed on Apr. 1, 2005, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed on Apr. 1, 2005, entitled INFORMATION GATHERING SYSTEM AND METHOD, U.S. patent application Ser. No. 11/097,089, filed on Apr. 1, 2005, entitled DOCUMENT ENHANCEMENT SYSTEM AND METHOD, U.S. patent application Ser. No. 11/097,835, filed on Apr. 1, 2005, entitled PUBLISHING TECHNIQUES FOR ADDING VALUE TO A RENDERED DOCUMENT, U.S. patent application Ser. No. 11/098,016, filed on Apr. 1, 2005, entitled ARCHIVE OF TEXT CAPTURES FROM RENDERED DOCUMENTS, U.S. patent application Ser. No. 11/097,828, filed on Apr. 1, 2005, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed on Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed on Apr. 1, 2005, entitled ESTABLISHING AN INTERACTIVE ENVIRONMENT FOR RENDERED DOCUMENTS, U.S. patent application Ser. No. 11/098,042, filed on Apr. 1, 2005, entitled DATA CAPTURE FROM RENDERED DOCUMENTS USING HANDHELD DEVICE, and U.S. patent application Ser. No. 11/096,704, filed on Apr. 1, 2005, entitled CAPTURING TEXT FROM RENDERED DOCUMENTS USING SUPPLEMENTAL INFORMATION.

This application claims priority to, and incorporates by reference in their entirety, the following U.S. Provisional Patent Applications: Application No. 60/561,768 filed on Apr. 12, 2004, Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667 filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 flied on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005.

TECHNICAL FIELD

The described technology is directed to the field of document processing.

BACKGROUND

The concept of interactive paper leads to new models of publishing and using books, documents, and periodicals. Any printed or rendered document can have associated supplemental materials. These materials may be considered an interactive environment that can be accessed by a user of the described system. In recent years many books have been published with an accompanying CD-ROM or associated web page or website, but for the rendered document and the associated digital materials to be truly mutually beneficial, they need to be more closely coupled than has been possible in the past.

As an example, some books currently have an associated web site on which errata are listed after the book has been published. The process for the reader of discovering errata associated with the particular page he is currently reading, however, is usually inconvenient. It involves going to a computer, turning it on, starting a web browser, typing in the URL of the book's web site, selecting the errata page, and checking the notes to see what applies to the page in question. The user is hardly likely to do this for every page.

In light of these limitations of the prior art, a system which provides the ability to create for a rendered document a richly interactive electronic environment (whether CD-ROM-based, web-based, or otherwise), and to allow a reader of the rendered document to easily move back and forth between a location In the rendered document and associated materials would have particular utility.

BRIEF DESCRIPTION OF THE DRAWINGS

FIG. 25 depicts a table with groups of word pairs.

DETAILED DESCRIPTION

Overview

Figure 1:
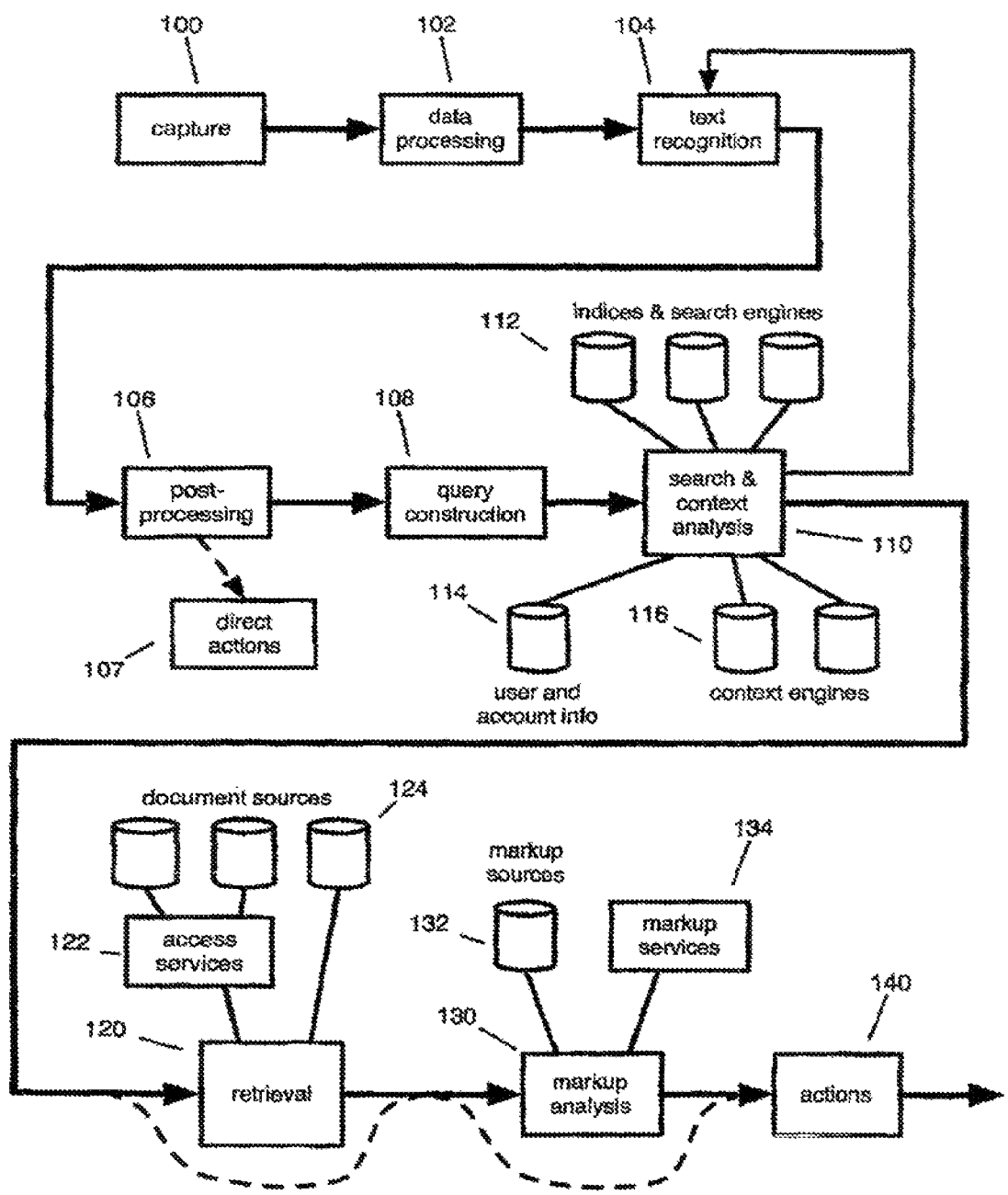
FIG. 1 is a data flow diagram that illustrates the flow of information in one embodiment of the core system.

In a world where a great deal of attention is being paid to the new capabilities of digital documents and electronic displays, printed documents continue to be popular and are produced in vast numbers. A system that provides a way for authors and publishers to add value to those printed documents by endowing them with an electronic life which is easily accessible to the reader ("the system") is described.

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
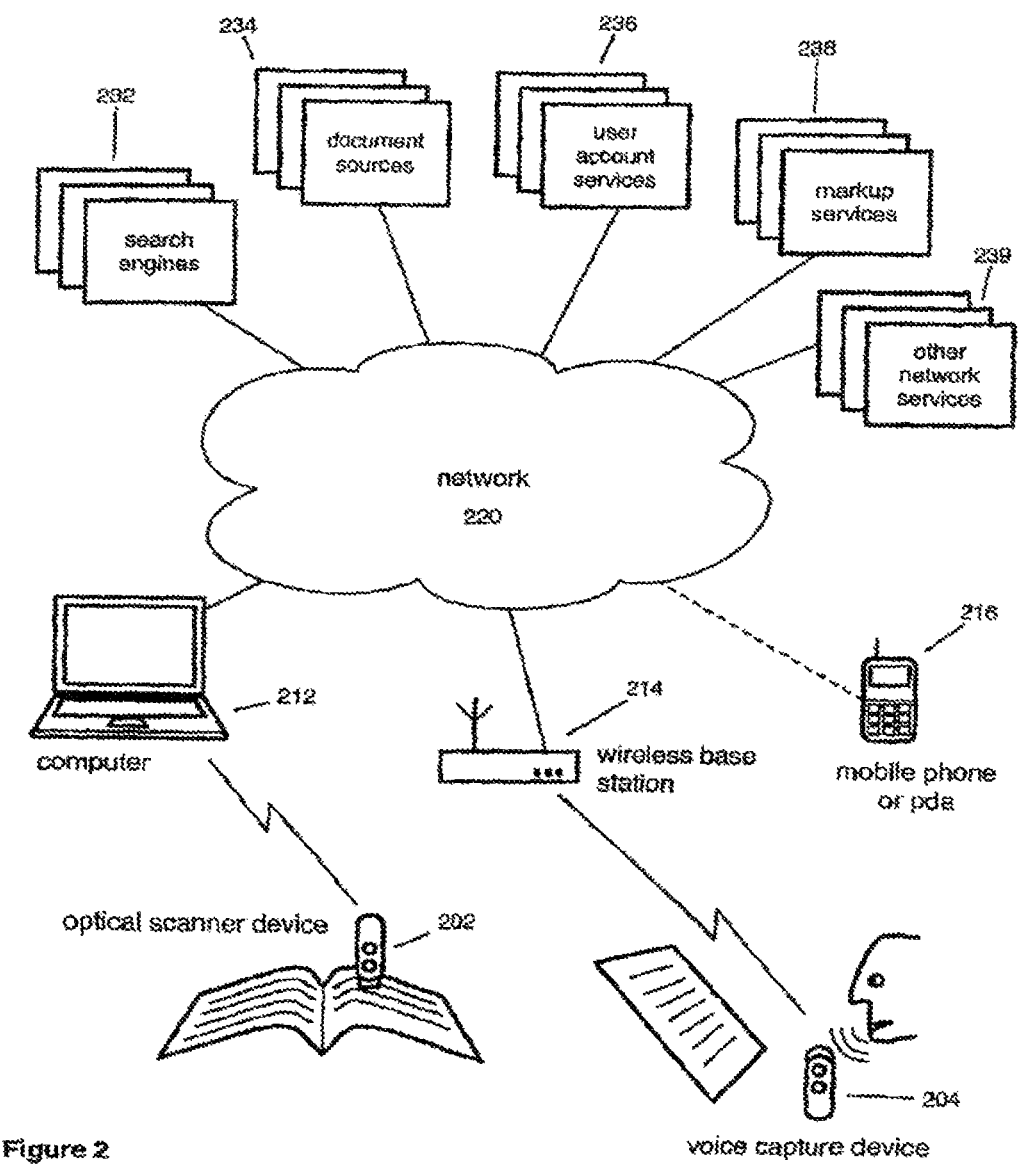
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc., from rendered documents. In addition to documents that have been printed on paper, in some embodiments, rendered documents include documents that have been displayed on a screen such as a CRT monitor or LCD display.

Figure 3:
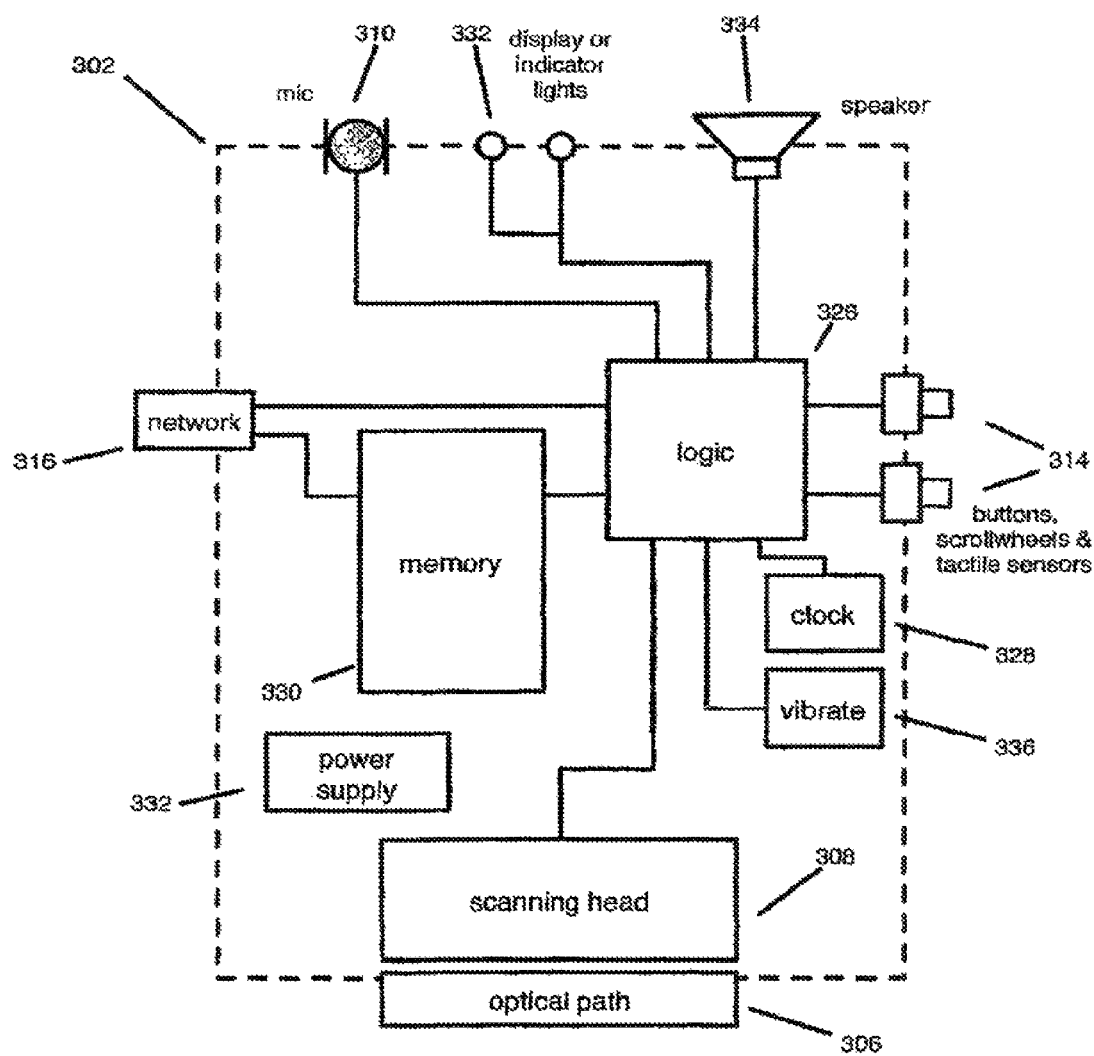
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors Etc.)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May be Recorded and Acted on Later

If there are likely to be delays or cost associated with communicating a query or receiving the results, this pre-loaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc.—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context."

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-in" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed" The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as Input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46."

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email in box.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically be much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching" and is similar to "convolution." To perform such self-recognition, the system slides a copy at the text horizontally over itself and notes matching regions of the text images. Prior template matching and convolution techniques encompass a variety of related techniques. These techniques to tokenize and/or recognize characters/tokens will be collectively referred to herein as "auto correlation," as the text is used to correlate with its own component parts when matching characters/tokens.

When auto correlating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents.

As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the as may provide a selection of these. An example might be that scanning the text "[print]" in any document would cause the as to retrieve and print a copy of that document. The OS may also provide a way to register such actions and associate them with particular scans.

11.3. Support in System GUI Components for Typical Scan-Initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

Saving the digital rendered version of every document printed along with information about the source from which it was printed Saving a subset of useful information about the printed version—for example, the fonts used and where the line breaks occur—which might aid future scan interpretation Saving the version of the source document associated with any printed copy Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:

feedback on the scanning process—user scanning too fast, at too great an angle, or drifting too high or low on a particular line sufficient content—enough has been scanned to be pretty certain of finding a match if one exists—important for disconnected operation context known—a source of the text has been located unique context known—one unique source of the text has been located availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user. the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

The details of the capture may be stored in the user's history. (Section 6.1)

The document may be retrieved from local storage or a remote location. (Section 8)

The operating system's metadata and other records associated with the document may be updated. (Section 11.1)

Markup associated with the document may be examined to determine the next relevant operations. (Section 5)

A software application may be started to edit, view or otherwise operate on the document. The choice of application may depend on the source document, or on the contents of the scan, or on some other aspect of the capture. (Section 11.2.2, 11.2.3)

The application may scroll to, highlight, move the insertion point to, or otherwise indicate the location of the capture. (Section 11.3)

The precise bounds of the captured text may be modified, for example to select whole words, sentences or paragraphs around the captured text. (Section 11.3.2)

The user may be given the option to copy the capture text to the clipboard or perform other standard operating system or application-specific operations upon it.

Annotations may be associated with the document or the captured text. These may come from immediate user input, or may have been captured earlier, for example in the case of voice annotations associated with an optical scan. (Section 19.4)

Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnails dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the DataStream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touchpads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The SimpleScanner—a Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperScanner—a High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:
- an existing peripheral such as a mouse, a stylus, a USB "webcam" camera, a Bluetooth™ headset or a remote control
- another processing/storage device, such as a PDA, an MP3 player, a voice recorder, a digital camera or a mobile phone other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications

16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified).

Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-Based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications 19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help in Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet cafe, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

In the following description, reference is made to the accompanying drawings that form a part hereof and in which are shown, by way of illustration, specific embodiments in which the invention may be practiced. It is to be understood that other embodiments may be utilized and structural or logical changes can be made without departing from the scope of the present invention. Therefore, the following detailed description is not to be taken in a limiting sense.

Although specific embodiments have been illustrated and described herein for purposes of description of the preferred embodiment, it will be appreciated by those of ordinary skill in the art and others that a wide variety of alternate and/or equivalent implementations capable of achieving the same purposes may be substituted for the present invention. Those with skill in the art and others will readily appreciate that the present invention can be implemented in a very wide variety of embodiments. This application is intended to cover any adaptations or variations of the embodiments discussed herein. Therefore, it is manifestly intended that this invention be limited only by the claims and the equivalents thereof.

Overview

The use of printed books and documents (hereafter referred to as simply "documents") has been commonplace for many hundreds of years. Various tools and strategies have evolved to try to make more effective use of printed documents. These range from handwritten (or typed) notes on the contents of documents (either on the document itself or in a separate but related document), to highlighting passages in a document deemed to be of greater significance, to manually copying passages from a document (or using a scanning copier, despite the fact that copyrights are often so infringed), to the simple act of including a printed index at the end of a document to facilitate locating information on a specific topic. Many new tools and strategies have been made possible when a document can be accessed in an electronic, searchable format such as a file on a local computer or a web page that can be accessed with a browser.

The relatively recent innovation of providing a searchable electronic copy of a document that can be accessed using a standard personal computer is quite powerful in increasing the ease with which the desired contents of such a text can be accessed and utilized. When a traditional index is provided in such a context, once an entry is found, a single click of the mouse can take the user directly to the desired entry in the electronic text. Once a relevant entry has been found, its location can be retained as a "bookmark," filed according to the user's choice, making future access to the location in the electronic document quick and easy.

One problem is that these very useful tools cannot be used with the vast resource of printed books and documents. Even though there are tremendous advantages that accrue with access to an electronic version of a document, these are obviously only available when such an electronic version is available (and a computer is available to access the electronic document). Even in those instances where such an electronic version is available, this still does nothing to enhance the actual use of the paper document itself. Furthermore, when newer revisions and updated versions of either the paper or the electronic version of a document become available, the owner of a previous version generally has little recourse but to go and purchase a new, updated copy of the material.

In some embodiments, the described system is not directly concerned with recognizing and interpreting characters per se; it does not necessarily directly concern itself with recognizing and understanding printed or otherwise rendered characters, though it can in some cases perform this function. Rather, in some embodiments the described system assumes that an electronic and/or digital and/or online version of the document already exists, that an ASCII or other representation of the document is somewhere available, or will be made available in the future—for example, stored electronically on a website, document server, local or remote hard disk, in computer memory, etc.

The described system in some embodiments uses various features (including text, graphics, etc.) in rendered documents for navigation (i.e., determining the identity of a document and/or determining location within a document). Document identity and location within a document is in turn used to enable a rich set of functions and interactions with benefits for system users, and for publishers, authors, advertisers, editors, proofreaders, and others. Some of these will be described here.

Some embodiments of the described system are based in part on a process of interpreting and deciphering information from a rendered document (including text, graphics, symbols, human-readable and machine-readable codes, underlines, highlights, fonts, typefaces, supplemental marks, etc.). This information can be used, among other things, to determine a system user's current document, location within that document, extent of the document being indicated or marked by a user, type of marking or indication or command intended by the user, and so forth. In some embodiments, this location information is resolved down to a single article, chapter, page paragraph, sentence, word and even single character. In some cases, location is determined with respect to a graphic, or symbol, or icon, or code (e.g., barcode).

In cases where the described system has access to the specifics of how a particular document was rendered or printed (e.g., page layout, relative location of various features, etc.), this information can also be used to interpret a system user's position and actions within the document.

It should be understood that in some cases various of the features and applications of the described system apply quite well to non-alphanumeric rendered content—such as punctuation, graphics and images, special marks, etc. Embodiments of the present invention include these additional uses.

Some embodiments of the described system can function in a distributed computing environment that includes a plurality of devices interconnected by a wireless network, the Internet or other networks (not shown). All these communications and connections are interconnected via suitable network connections using suitable network communication protocols as required. In various embodiments, the servers communicate with each other in accordance with respective APIs, which form additional embodiment of the present invention. In alternate embodiments, the devices and servers can communicate in accordance with open/standard protocols.

It will also be appreciated that while servers in some embodiments of the described system are in some cases illustrated as single devices, each server can actually comprise more than a single device in an actual system practicing embodiments of the present invention. It will also be appreciated that servers can include file servers, database servers, search engine servers, document servers, etc.—including various combinations of these and other servers. It will further be appreciated by those of ordinary skill in the art, that while the various servers can be discussed as separate devices, in other embodiments of the present invention the servers can reside on a single device.

Reference to Source Documents

Although the process of turning electronic documents into printed form has existed almost from the outset of computing, what has been lacking is an efficient way to reference back to the original digital sources of printed documents. The exemplary described system achieves this by scanning a desired position within a document to identify a distinctive text "signature." In some embodiments, this signature provides information that can be used to locate the corresponding location within the original digital source document. This digital signature is then sent to a server that has access to database of electronic documents, which desirably includes an electronic version of the paper document in question (though as explained below, useful outcomes can be obtained even when this is not the case). The server then identifies the corresponding location (or locations) in the electronic source document, connecting it with the original scan of the paper document. Establishing this relationship enables numerous useful innovations related to the use of printed documents in a variety of contexts.

Digital Imaging and Analysis

Digital images are formed by many devices and used for many practical purposes. Devices include digital cameras operating on visible or infrared light, line-scan sensors, flying spot scanners, electron microscopes, X-ray devices (including CT scanners), magnetic resonance imagers, and other devices known to those skilled in the art. Practical applications are found in industrial automation, medical diagnosis, satellite imaging for a variety of purposes, including, but not limited to: document processing, photographic processing, surveillance, traffic monitoring, and many others.

To serve these applications the images formed by the various devices are analyzed by digital devices to extract appropriate information. One form of analysis that is of considerable practical importance is determining the position, orientation, and size of a pattern in a stored image that correspond to and object in the field of view of an imaging device.

Another form of digital image analysis of practical importance is identifying differences between an image of an object and a stored pattern. Methods for identifying these differences are generally referred to as pattern inspection methods, and are for many purposes. One early, widely used method for pattern location and inspection is known as blob analysis. In this method, the pixels of a digital image are classified as "object" or "background" by some means, typically by comparing pixel gray-levels to a threshold. Pixels classified as object are grouped into blobs using the rule that two object pixels are part of the same blob if they are neighbors; this is known as connectivity analysis. For each such blob, we determine properties such as area, perimeter, center of mass, principal moments of inertia, and principal axes of inertia. The position, orientation and size of a blob are taken to be its center of mass, angle of first principal axis of inertia, and area, respectively. These and the other blob properties can be compared against a known ideal for proposes of inspection.

Blob analysis is relatively inexpensive to compute, allowing for fast operation on inexpensive hardware. It is reasonably accurate under ideal conditions, and well suited to objects whose orientation and size are subject to change. One limitation is that accuracy can be severely degraded if some of the object is missing or occluded, or if unexpected extra features are present. Another limitation is that the values available for inspection purposes represent coarse features of the object, and cannot be used to detect fine variations. These limitations forced developers to seek other methods for pattern location and inspection.

Pattern Matching

Another method that has achieved widespread use is template matching. In this method, a training image is used that contains an example of the pattern to be located. The subset of the training image containing the example is processed to produce a pattern and then stored in a memory. Images are presented that may contain the object to be found. The stored pattern is compared with like-sized subsets of the presented images at all or selected positions, and the position(s) that best matches the stored pattern is/are considered the position(s) of the object. Degree of match at a given position of the pattern is simply the fraction of pattern pixels that match their corresponding image pixel, thereby providing pattern inspection information.

Template matching can in some cases be applied to a wider variety of problems than blob analysis. It also is able to tolerate missing or extra pattern features without severe loss of accuracy, and it is able to detect finer differences between the pattern and the object. Accuracy is typically limited as template matching cannot measure object orientation and size. Furthermore, accuracy degrades rapidly with small variations in orientation and/or size, and if larger variations are expected the method cannot be used at all.

An alternate to template matching is the use of gray-level normalized correlation for pattern location and inspection. Gray-level normalized correlation and template matching are similar, except that the full range of image gray-levels are considered with gray-level normalized correlation, and the degree of match becomes the correlation coefficient between the stored pattern and the image subset at a given position.

The situation regarding orientation and size, however, is not much improved with respect to template matching. Another limitation is that in some applications, contrast can vary locally across an image of an object, resulting in poor correlation with the stored pattern, and consequent failure to correctly locate it.

More recently, improvements to gray-level correlation have been developed that allow it to be used in applications where significant variation in orientation and/or size is expected. In these methods, the stored pattern is rotated and/or scaled by digital image re-sampling methods before being matched against the image. By matching over a range of angles, sizes and x-y positions, one can locate an object in the corresponding multidimensional space. However, one problem with these methods is the severe computational cost.

As is well known in the art, by using traditional methods for document processing (such as, for example, a flatbed scanner combined with appropriate computer software for optical character recognition, perhaps using one of the above pattern recognition techniques), a user can create an electronic version of a paper document. Such a task may be laborious, time-consuming and error-prone.

Limited Example of Implementation

In some embodiments, the invention allows printed documents to be simply and conveniently referenced to a corresponding electronic version of the printed documents, together with a variety of ancillary information and various alternative ways to access that information. The user is equipped with a tool such as a handheld device capable of scanning a paper document and performing optical character recognition at the level of an individual line of text ("OCR pen"), or a similar device ("text wand") which can determine a sufficiently distinctive parametric description of a text fragment (text "signature") such that it can be correlated with a database of such parametric descriptions that have been extracted from the pool of candidate electronic documents to which the paper document is to be referenced. In one embodiment, the scanning device is a camera or other sensing or imaging device integrated in a cell phone. By utilizing a communication system capable of transmitting the extracted text signature to an information server with the ability to search an electronic text version of the paper document (and optionally transmitting the results back to the user), the system is able to provide the user with a wide range of novel and useful services as described herein.

Embodiments of the present invention provide many of the features and advantages of electronic documents, and, as described below, a number of additional features that are both very useful and yet heretofore unknown to either electronic or printed documents. Embodiments of the present invention provide a system and method to extend the utility of printed documents, as well as providing a business model in which this can be done without infringing the copyrights of authors or publishers.

Figure 22:
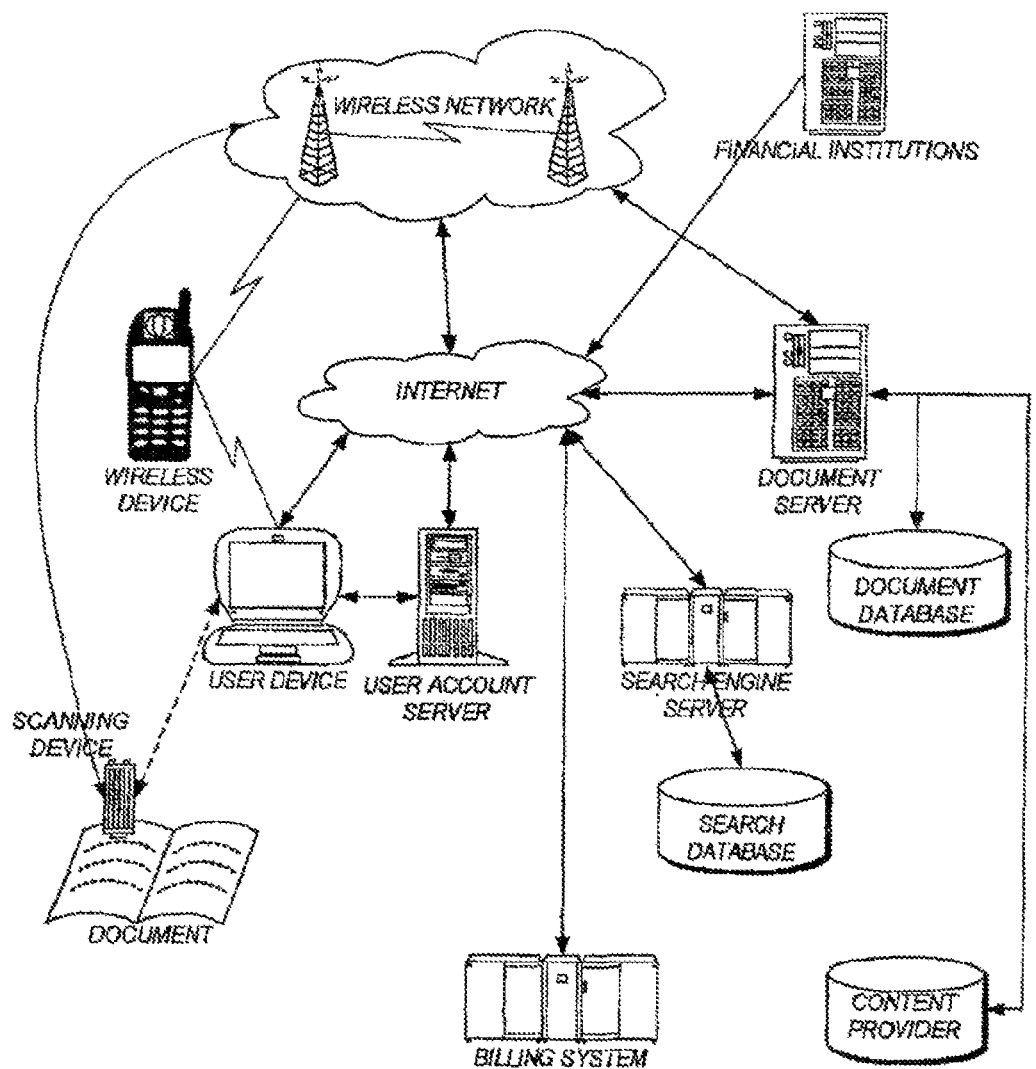
FIG. 22 is a pictorial diagram of an exemplary document correlation system for providing correlations between printed and digital documents.

FIG. 22 is a pictorial diagram of an exemplary document correlation system ("document system") for providing correlations between printed and digital documents. These correlations are obtained as described below using an OCR device (or the like) in communication with other devices. In the illustrated embodiment in FIG. 22, the OCR device is communicatively linked via a wireless device and a wireless network (or other devices and networks) to a document server. The document server is operative to receive information captured by the OCR device and correlate it with document information resident at, or at least accessible by, the document server. In various embodiments, the accessible information can come from a local or remote search engine server and an associated search database.

The resulting correlations, and results and actions derived from these correlations, are then made accessible to a user. In some embodiments, the correlations are passed back to the OCR device, while in other a user account server maintains the correlations. The user can then use a device to access the correlations (or further refined information generated from the correlations). For ease of illustration, the various servers and user device are shown pictorially as computers in FIG. 22, it being recognized that a large number of client devices in a variety of forms would be included in an actual document system employing embodiments of the present invention. In general, the user device and the various servers have computing capabilities and can be any form of device capable of communicating with one or more of the other devices illustrated in FIG. 22. Similarly, while the wireless device is pictorially shown as a cellular phone, a mobile computer, PDA or the like can be equally employed, although these are just representative devices and should be taken as illustrative and not limiting.

In some embodiments, the described system is based in part on the process of interpreting and deciphering the patterns of marks (e.g., the text and any rendered supplemental informational marks) in documents to determine location information. In various embodiments, this location information is with reference to the document itself—e.g., location within the document, often down to a single paragraph, sentence, word and even single character. For example, with one embodiment a user can scan the phrase "US coal prices are rising" from the Aug. 12 2004 issue of the Financial Times. This text string can uniquely identify its source document. On Friday, Aug. 13, 2004 the search engine Google returned on hit for this phrase. Google currently searches more than 4 billion documents. If a string is found in one and only one document, then it may be possible to determine a location with reference to this document. In one embodiment, a server can have access to the full text of many documents. If a unique string is queried, this engine may be able to locate the corresponding source document and where in this document this string appears. Such a system may be able to store where this text appears with reference to the rest of the document (before this and after that).

However, in cases where the physical lay-out of a specific rendering of a document is also known, the location information can be converted to location on a display screen, a printed page, etc. To illustrate, this may be treated in a manner similar to drawing a rectangle on a screen. With a basic graphics package, a programmer may be able to draw a rectangle on a screen by providing the appropriate function with coordinates, and possibly other values (such as color). Conversely, a programmer can write software to query the data structure representing the shape to determine the coordinates it encompasses. In one embodiment, if text is displayed on a screen, the coordinates on which a given character is displayed may be stored in memory. If a user scans a phrase, this embodiment can then query a computing device to determine this text string's location with reference to a source document. This exemplary computing device may set a variable to indicate that this text is rendered on a local display. This embodiment may then use the reference location to request screen coordinates for this text string. In various embodiments, the characters may be located by function calls indicating that they are, for example, the fifth 'x', the third 'p' in the fourth paragraph, the first 'ck' on the last page. This computing device may then return from memory the coordinates of the characters specified.

In discussing various embodiments of the present invention, term "printed text" is sometimes employed. "Printed" is used in its generic sense to documents rendering in any form that a scanning device can detect. It should be understood that in many cases various of the features and applications of the described system apply quite well to rendered content that is non-alphanumeric—such as punctuation, graphics and images, special marks, etc. Embodiments of the present invention may include these additional uses.

Using Document Layout

Some embodiments of the described system are built on the remarkable observation that rendered text creates its own reference or navigation features. In one embodiment of the present invention, these features may be divided into two classes—layout dependent features and layout independent features. Some embodiments will draw on both layout dependent and independent features.

Figure 21:
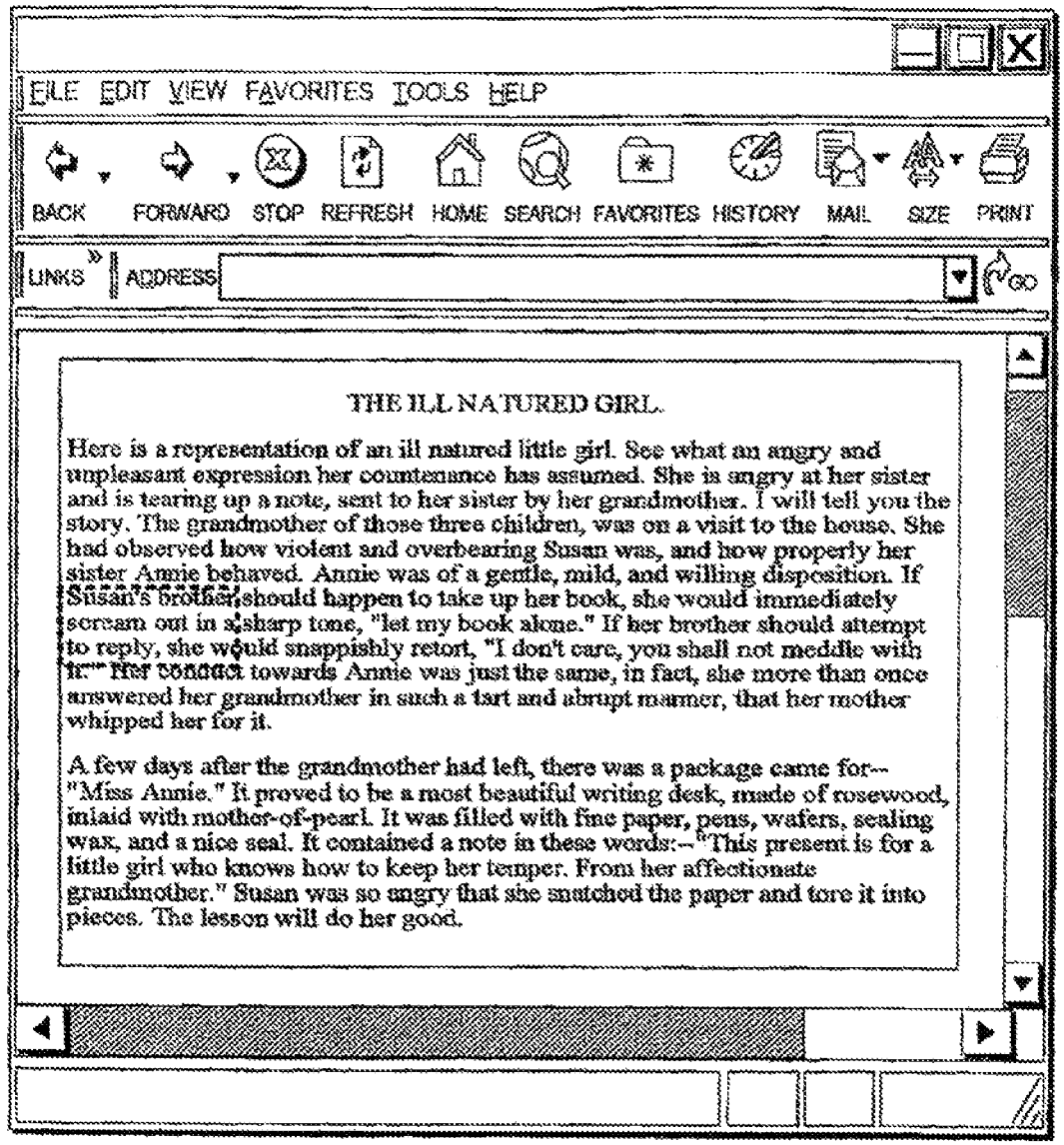
FIG. 21 depicts an outline around a region containing text.

Layout dependent features arise from the spatial patterns created when a document is rendered. They can depend on the font used, the font size, page size, margin widths, font color, line spacing, and position of particular elements within a rendered region of a document. Layout dependent features can be understood by drawing or imagining a small outline around a region containing text on a printed medium (FIG. 21). For purposes of illustration, it will be useful if the enclosed region spans several horizontal lines of text.

The spatial pattern formed by the marks in such a region are likely to be representative to that specific location of that specific document in that particular layout. This can be understood by considering what would be required for another document to have the same signature by chance. It would need to contain the same words and word fragments, be rendered in the same exact font, with exactly the same line spacing, and be laid-out so that the characters on each successive line are aligned vertically and horizontally in the same positions. It is correct to say that, even for small regions of text, the probability of this occurring is tiny—unless it is the same text in the same document being rendered in the same way.

Figure 23:
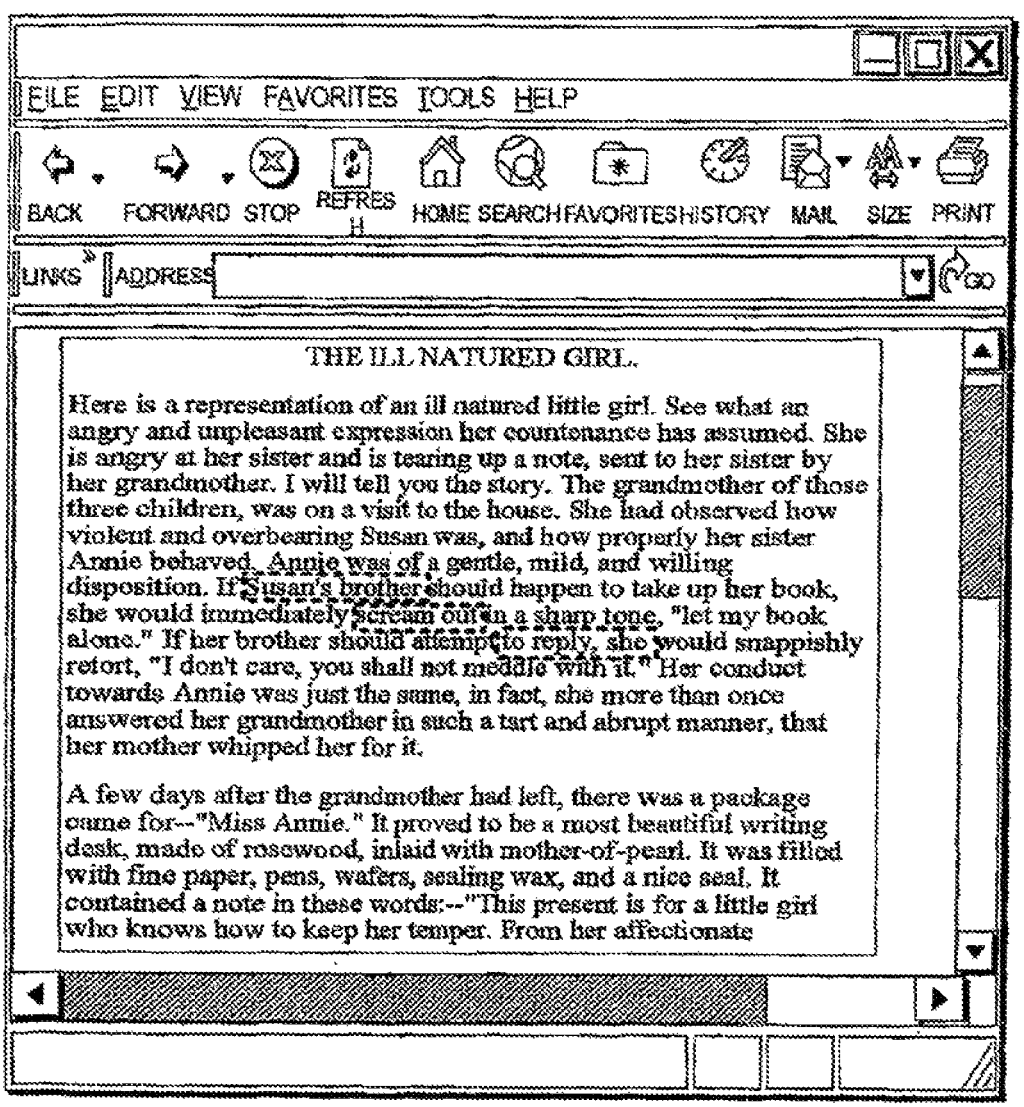
FIG. 23 depicts character groups.
Figure 24A:
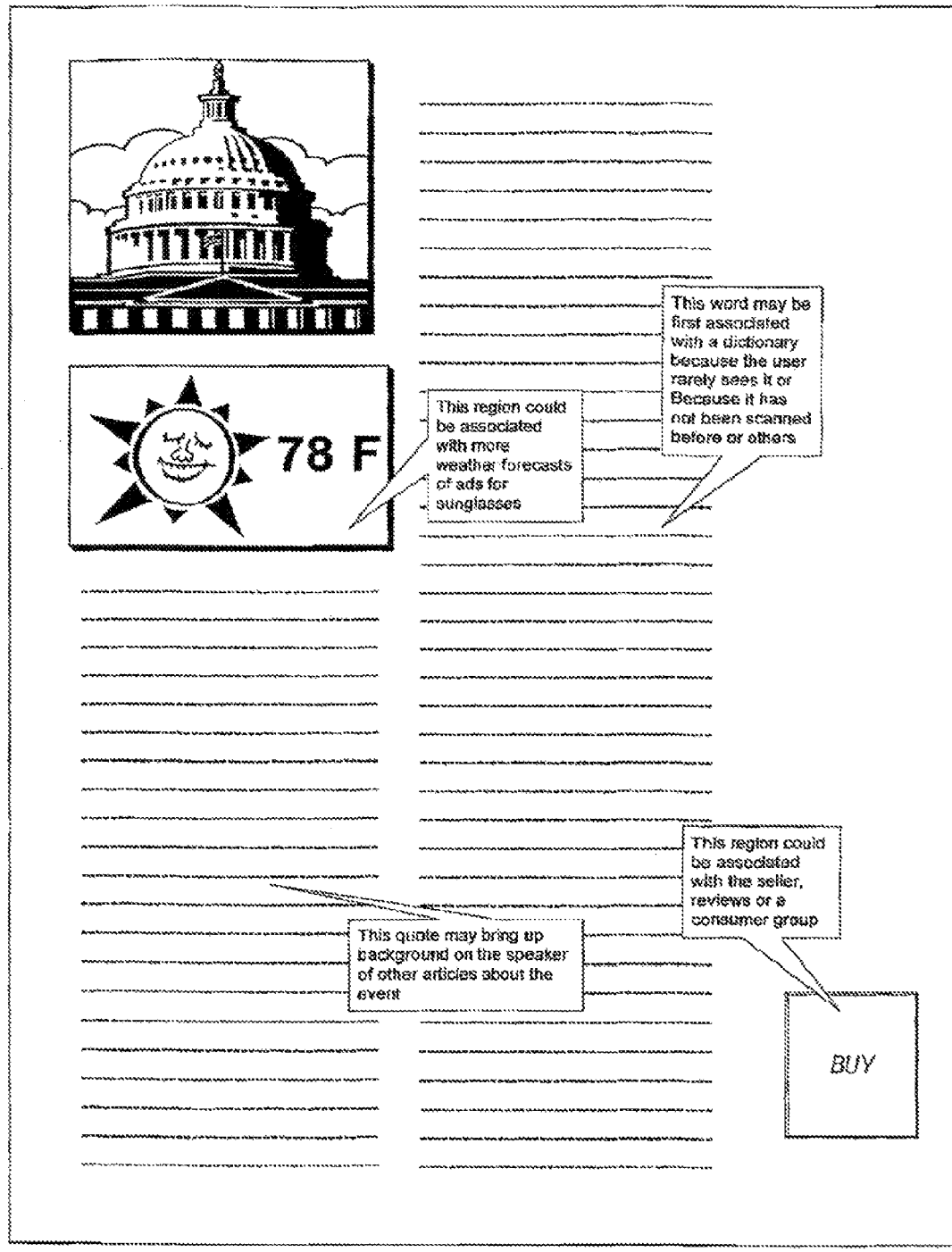
FIG. 24a depicts menus associated with locations in a document.
Figure 24B:
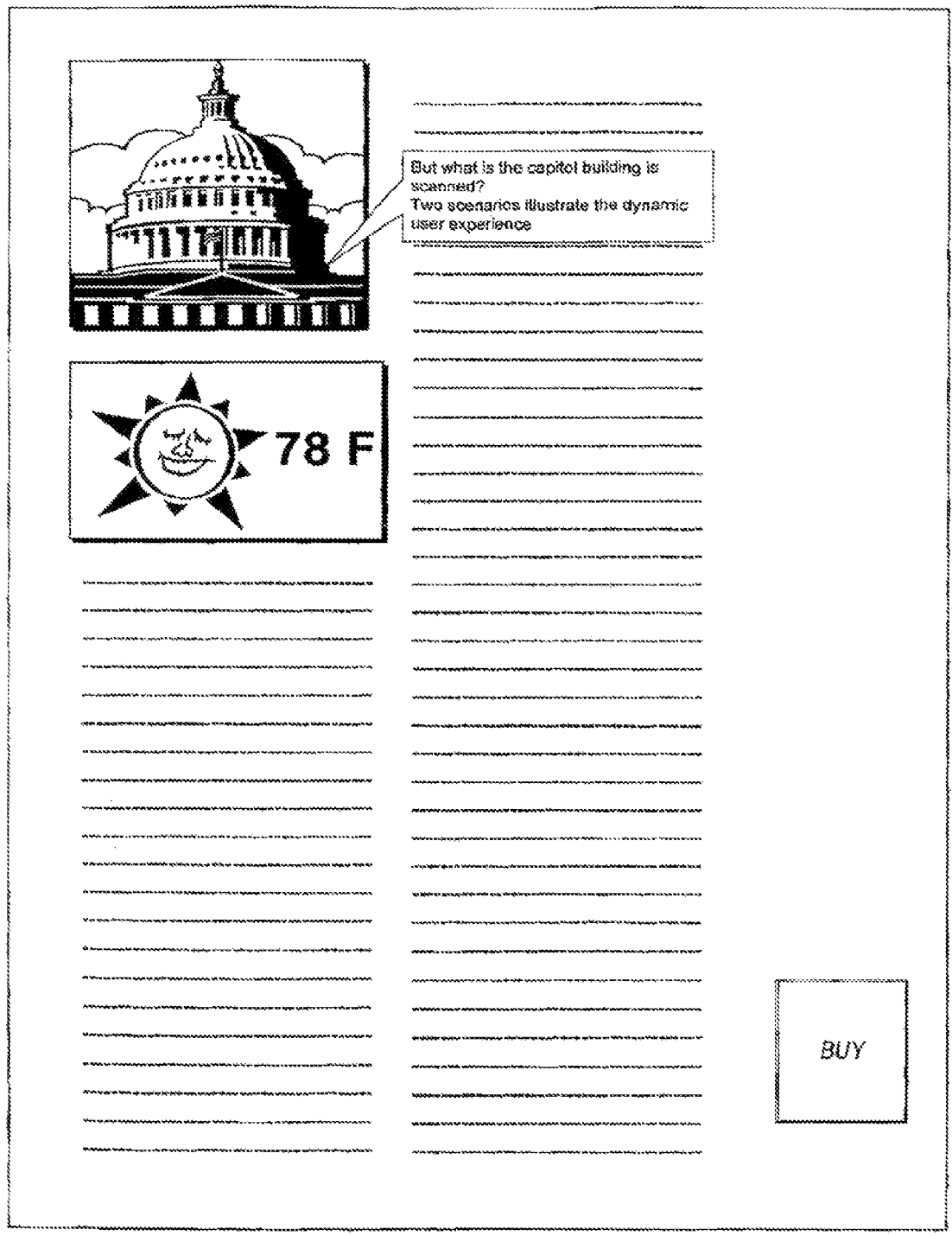
FIG. 24b depicts a menu associated with a location in a document.
Figure 24C:
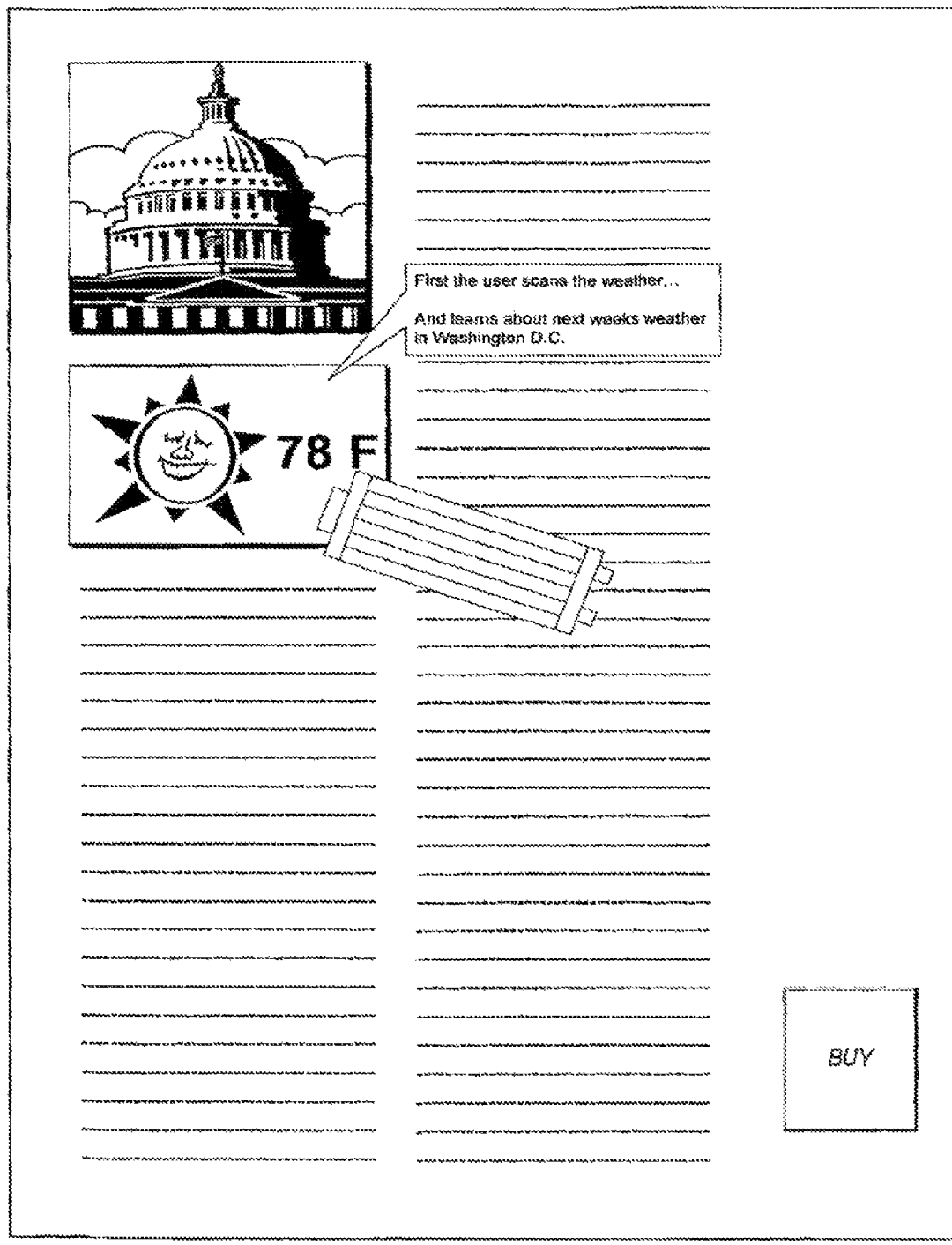
FIG. 24c depicts a menu associated with a location in a document.
Figure 24D:
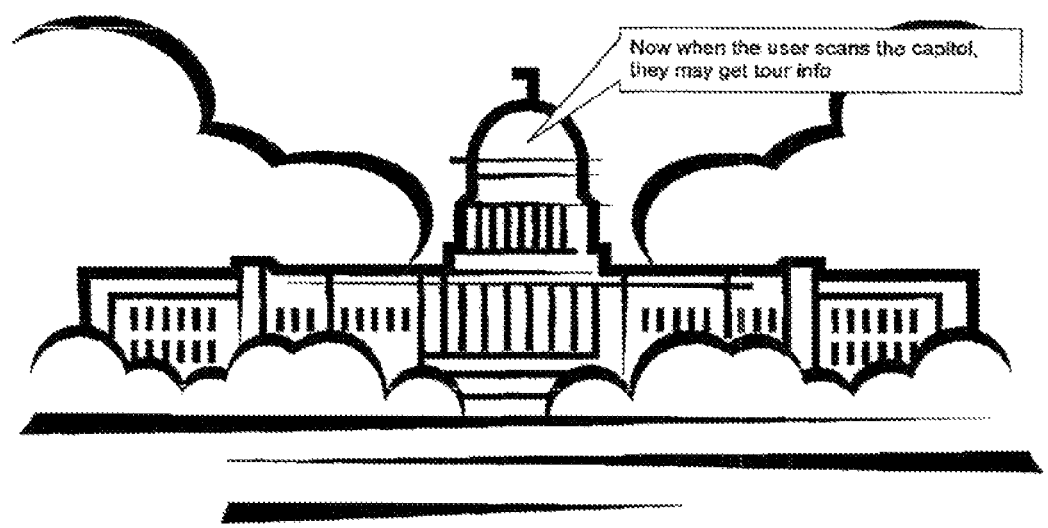
FIG. 24d depicts a menu associated with a location in a document.
Figure 24E:
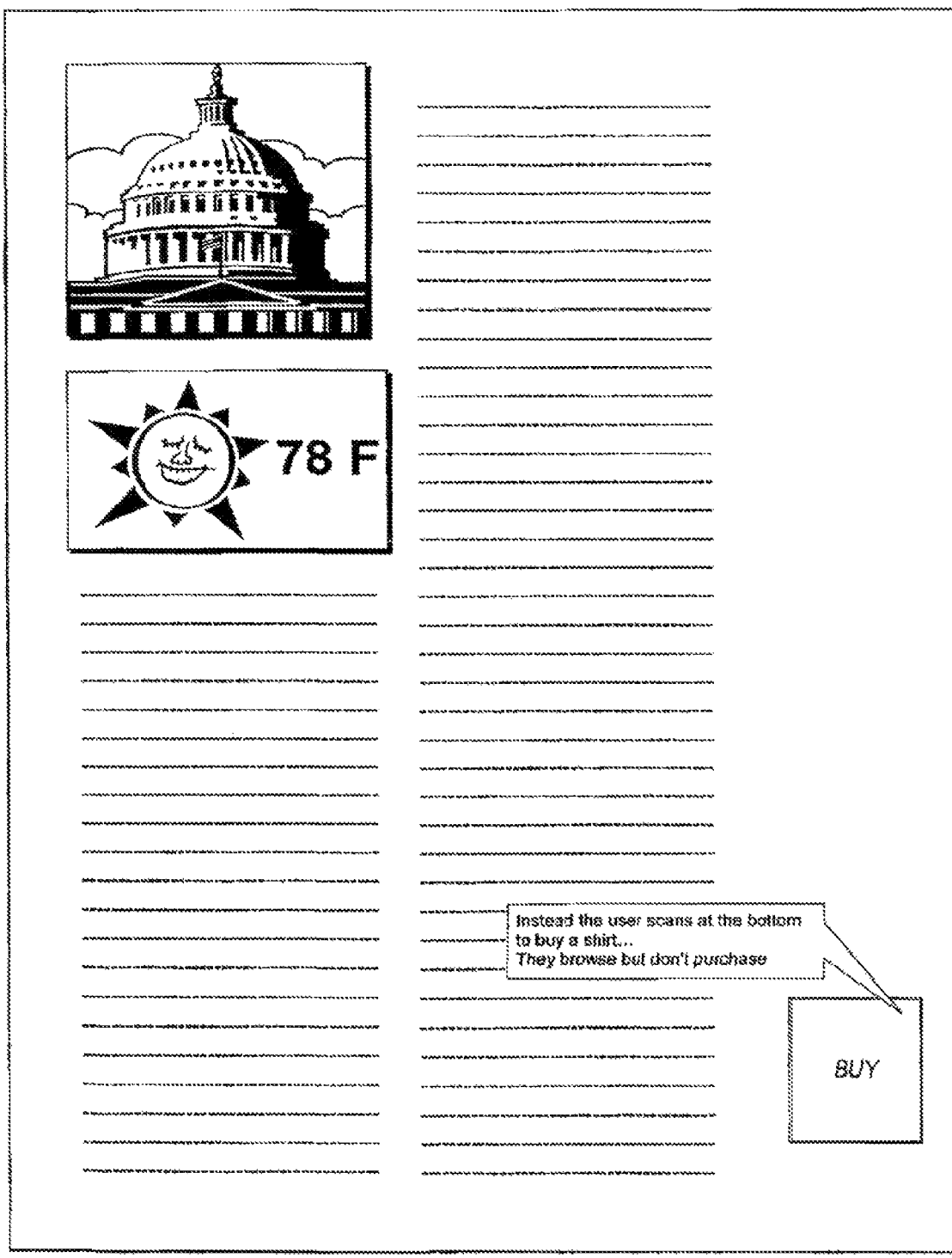
FIG. 24e depicts a menu associated with a location in a document.
Figure 24F:
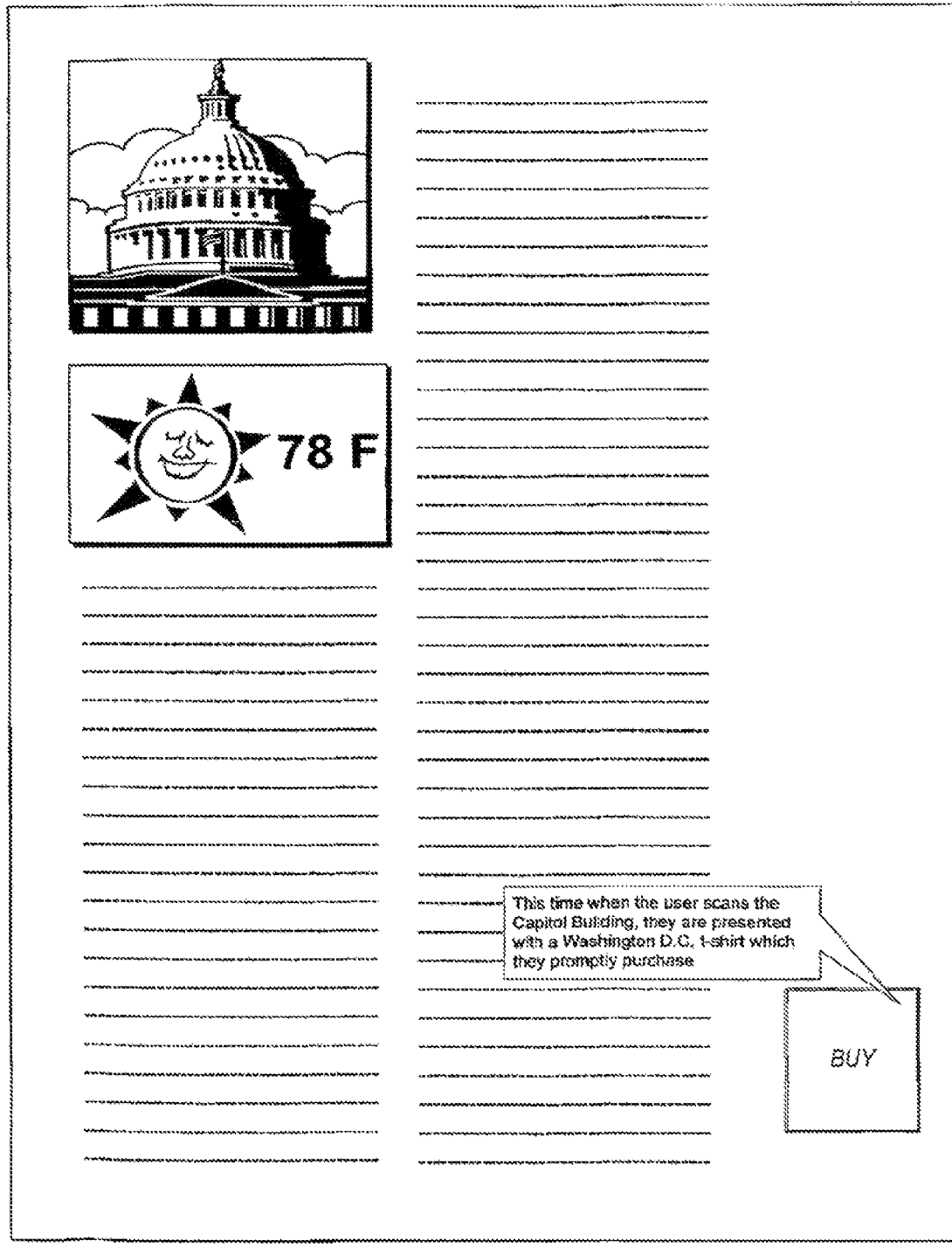
FIG. 24f depicts a menu associated with a location in a document.

One aspect of this example (which will also be referenced later) comes from considering not the purely spatial markings, but rather the groups of tokens, characters or objects that appear on successive lines within this region. In FIG. 23, these character groups can be seen to be "Susan's brother" followed on the second line by "scream out" and on the third line by "to reply, she".

Document and Location Signatures

In seeking a signature for a document and/or location within a document, it may be possible to extract information from multiple locations. In the above example, if the character groups appeared at different positions within the paragraph (FIG. 23) they would still be very likely to uniquely identify the document (and the paragraph as well). This can be understood by considering how many paragraphs are likely to contain all three phrases. To illustrate, a seven word sequence may uniquely identity a document, but a single word is unlikely to appear in only one document. For many sequences, as more words are added (i.e. the sequences become longer) the number of times that they appear in a given corpus may decrease. For example, the phrase "the marker all the way around the can" returns only one hit from Google on Aug. 13 2004. "All the way around the can" returns 227 hits and "all the way around" returns nearly 200,000. The phrases may be searched separately, for instance searching for "the marker" "all the way around" "the can" returns 41 hits. While disjoint sequences may be less unique than one phrase of the same length, each additional string adds a further constraint. In one embodiment, these strings may need to appear in order (e.g. top to bottom, then left to right). In one embodiment, a search engine may retrieve all documents containing a first text string. Such an embodiment may winnow this first field by keeping only those documents that contain a second text string. This process of winnowing may be repeated until only one document remains or all text strings have been queried.

The text fragments used in the above example could occur anywhere in the document, yet still serve as a good signature or identifier of the document. For example, searching the Google database (currently indexing more than 4 billion Web-based documents) turns up no documents containing all of the exact phrases "Susan's brother", "scream out" and "to reply, she". Thus, these phrases are a unique or nearly unique signature for this document—they occur together nowhere (or almost nowhere) else.

At first observation, this might appear to be luck, or the choice of specific text, which allows these few example phrases to serve as a signature for this document. However, this result follows from the statistics and probabilities associated with the English language (and many other languages).

One constraint on this signature extraction is that the phrases (or "objects") used for the signature not be too common. It is certainly possible to select several very common phrases (for example, "in the" and "it is," etc.), all of which can be found to occur together in many documents. However, if phrases are selected at random, the likelihood of selecting multiple frequently used phrases by chance is relatively small. As an example, FIG. 25 shows 10 groups of word-pairs randomly selected from a document, along with the number of other documents indexed by Google which also contain these same groups of words anywhere in the document.

As shown in FIG. 25, while individual word pairs helped narrow some of the resulting document searches (about 20% on average to get the right document), combining word pairs in groups dramatically improved the correlation (up to 80%) between word pairs and reference documents.

This phenomena—that several, separate text fragments can be used together to form a composite document signature—is referred to herein as "aggregate disambiguation" or "AD." One implication of AD is that a signature can be extracted for a document in the course of other activities, i.e., "in the background." An example would be a user who is marking phrases of interest in a text, perhaps intending that these phrases be highlighted in a version of the document derived from a source or reference document and the user's actions.

Initially, when the user first begins marking, the system may not have enough information to identify the document or the location within the document—i.e., there is no complete or unique document signature. However, as the user continues to mark additional content, a composite document signature as described above with regard to AD. This process highlights an interesting aspect of the system—that the system may be employed by the user before the source or reference document (and location) is completely located (e.g., the document signature is extracted)—and that the document signature can in fact be derived or extracted in many cases as an artifact of other actions by the user.

In some cases, however, it will be useful for the user to explicitly set or determine a context. One way for this to be accomplished is for the user to be made aware of this issue and instructed to select phrases which include keywords, or, when a common phrase needs to be marked, to establish further context by marking additional material (one method for doing this, referred to as "re-marking" [or re-lining], involves indicating to the user to scan additional text). The device may actually have embedded intelligent programming to determine if a scan is sufficiently unambiguous using statistical analysis of each previous scan.

It also happens that this instruction to the user actually meshes well with some of the applications of the system. It is less common that a user wants to mark, note, annotate, remember or otherwise emphasize a common phrase (though this can occur in, for example, text editing, book-marking or proofreading). Users are generally more interested in content containing distinct material (and keywords)—which is the kind of content that is useful for generating document signatures.

Another way of setting context is by scanning a specific mark or other indicia on the rendered document that identifies it uniquely—in some cases down to the specific copy possessed by the user. This mark might be a barcode on the cover of the rendered document, or associated with the individual page or article being referenced. In the case of materials sent via mail, the mailing label often contains (printed or barcode or coded) information which can be used for this purpose.

The system can infer context from a number of data sources. For example, multiple recent scans of data may have come from the same source—and the more recent the scan, the closer the scan is likely to be to the user's current location. Two scans, separated by 5 seconds, are likely to have come from locations which are very close together (e.g., on the same page, or a nearby page) in the rendered document; two scans, separated by 60 seconds, are likely to have come from the same document (but not necessarily from the same page) or from a related document. These rough guides may be used to rank or eliminate documents when an otherwise ambiguous document signature is used to retrieve multiple source or reference documents. For example, AD techniques may be used to create composite documents signatures that where separate non-composite documents signatures would be ambiguous. Or where composite signatures may not be usable (e.g., in an index that did not allow searching or related documents), the results of a search may be modified based on data from recent scans using statistical similarities between recent scans and the retrieved documents.

The amount of time between a human marking passages of text will be at least fractions of a second. This amount of time allows a processor to convert the scan into a signature. Combined with a buffer, the user is unlikely to have to wait for the scanner, or not get a passage due to processing. One way to do this is to move the scan to a buffer and then perform the processing. Other options to ensure that data is protected could include semaphores or spin locks. A remote computer could generate the signature. This would use the same process except instead of calculating the signature it is sent to the remote machine. A larger buffer would be used, but the device may be able to forgo a receiver.

Additionally, if two sequential (i.e., one after the other) scans reveal different fonts for each scan, there is a good probability that the user has switched to a new document—though the system could also check whether the document associated with the first scan has, historically, been rendered in multiple fonts, and/or whether the document is known to include italics, bold text, etc.

In some embodiments, it may be useful to identify a particular new font. For example, some newspapers and word processors will use a specific font; this could be useful data. In some embodiments, such data may be used to establish a scanning context.

Software could also be added to check for Italics, bold, headlines, etc. and then predict what the baseline text would be. Just as a word-processor can italicize and un-italicize text, this could be used to help determine if text is from one document.

Once the data is within the system, it can be further processed to determine which document something came from. Bayesian techniques, much like those in spam filtering may be able to determine which document something is from based on vocabulary. Statistical analyses can be done in the time between markings so that instead of breaking up marks on a set time limit (e.g., 65 seconds) they can be separated on probability, e.g., any time lapses more than 3 standard deviations away constitute a change of document.

Scans may also be differentiated based on length. If a user switches from a newspaper to reading a judicial opinion, the length of text the user is selecting is likely to vary greatly. These techniques can also be combined to form a composite score, and a threshold set.

This function could also be done expressly by the user, possibly by touching a switch or button, tapping or shaking the device, or selecting one of a few extremely common words (e.g., the, and, end) or spelling them out, etc.

In some cases, the described system will have access to the details of specific renderings of a document. This information may be intrinsic to the source document (e.g., when the document is in a format which includes formatting, such as HTML, or when the document was itself scanned in from a rendered version), or this information may be provided in supplemental form (for example as a properties list) available to devices in the described system. Depending on the type of document and the requirements of the described system, the amount of supplemental material may vary on a document-to-document basis. For example, for some documents it may be important to treat each individual rendered version of a document separately. In other documents there may be little or no supplemental information other than the text of the document itself. Supplemental information can also be added later, such as the next time a user visits the document in their history the system could automatically check for more information. Another embodiment may ask the user for permissions, and yet another embodiment could use rule based permissions like those used with Internet browsers retrieving cookies.

A signature that is not unique will match a set of documents, and the sets of documents returned can be compared to identify a document that exists in all of the sets collected. This processing can also be done in the background as described above. Later technologies will be discussed to determine when a user has switched documents.

Information Related to Rendering

One useful way for the described system to obtain information about the specific details of rendered documents is empirically. As system users interact with documents (e.g., by scanning regions of text, pointing to locations in the document, etc.), the described system can acquire knowledge about that particular document and how it is rendered. As more and more users participate in the described system, this empirical knowledge will also accumulate to the benefit or subsequent users. An example of such knowledge sharing is described below with regard to the frequency of document interactions. This knowledge may come from any user and be useful to any user.

There are techniques in the described system that avoid the necessity to recognize character shapes and fonts in the described process. However, this information is certainly available to the described system, as some of the user's interactions with documents can involve scanning and/or imaging regions of the document. Without necessarily requiring it, the described system has the option of receiving and analyzing scanned data from capture devices. Thus, for example, the system can determine which fonts have been employed (e.g., using conventional OCR analysis over a region of text) in rendering various parts of a document (or various rendered versions or issues of that document). This information and knowledge can then be used when further scans occur within a particular document—either by the same user, or by other users.

Note from the preceding, the described system can optionally learn about the documents it is handling. This information can be stored and used in the future, so that over time the described system's behavior can change. Some of the types of information which might be acquired and utilized by the described system include how frequently a document is referenced/scanned by various users or groups of users, which portions of the document are scanned most by these users, which users are likely to scan which documents, what time and/or date particular documents are likely to be scanned (e.g., the morning newspaper might most often be scanned between 7 and 9 am), which fonts are employed at which locations in which documents, what types of errors are most likely to occur in the various processes within the described system. For example, which fonts, characters, words, phrases, fonts, renderings, capture devices, communication links, users, etc., generate the most errors—and the nature of these errors; this information may be helpful in improving error correction.

Scanning devices can be connected with other technologies, such as GPS. Users can organize the scans by where they occurred (e.g. in the office, or the trip to London). The described system is able to handle a rich set of properties, and with tools such as XML, the options for attached data can continue to grow. Any type of metadata could be associated with a document, group of documents, or group of users. In addition to the ones stated, information such as ambient light, acceleration, physical stiffness of the document or any other data that can be reported from a sensor could be used.

Feedback to the User

The system could also have functionality to let the user know that something was not scanned properly. A scanner may detect that an image does not have the required resolution and then turn on an LED. This will likely be corrected by the user rescanning (and the user will probably scan slower), or the user could scan an encompassing region of text. The device could notify the user by a number of means well known in the user interface arts including a light, preferably a LED, a sound, a vibration, etc.

This signal could be generated by the device after the initial scan if an error is detected in the processing or could come from the system itself. Optionally, the system may be able to communicate to the device through any of a number of well understood methods (Bluetooth, Ultra wide-band, any of the 802 IEEE standards, infra-red and other wireless methods. Various wired communications could be employed as well). The system has far more sophisticated methods for detecting the need for a rescan and abilities to correct for this directly. Earlier, we discussed the sources of this information. The system can draw on its corpus or corpora to fill in gaps in information based on what it knows. For instance, if one word out of 23 scanned is unreadable (i.e. smudged, or destroyed by a coffee stain) the system can treat this as two scans and bring up the appropriate document to find the missing word. The user then has the seamless experience of being able to scan text even if it is in part illegible.

Capture Frequency, Document Ranking, Statistical Analysis

The frequency with which a particular document is scanned—including how often chapters, sections, paragraphs, phrases, words, images, etc., are scanned—provides a rich source of material that can be of value both to the described system and to the system user. One use of this data is to prioritize and rank documents—since documents that are most frequently scanned are most likely to be of interest. For example, in cases where a scan is ambiguous—that is, where the scanned material might come from multiple locations in the document, or from multiple documents—the frequency or popularity of the various possible matches might be used to prioritize the results so that results that are more probable are presented to the user first.

Note that this scan frequency concept can make use of data both from an individual user, and from larger groups of users. For example, one interesting scan frequency is derived from the past actions of the current user. If the current user has scanned text in this document previously, or in related documents (e.g., previous issues of a periodical), then that information can assist the described system in ranking the document (e.g., by giving this document higher ranking than another document which the user has not scanned historically). On the other hand, if the material scanned by the current user appears in a document that is related (similar content, topics, keywords, authors, publications, etc.) to other documents that this user has historically scanned; this information can be used to rank and prioritize the result.

This could also provide data about how fast users are reading the document (e.g., by noting elapsed time between captures), if they reread portions, and statistical analyses may be able to determine which sections user skip over, or just skim.

This can then be tied to how the users use the scans. For instance, a user may scan a single word and then use a menu to look up the word in a dictionary or thesaurus. A newspaper may very well want to know how many of its words are sending readers to dictionaries.

Similarly, the described system can use the results from the behavior of other users to modify how it responds to the current user—even though there is no direct connection or relationship between these users. Consider a system user who often reads about model airplanes. The described system receives a scan that might match several documents. Assume the user has previously scanned none of these documents (or related issues of the same periodical). The described system can consult information it has about other users who historically have scanned and marked the same documents (or similar ones—e.g., about model airplanes) as the current user. If the current scan matches material in documents scanned by these "similar" users, these matches/documents can be given high priority or ranking.

This information can also be used in combination with information from the relevant group. Further, the described system can also correlate its metadata to its ability to determine whether documents are related. For instance, the system may notice that for some people time is very important (they read the same newspaper at the same time every morning).

Additional interaction can be provided to the user beyond identifying which document is being scanned. Assume the described system has established the user's context (for example, the described system has identified which document or set of documents the user is most likely in). Next, the user scans or indicates a new piece of material. In various embodiments, every location or region in a document can be associated with a menu of choices, representing actions, options and other items of interest to the user at that location or region in the document. The choice of which items appear in this (literal or figurative) menu of choices can be determined—in part or entirely—by information the described system as learned or acquired previously from the user's actions, or from an external source. See for example FIG. 17.

Further, the menu options can be extensible. Different menus can be associated with any location in a document—and these menus can be dynamically generated for different users, different times of day, user's who are reading and/or interacting with a document differently, etc. See FIG. 24 for an example.

Figure 17:
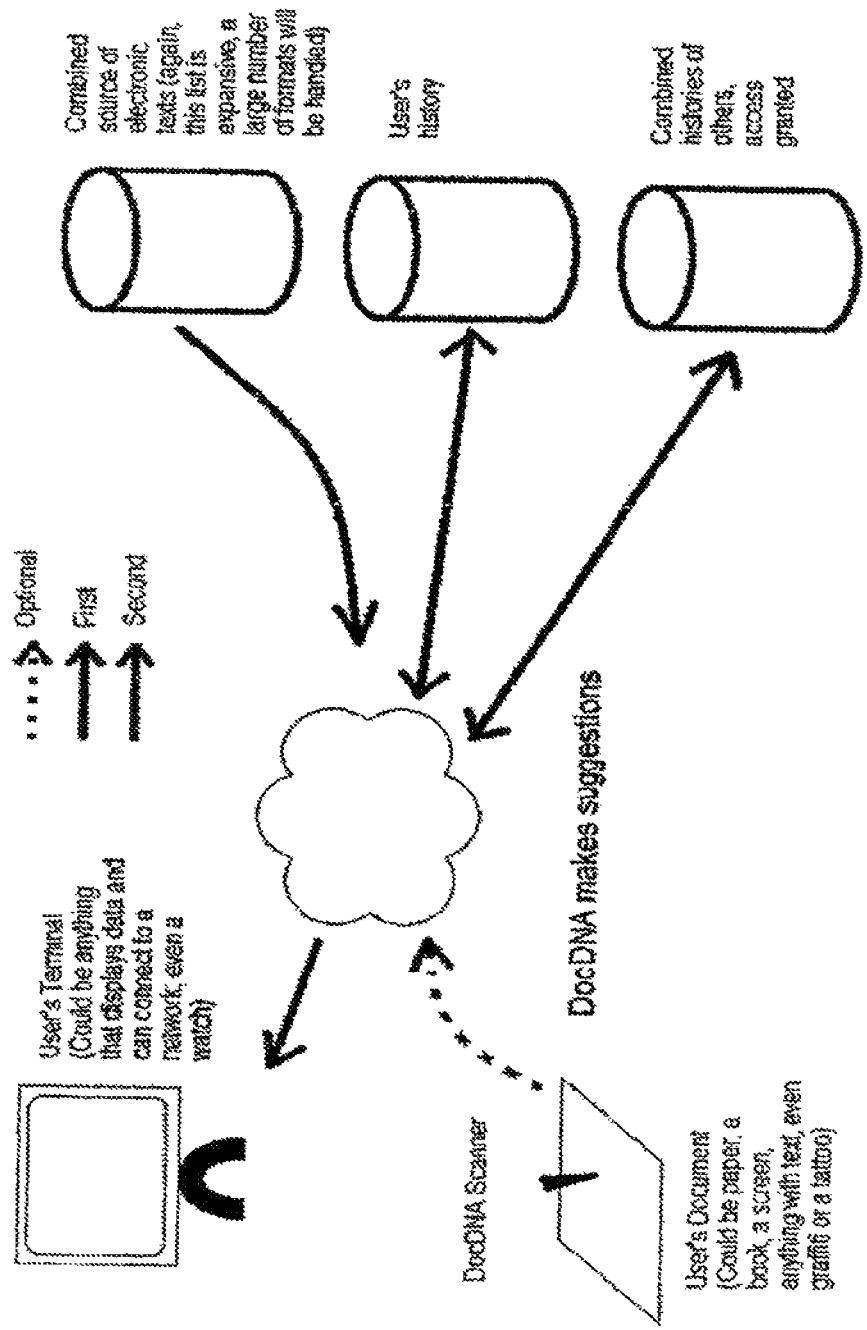
FIG. 17 is a block diagram of a system that includes a combined source of electronic texts and user's history.

The user or the described system may also be able to set up lists or groups of people from whom to base the popularity rankings (FIG. 17). This technology can be combined with some of the possible data mentioned earlier. A user could have documents scanned during the workday, or near their office, be stored with their coworkers group. Then the system could switch to a different group of people when the user is reading their magazines. These groups could be formed and managed using techniques that are well known from contact management software, electronic address books, instant messaging clients, and social networking software. The techniques to calculate popularity could be as simple as keeping a tally, or be tied together with metadata to use more intelligent predictive techniques.

The described system may be able to find or suggest people for these groups. Users could be given the opportunity to either opt in or opt out of groups. The system could determine if two people are working with similar documents and suggest the documents read by one user to the other user and vice versa.

One example of this would be supplemental material associated with a particular location or region in a document. In this example, the described system might offer the user access to the three most popular supplemental materials, as determined by the choices and/or actions of other users who have scanned or marked this (or nearby) locations in the document. Which items are associated with a location or region in a document, how they might be presented to the user, the order of their presentation or the order in which they are acted on, etc., are some of the many aspects which can be determined in part by knowledge about that location or region of the document that the described system has acquired previously.

Popular Quotes and Other Materials

Dynamic lists can be generated from data derived from captures and made available by many means (e.g., at a website)—These can include the most popular: quotes, phrases, words, places, sources, documents, poems, articles, people, photos, drawings, purchases, celebrities, etc.

Data about who is reading/marking what, how often, etc., can be used to tell one user about materials that other users find interesting. One format might be modeled after Amazon's interface: "Other people who bought this book also bought . . . " But the described system can combine this concept with our scanning/disambiguating described system and provide results like:

Other people who read this article were also interested in these other articles/websites/books/movies/songs/magazines/authors/writings by the same author/etc.

Other people who marked this passage . . . as above.

Other people who have read or marked (as you have) both this passage and the other passage or article were interested in . . . .

Deferred Actions from Captures

It is also possible for the described system to make use of information that it acquires after a scan has been made. For example, the described system might not even have access to a reference document at the time when a user first references it. Alternatively, the user might not at present have a communication link to the database or document store or document index, etc. that contains information about a document, or an instance or representation of the document itself. Similarly, the priority or relative importance or rank of a document may only become known after many users have interacted with it. Thus, the way a document is handled may change over time.

An example here would be data that is scanned or marked by the system user in a document for which the described system has little or no information. These scans, or the actions resulting from them (bookmarks, hyperlinks, annotations, underlining and highlighting, excerpts, etc.), might subsequently be delivered to the user's online account with a service provider, or, in another of several embodiments, this data might be emailed to the user. It might also be returned to the user's capture device directly, possibly by sending the files over USB. Note however, that in the time between when the system user first interacts with a document, and when that user subsequently uses, retrieves, or acts on the resulting data, the described system may have learned additional information (e.g., how other users have interacted with the same document, the document's popularity, etc). This newer information can be utilized to change the user's subsequent experience with the same scanned material, even though the described system did not have the additional information at the time of the user's interaction with the document. This may be similar to how a user may bookmark a website, and be able to experience content placed after they bookmarked it, but before their next visit.

Figure 4:
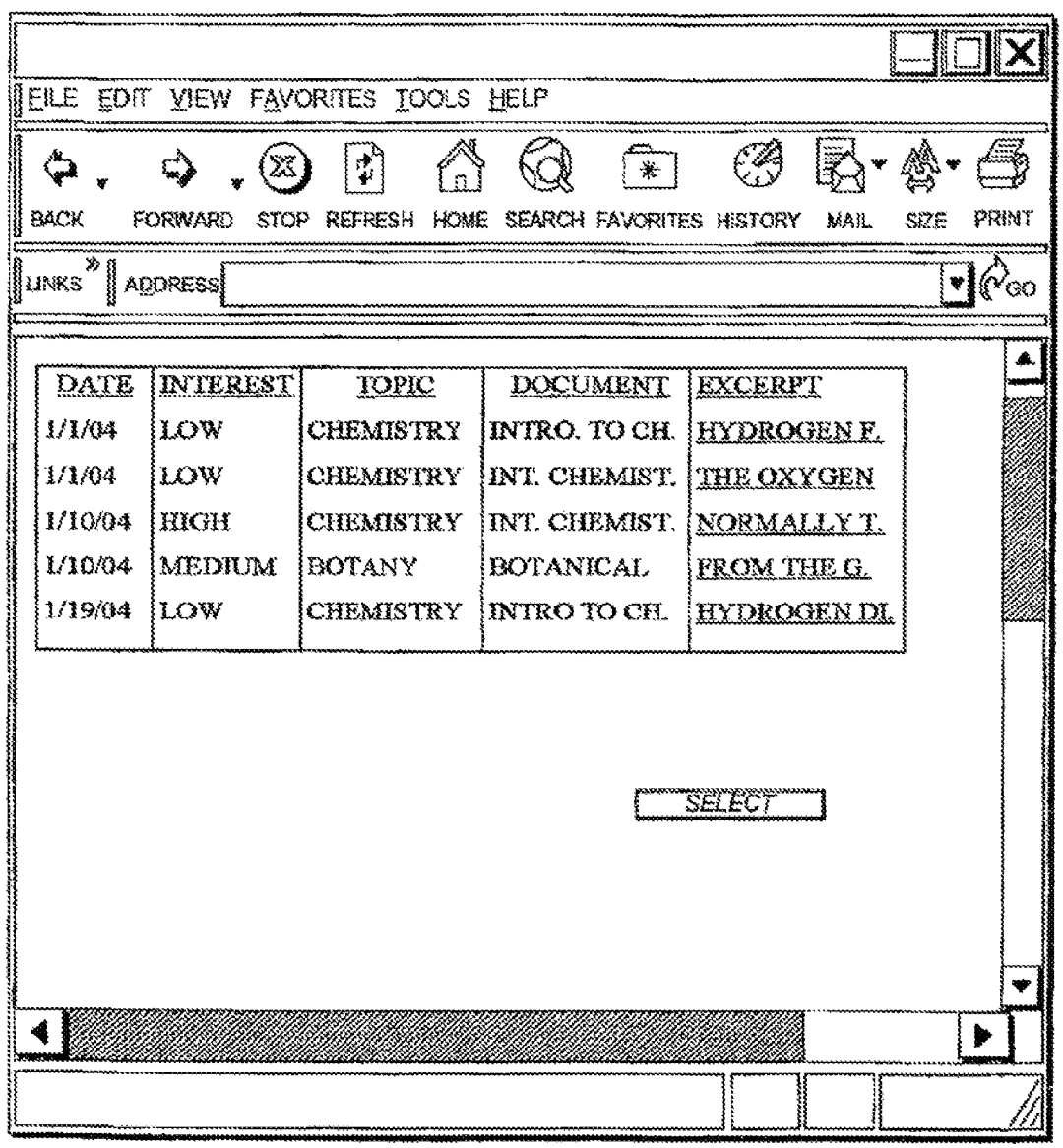
FIG. 4 depicts a list of scans.

Sometimes the interactions a user has with documents in the described system relate to or cause events that occur later. The nature of these later events (e.g., interactions with the user) can be modified or determined by information that the system learns in the interim. One of these types of subsequent interactions occurs when scans made by the user are accumulating in a user account, and the user visits this account to subsequently interact with these scans and their derivatives. Consider an example where individual scans are accumulated as a list of items representing these scans. The list might be organized chronologically, or by topic, or perhaps by lever of interest (FIG. 4). When the user sees this accumulated data, its organization and presentation and associated information may be in some degree determined by what the described system has learned—before, during, or after the scan was made—about these items in the list.

The user may be presented with a rich set of options to view their history. It could be categorized based on the types of metadata (e.g. a calendar from which the user finds their work), generated from the statistics (today's most popular headlines), subject matter (model airplanes) or combinations of the above (if you read a lot of financial news, the system bring up financial news if it meets a given popularity threshold). Such data may be provided by a content owner. A magazine may provide an SGML version of their source documents that contains a subject. In one embodiment, a server may be able to tally scans of a document to determine popularity. Such a server may then be able to determine which source document, known to be a newspaper article, has received the most interest today.

One example might be that documents which have received a great deal of attention (e.g., scans or other interactions) by other users are indicated as important—for example, by special highlighting, numerical rating, shading, etc. Another example might be that associated data related to items in the list—for example, locations on the Internet or in documents that other users have browsed just before or just after marking this item—can be offered to this user when they are reviewing their accumulated scans.

The concept of user accounts has value for some applications and configurations in the described system. In some cases, the user of the described system will not have access to a computer or display or communications link when they are marking or scanning documents. However, there are many actions and opportunities that will be of interest to the user—except that these are not available at the time when the user is interacting with the document. In these (and related) circumstances, the described system can accumulate information scanned by the user for presentation and user interaction later.

One method of presenting data to a system user is through an internet-based account, for example one accessed through a Web browser. In this case, the user can visit this account at any time to review, modify, interact with, etc. their accumulated data. For example, one presentation to the user might be a list of all recent scans, perhaps listed in chronological order. For long scans, a single line (e.g., taken from the front of the scan, or containing important keywords) might be shown (FIG. 4). The interface may also present some or all of the user's groups. Some users may have different options when viewing a group than other users. For instance, a boss may be able to track with scans anybody on their team has made, whereas lower level employees may only have default access to their own scans.

Over time, a system user may interact with many documents. These documents represent a good source of information. In some cases, the documents may comprise everything the user has read or attended to over a period of years. In other cases, for example if the system user is an attorney who uses the device in their law practice, the documents used with the described system may represent a history of every document the attorney attended to or annotated or reviewed over a considerable period of time. Note, in this and other examples, there are many useful ways of classifying this data. In the case of the attorney, this might be by client, by subject matter chronologically, etc. Some embodiments of the system may use the full range of meta data, and could be linked to other relevant information. For instance, the attorney may be deciding whether to re-subscribe to a law review. Some embodiments of the described system may show the lawyer how often they read the publication, which percentage of articles are available elsewhere, which percentage of the articles were used in cases or motions which were won, cited in decisions or where the client defaulted on payment. The system can gather enough data to create these kinds of links based on earlier discussed techniques, but other embodiments may be strictly privacy driven. Some embodiments may delete data as soon as possible. Other embodiments will be in between these two in terms of meta data used.

The user group concept that came into play with popularity applies here as well. A user or scan can belong to any combination of groups (a group could be just one user or scan, or zero). A department at an office may share a group, and a user within that group may belong to a family group. The scans can be sorted explicitly either through an interface on the monitor, the terminal device or another part of the system. The scans could be sorted implicitly based on the metadata discussed elsewhere in this document using any of the means mentioned. These include rules similar to email sorting, including Bayesian techniques, inference based, table look up techniques and any other method of sorting based on properties and any combination thereof. One example is that documents read at 7:30 am by a particular user are usually classified as the morning paper. However, if the user reads the same newspaper at 7:30 am on vacation the described system may record it in the vacation user group as well. The described system may determine that the user is on vacation based on a machine readable calendar of the user's activities and the time-stamp of the scan, or it could use GPS information to learn that the user is in Bermuda and use statistical techniques to determine that that is a vacation spot. If the appropriate security permissions have been granted, the described system may be able to use personal history from the user such as credit card transactions to determine that they are on vacation. The system could also use a combination of light, pressure, humidity and sound measurements to determine that the user is in a new location, and one whose environment fits with the user's past vacation spots.

Figure 16:
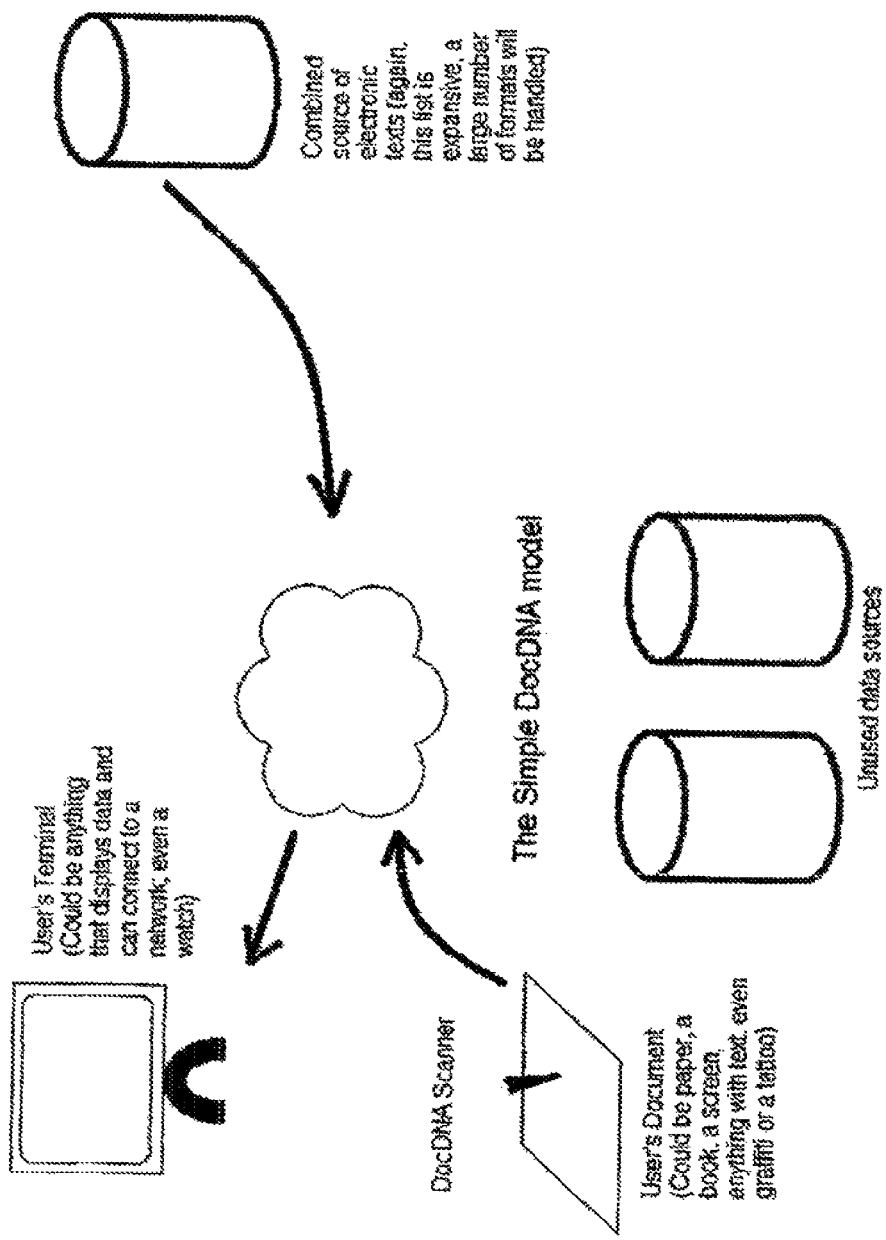
FIG. 16 is a block diagram of a system that includes a combined source of electronic texts.

Essentially the various materials that are used by a system user group can be thought of as a collection or library. (FIG. 16). One thing that is unique and interesting about this "library" is that the user group did not actually have to acquire or construct it. Instead, the items in this collection were instead accumulated as abstract references, and in many cases as the by-product of other user actions. For example, a system user might be reading poetry, and choose to scan a particular line of interest. The described system would extract a signature set of features from the user's action, and note the marked region/location/position and the various settings, modes, states of the capture device/user profile, any metadata collected and explicit commands given by the user. This information may be stored for the user. The described system may also seek to identify the source context/document. If this is unavailable, it might try later to determine when the document becomes available. These results may be stored on a users personal computer or be accessible via a web interface.

Life Libraries

Over time, multiple documents accrue to the user. These may essentially comprise a life library, i.e., many or all of the materials that the user has touched with their capture device. It could also comprise a time in the user's life or a time period for the user group. For instance, it could be the combined scans of an introductory English course, or the documents that a person interacted with during a training session. In one embodiment, a user may be able to import data from a calendar application. If the scans have time stamps, these may be associated with an event that occurred at the same time. If a user schedules the aforementioned English course as a recurring event, they may be able to classify all scans occurring during this time as part of the English course. In one embodiment, a user may be able to sort scans based on their source. A user may enter that all scans from Beowulf are to be associated with this English course. In various embodiments, users may be able to employ the full complement of mail filtering technologies to sort scans into appropriate folders or categories. In one embodiment, a user may be able to export their scans or their scan results and share them with other users by transferring the files. It could also use metadata to comprise the documents that a couple interacted with in planning their wedding.

These libraries could also exist in reverse; a publisher may have a library of everyone who has visited a particular book (this may be subject to permission from the user). This library could be based on any combination of metadata, not just time or limited to a fixed set of users, user groups can be dynamic (e.g. a sports team will change its roster, people in a museum, etc.) In one embodiment, this may happen where a user selects other users to receive copies of their scans or scan results. In one embodiment, this may happen where a server automatically emails these results to the specified accounts. In one example, a professor may have received copies of scans from three of their classes. This professor may be able to pull up all scans from documents on the recommended reading lists for the respective quarters to see how this further study affects class performance. In this example, the professor may have already input the three reading lists.

This library could be delivered in various forms to the user (e.g., email, on a DVD or CD-ROM, wired, wireless, electronic media, something that could be transferred to electronic media, like a barcode or OCR, or through anything capable of transmitting information, even a drumbeat). However, another interesting embodiment is the case where the described system maintains these materials for the user.

Note that the user's copy or copies of a document in their library can in fact be a virtual copy. The user may have marked or changed a copy of the document in various ways, but if desired these changes, markings, annotations, etc., can be stored separately and associated with or applied to the original source or reference document at any time. One implication of this is that only one master source or reference copy of an article is required, even though many users may have made notes, annotations, highlights in their personal "copies." In fact, these "copies" are custom renderings of the original source document, generated by combining the user's personal data with the source document. The user could also combine data created by different copies of the same document with a copy of the source document. The data being combined does not have to have been generated by the user now viewing the copy.

When a user has a library of some or all the materials they have touched with their capture device, they have available much or all of the printed or rendered materials that were of importance to them. This changes the user's relationship to paper (or otherwise rendered documents). Previously, a user's interaction with many paper documents was short-lived and ephemeral reference books, scrapbooks, certificates and such are kept for a long time. Once the newspaper or magazine (for example) was finished, it was put down or discarded. Moreover, unless the user troubled to clip or copy the items of interest—and further to organize and store these clippings or copies—the information was lost, or made much less accessible in archives. This system is another way to transmit clippings or articles of interest between people or groups of people. A user may be able to export a fraction of their library and email it or burn it to a CD and transfer it to another user.

Copier and Highlighter

In the described system, the user can figuratively have a "highlighter" and "copier" on their key chain (or in their pen, or worn as a ring, or on their watch, or around their neck, or on their belt, or in their pocket or mobile phone or any other place that they find accessible). The device could also be a network of devices, or devices communicating through the system, or a combination. For example, a user may have a series of cameras around their desk. This user may be able to have these cameras capture pictures of their desk. These pictures may be transferred across a network to a workstation computer that is able to find certain types of documents (e.g. black text on white letter size paper) and create scans. This would be similar to a sensor network. The "highlighter" and "copier" could also be attached, for example, to a place, such as a living room, shopping mall, telephone booth or anywhere else. In these scenarios, the information gathered could be stored, for example, with the location's user group, the user (if the system is able to gather that information at some point in time, and permission is allowed). The scanning functionality could always be on, determined by a switch or other explicit user action (or lack of action) or determined by the system. For example, the device may turn on when pointed down, or when squeezed, or when the tip senses contact. In one embodiment, a scanner may have a vertical tube inside. There may be a ball that is able to slide around such that when the scanner is pointed down, the ball slides to one side of the tube and activates a sensor. The system could employ other types of data; for instance, the system could tell the device to turn off if there is no light in a room. The source documents that the user indicates are located and (virtually or physically) saved for the user. Any markings or annotations are also (perhaps separately) saved. These materials thus remain available as long as the user wishes (or so long as they have access to the described system). Other applications may require a user to gain access rights to a document. Examples include buying old copies of magazines, waiting for copyright to expire and starting a new job. Until that time, the system may display that the document is not found or that the document is found and cannot be retrieved (likely with the reason why). These messages can draw on the whole area of error and warning messages for possibilities.

Locating Documents

The process of locating the document (including confirmation or lack thereof to the user that the document was recognized/found) can be done in real time if a communications channel is available, or it can be delayed to a later point—including delaying until the document becomes available—at which time an optional notification can be sent to the user. The process could also be severely delayed, and the transmissions faulty, slow and plagued with problems. Many embodiments will use real time communication; the possibility exists that this system could even be used from the moon. When a document is located, the described system might then obtain a copy of this document on behalf of the user, or notify the copyright holder or content owner that a user has made marks or references in this document, depending on the permissions scheme. In one embodiment, this notification may be similar to server access logs. Similarly, when a threshold number of scans of a rendered document become queued within the described system, but no reference or source versions of the document are available, this may trigger a process for integrating the rendered document into the described system (e.g., by using a conventional OCR process, or otherwise obtaining a machine readable version of the document). This trigger could be based on any combination of metadata and statistical techniques. For example, the system may have learned that certain word combinations or font change sequences are more likely to be unique than others are. From this, a system may gather that two lists of scans from two users both came from the same document. These scans may be combined to form a partial source document. Eventually, a complete source document may be created.

Figure 19:
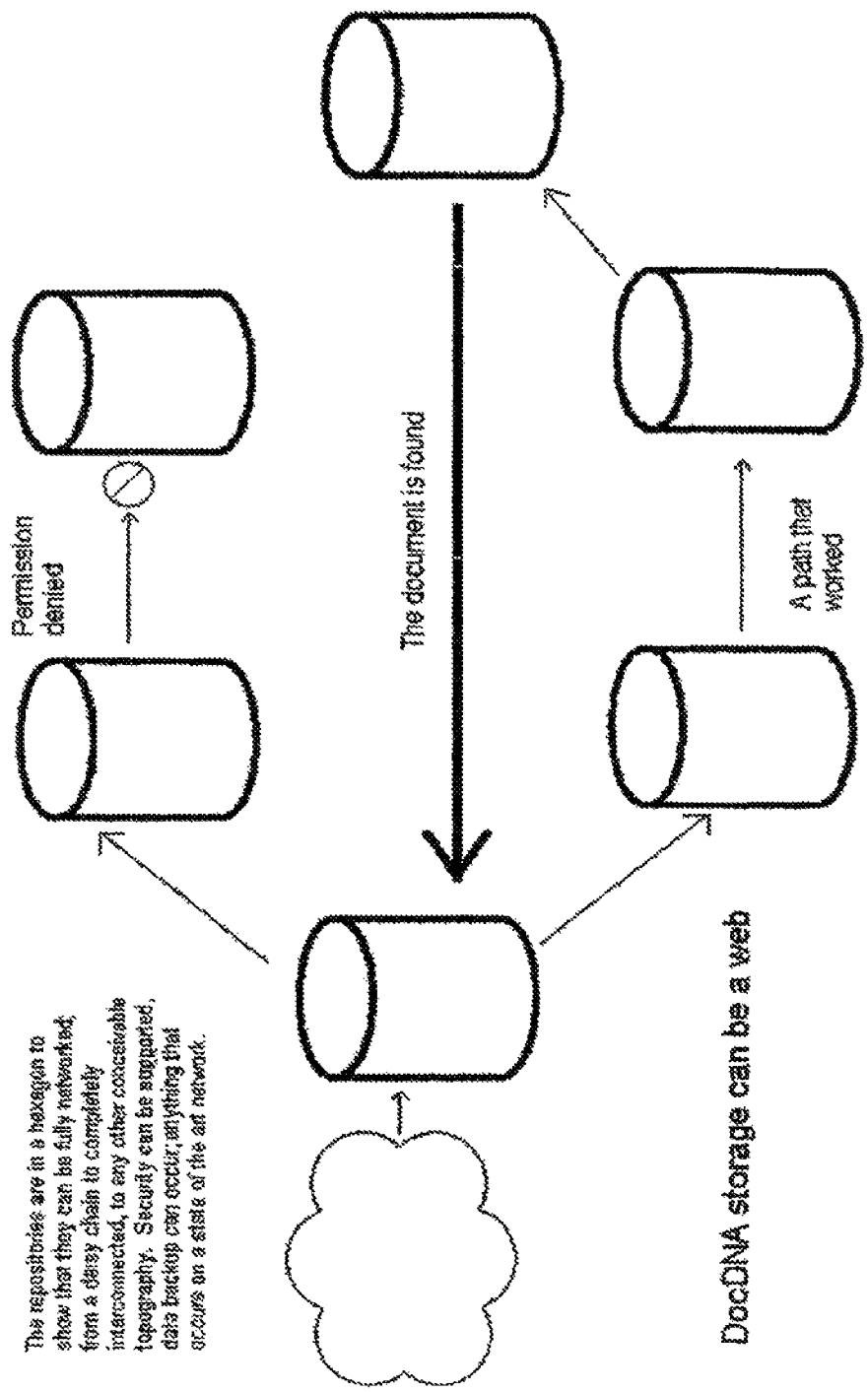
FIG. 19 depicts repositories.

If the described system is itself caching a copy or version of the source document, it may want to employ a "use count" indicating how many users currently have virtual copies (or "derived copies" comprised of the source plus the user's marks) saved or stored. If this number falls to zero the source document might be removed from the archive without impacting users. Caching techniques can also draw on the full range of networked storage techniques, including those used by Akamai, KaZaa and bitTorrent. In some embodiments, users may set a preference level for speed of retrieval (which may be impacted by cache location). This would assist with systems that use predictive models to cache documents and clear out documents from the cache. Some embodiments may use knowledge of the network, optionally with user preference data, to determine that a document is "close enough" in the network that a copy does not need to be cached. Some embodiments may cache copies for back up purposes, in a scheme similar to those used in Redundant Arrays of Inexpensive Disks. Some embodiments may cache documents in a variety of places to minimize the likelihood of loss of data. For example, some documents stored in California may be backed up in locations less likely to suffer an earthquake (FIG. 19).

Note that physical delivery of the user's scanned documents—including, if desired and allowed, the addition of any markings made by the user—is also an option in the described system. Drawing on the field of e-commerce, a user may have to gain rights before this transaction. Examples include payment of a fee, auctions, reverse auctions and any other payment scheme. Further, rights could be gathered in any number of other ways, including those mentioned earlier.

The documents accumulated for a particular user may be organized many ways—e.g., by subject, chronological, in the user's own custom categories, etc. This can be done explicitly by the user or the described system or in combination. This can be done using any combination of the metadata, and any of the techniques outlined. One useful way to classify these documents is to base the classification on the aggregate classifications of many users—i.e., to see how many other users have classified a document and then to offer this classification to subsequent users. In one embodiment, a user may be able to export their scans with XML tags for classifications. Another user may be able to query a database containing many of these files for a document and retrieve the XML tags that have been used to classify it.

Similarly, the popularity of documents can be determined directly (e.g., by asking users) or indirectly (e.g., by considering how many users have read the document, made marks, saved copies, etc), or a combination of these. This popularity is then available for other users. It can also be used in conjunction with other technologies. For example, the popularity or rank of documents according to internet or intranet search engines (e.g., Google's page rank) will be of use to system users; and; conversely, the derived metrics of usage and popularity can be employed in rating and ranking documents in search engines (or other applications where level of interest, traffic, hits, user-attention, etc. are useful or important).

Figure 5:
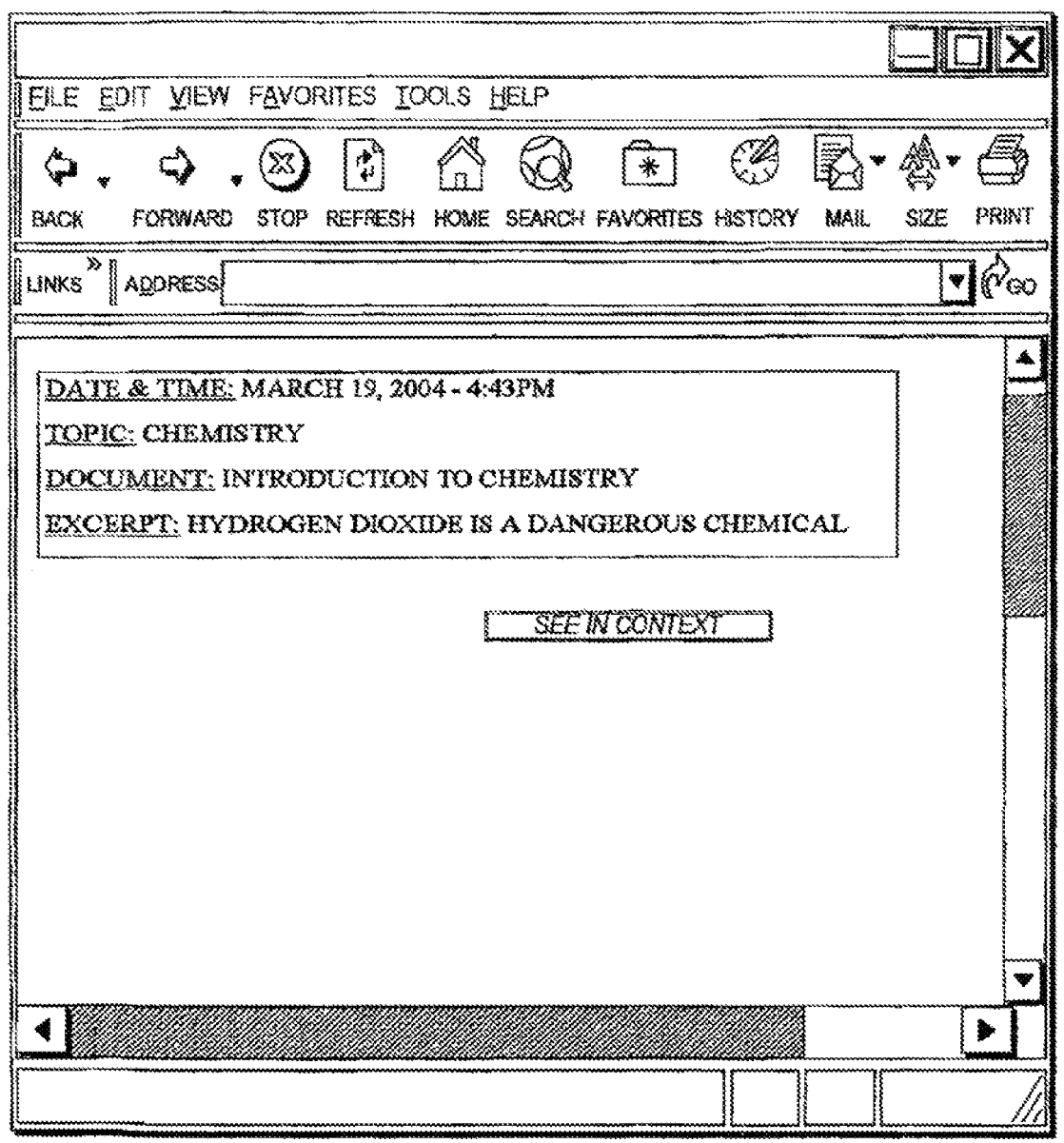
FIG. 5 depicts scanned data.
Figure 6:
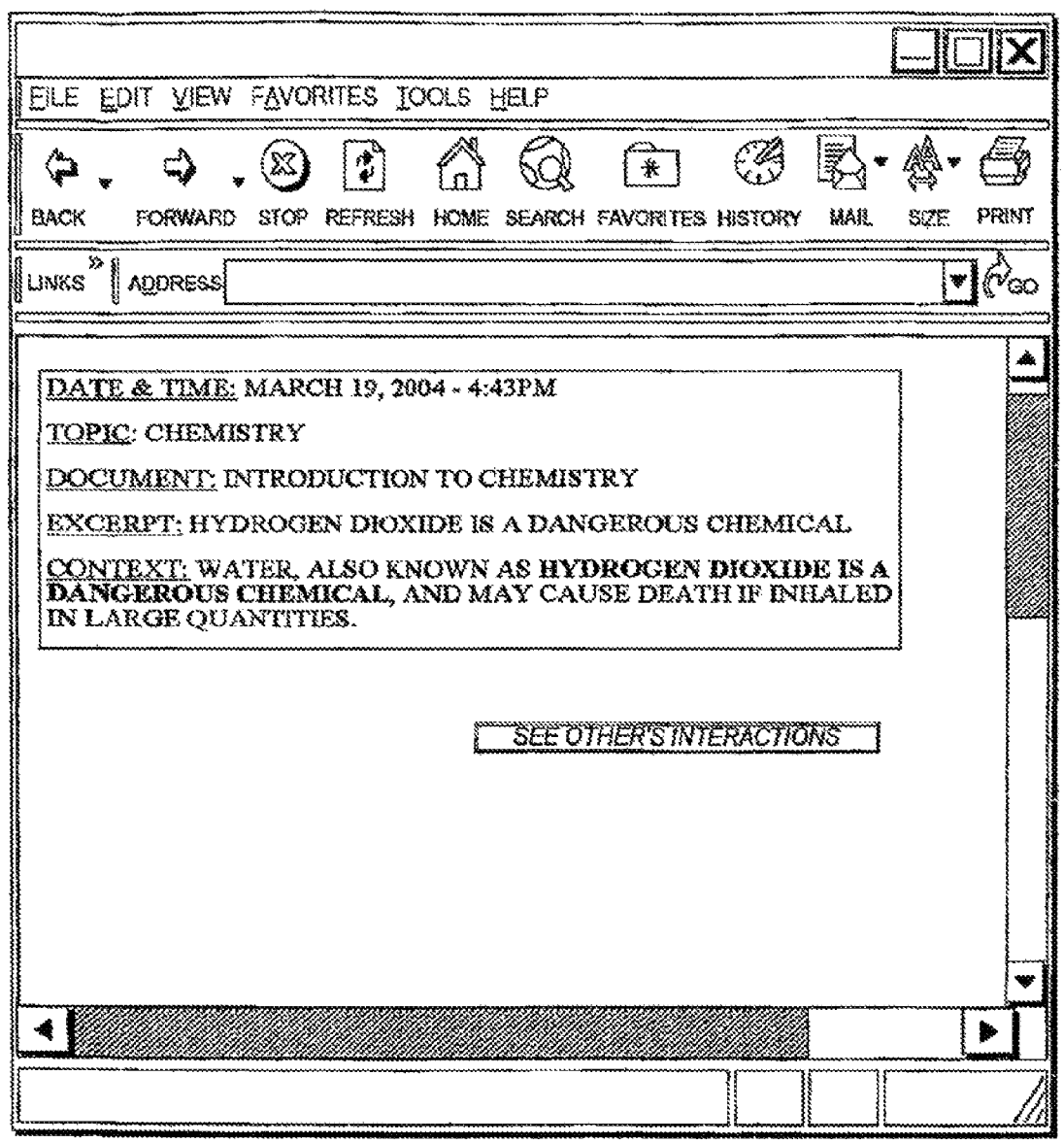
FIG. 6 depicts context from which a scan was taken.
Figure 7:
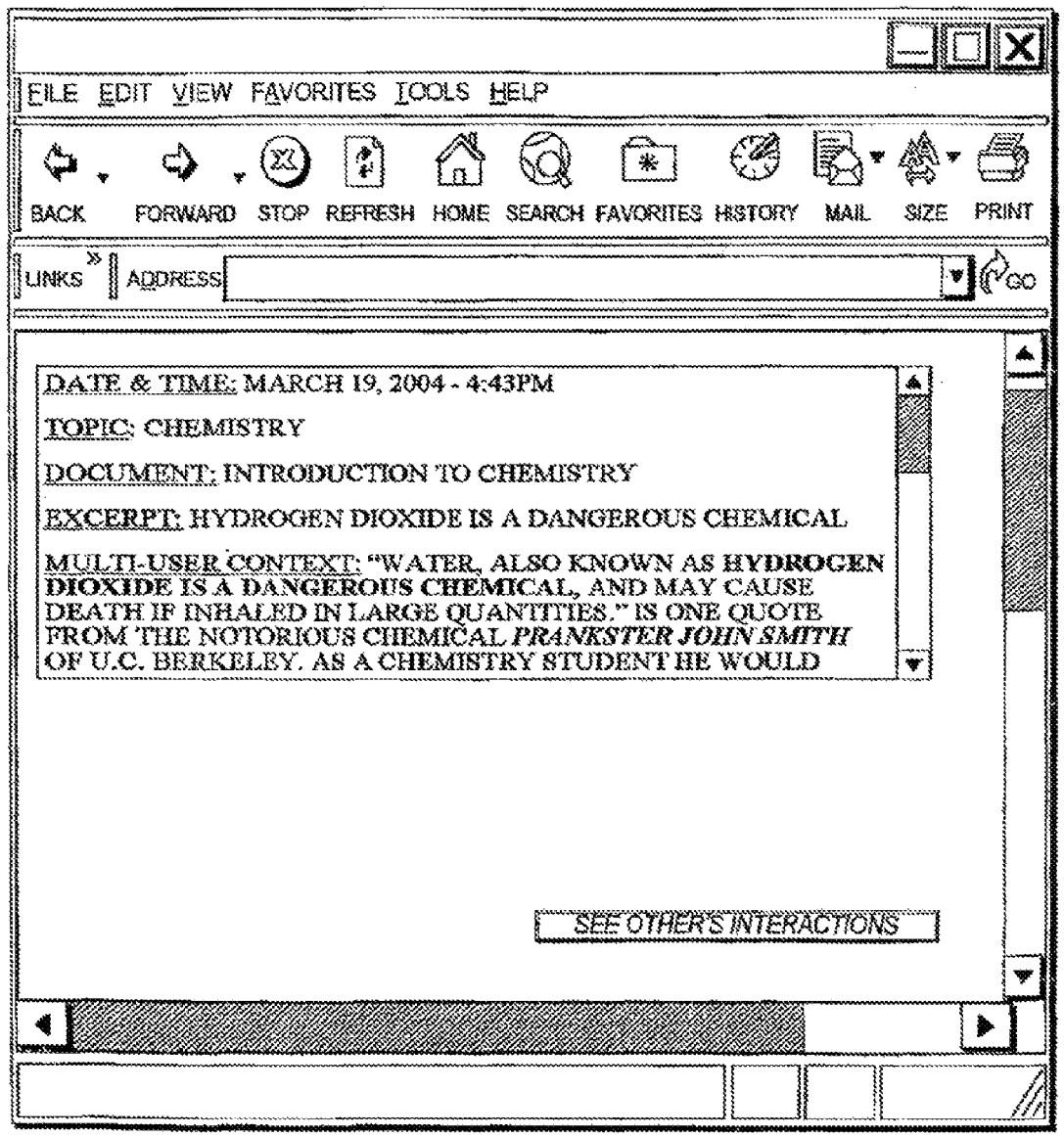
FIG. 7 depicts a marked region shown with an associated mark.

In many cases, the system user will want to view fists of scans—for example by topic, source document, chronologically, etc. (FIG. 4) This list of scans can be interactive when presented via a computer, PDA or other device having a dynamic display. Clicking on or otherwise selecting (including predicting in some embodiments) a particular scan can result in specific actions. If the scan has been condensed (e.g., to a single line, as mentioned separately—FIG. 4), selecting it can cause the entirety of the scanned data to be displayed (FIG. 5). Alternatively, when the scanned region is displayed, selecting this displayed item can cause the described system to display the context from which the scan was taken (FIG. 6). In this case, it will be helpful if the scanned portion is distinctly indicated. If the mode, state, selected action, etc., at the time the user performed the scan included marking of some kind (e.g., underlining, changing the text color, highlighting, etc.), then these marks can be shown associated with the marked region when the larger context is shown (FIG. 7). Additionally, having expanded a document view to see the surrounding context, any other marks or selections or regions that were made separately by the user can be shown in this same view. In one implementation, this context view could be scrollable, and as the view is scrolled, other marked regions selected or scanned by the user can be shown with the appropriate marking or highlighting (FIG. 7). Scrolled refers to the entire area of moving to different regions of an image, directionally, with different inputs, at varying speeds and accelerations, etc.

Markup/Metadata Applications

Items could be associated with a point or a region in a number of ways. The simplest way may be to use a coordinate system (rectangular, polar, etc.). The coordinates could also enclose a region. Techniques could also be based on hashes. If the region (or region near the point) is visually unique, as may be the case for a trademark, information encoded in a standard image format could be used to generate a hash to find the region faster. For example, the 3M corporation may want to associate their trademark yellow with their website for selling Post-It notes. A make-up company may want to associate their products with certain skin tones, and a JPEG format would likely return similar results for similar patterns of skin tone. Formats such as postscript and portable document format may make it easier to group results that have similar shape and text combinations.

The system could also use sequences to associate menus and options. If a reader reads about one restaurant, the menu may have a link to information about that restaurant. If the user then reads about a different restaurant, the menu may then include information about restaurants in general, or just in that area. In one embodiment, different links to information (e.g. keywords) may be associated with meta data describing it. This meta data may be hierarchical; e.g. this link is to Dan's Restaurant; a steak house; a restaurant; a tourist attraction; it is at 2511 5th St, Chicago, Ill.; it costs $25-$45 per visit. If another attraction is scanned, the matching meta data may be used to find the appropriate menu.

This could also be tied in with the earlier discussed metadata. A nightclub may be willing to pay a premium to have higher placement on Thursday afternoon when they suspect that their customers are making plans than on Sunday morning.

Interactions Between Users

Figure 8:
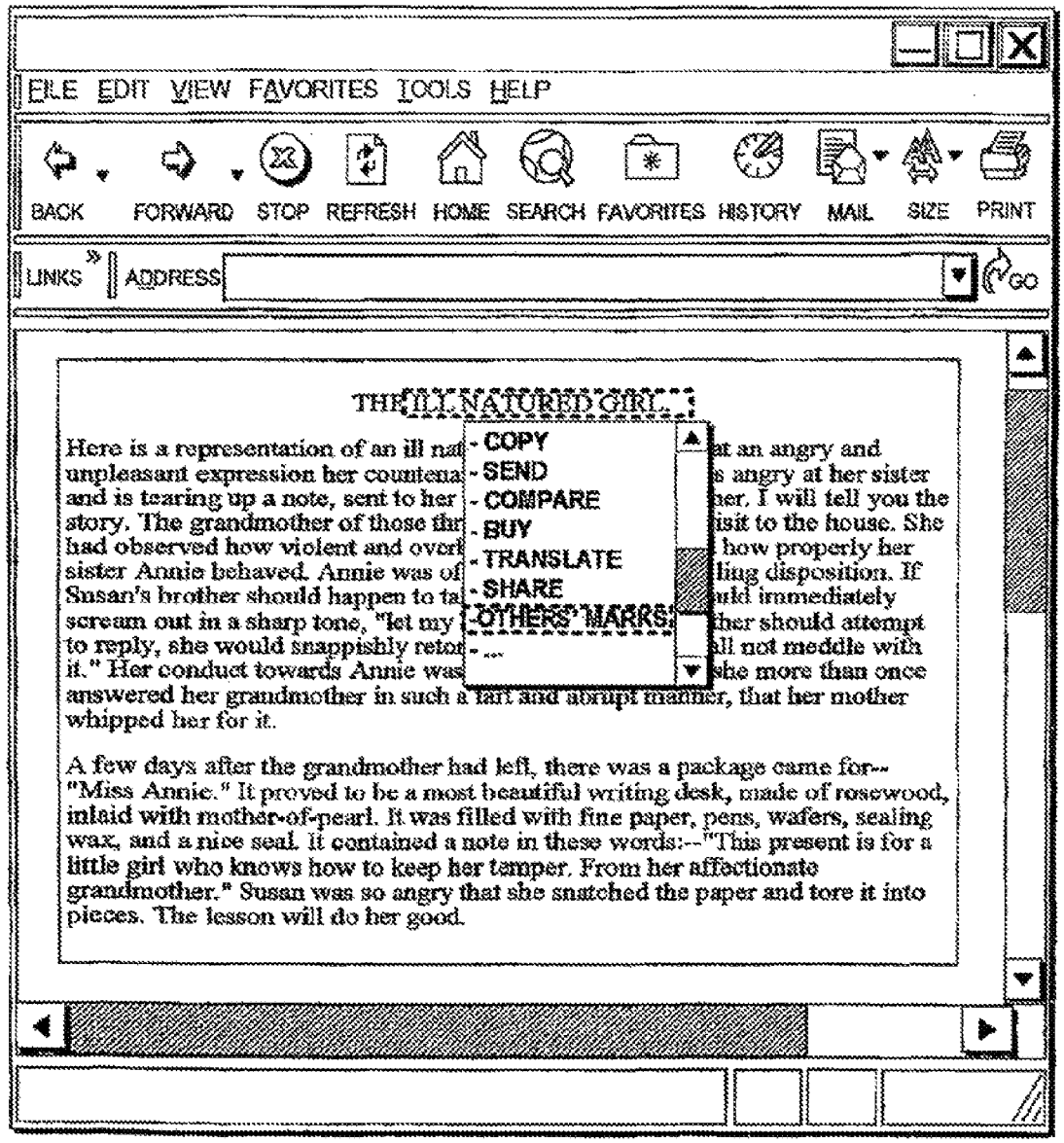
FIG. 8 depicts options which a user can select.
Figure 9:
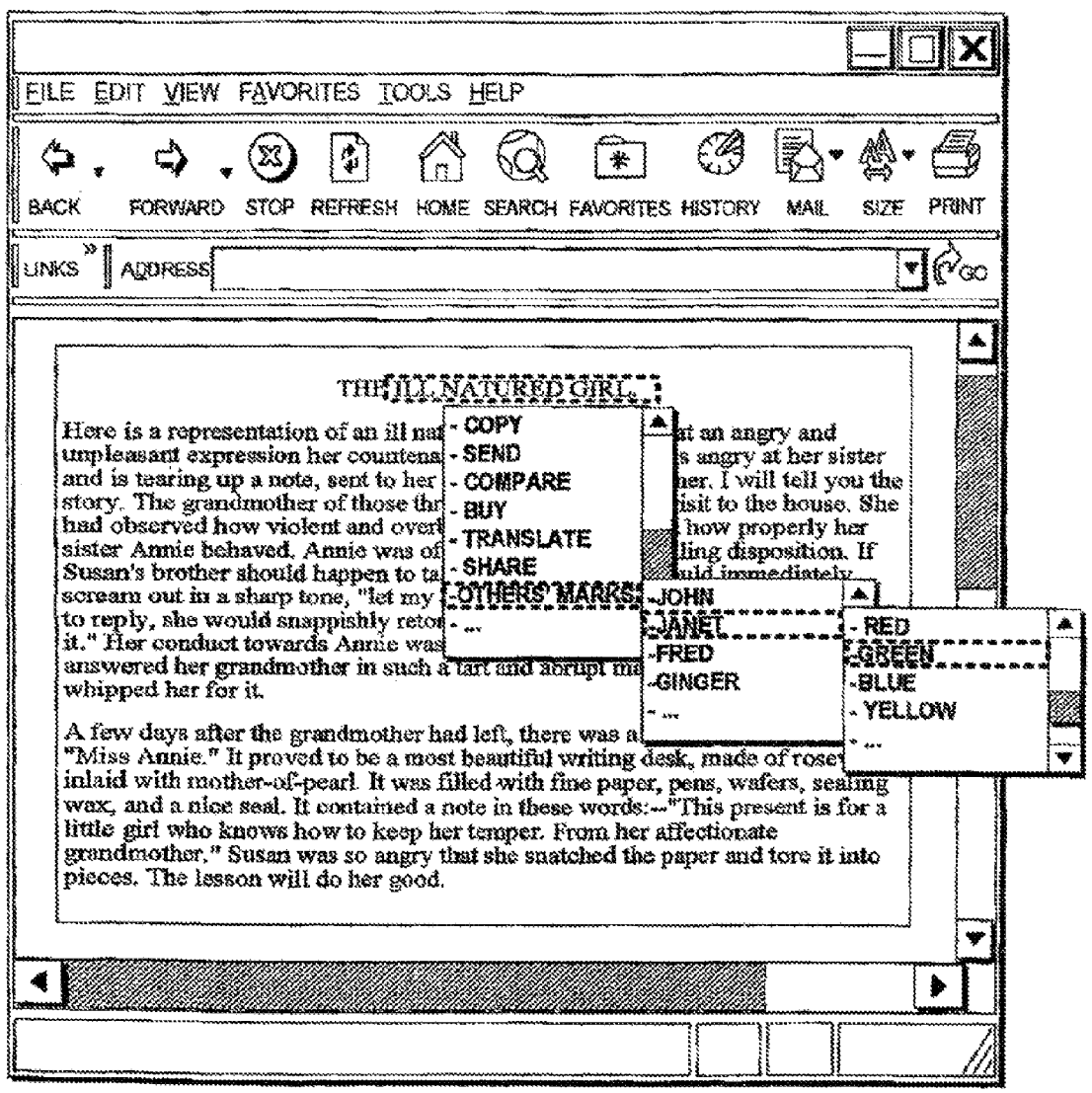
FIG. 9 depicts tiered menus.

It may be useful or interesting for a system user to see what passages or regions caught the attention of other users. This view—regions scanned by others—can be shown with the subject user's markings (e.g., with special markings which distinguish them as to source), or as a separate view of the document altogether. It could also be shown separately from the document. One way of implementing this (and many other) features is by use of options which the user can select (e.g., from a pull-down menu). Thus, the user might select "Show Other User's Marks" (FIG. 8) as one option; or, tiered menus such as "Show Janet's marks in green (FIG. 9). The marks could also be displayed dynamically based on the user's actions. For example, if a user requests information about purchasing a product, a consumer group's (such as Consumer Reports) annotations may appear if permission exists. Some embodiments may also use predictive methods to determine which marks to show. For example, one embodiment may learn that a professor likes to see her class' markings color-coded based on student attendance. In one embodiment, a server may have stored copies of what users have scanned and permissions data. This server may be able to communicate these other scans in a manner similar to communicating a first user's scans, including annotations.

This concept can be extended to allow for one system user to interact with another system user or set of users. The things that the system user reads, and especially those items (documents/locations) that the user marks or indicates, are a good indication of the user's interests. If a user finds something particularly interesting, they may make more scans. If something is not of value to them, they may make fewer scans. Thus, one system user might wish to see the marks of another user or group of users—for example, marks of users having similar interests, who read similar materials on similar topics, etc. Accordingly, the described system may serve as the basis for social or professional introductions (even for dating). A system user may give permission for a server to process their scans to find intended matches. A user may select which scans to base this on (e.g. scans classified as 'work'). A user may then set a threshold pattern (e.g. anyone who has scanned at least half of these). Alternatively, the system user may choose to "publish" their marks, annotations and/or other interactions so that other users can see these. Some embodiments may have a rich set of permission capabilities to determine who can see what, for how long, etc. These capabilities encompass the field of digital rights management, in combination with the else mentioned rule based techniques for determining permissions.

Publishing from Captures

One special form of publishing interactions is in the form of a "Web log" or "blog." In the general form, this consists of making some or all of a user's interactions available to people including the user by providing access to them on the World Wide Web. The system user may be able to select certain kinds of materials to publish (e.g., which documents or types of documents). And/or there may be special inputs the user provides to accomplish this—a special gesture (e.g., a swirled motion, or some other identifiable gesture) of the scanning device, a switch or button on the capture device, a setting in the user's profile (for example, stored centrally, or on the capture device itself), a special mode or state of the device, or predictive techniques based on metadata, or actions of the user (such as scanning common words). The user may be provided with visual, auditory, haptic, olfactory, taste or other feedback or reminder indicating that the material being scanned or indicated is also being published as well. A system user, depending on the permissions, possibly not the one who made the scan, may also select items to publish at a later point, for example when reviewing recently marked items in the user's account, or when a list of highlighted or selected or marked items is emailed to the user. Therefore, in general, one of the functions performed by the described system can be to publish some or all of the user's interactions.

When publishing material of any form that is related to or derived from interactions, it can sometimes be useful for the system user to be made aware when others publish similar materials. For example, if one system user has marked a specific region in a rendered document for special attention, they might want to know when/if other system users mark or note the same (or a nearby) region. Within the described system, this is easily accomplished because the reference or source document or markup data from which users navigate is, in most cases, stored on and/or accessed via a central server. For example, if two separate system users post a particular passage to their respective blogs, if desired they can each be made aware that the other has marked similar or nearby text—even though the users and their respective blogs have no specific connection. Both users at some point interacted with the same reference document, or the separate described systems supporting these separate users can communicate that they both accessed and noted the same material, so this valuable information can, if desired, be delivered to both. In one embodiment, a server may have background processes that once an hour compare published scans for these types of matches.

"Publishing" information derived from the use of the described system in one embodiment includes situations where a user's data is made available to third parties—whether those third parties consist of just one outside individual, or perhaps a entire community (e.g., on the Internet).

While the user can upload to an online account, this is not intended to imply that a user will have only one account. They may very well have separate work and personal accounts, or have one free and one premium account. If the user wanted to avoid advertising, or needed premium content, they may signal to the scanner or to the system to put the information to one of a few accounts. The system may be able to use the meta data to create rules similar to email filters to automatically sort the scans.

Annotations

Figure 10:
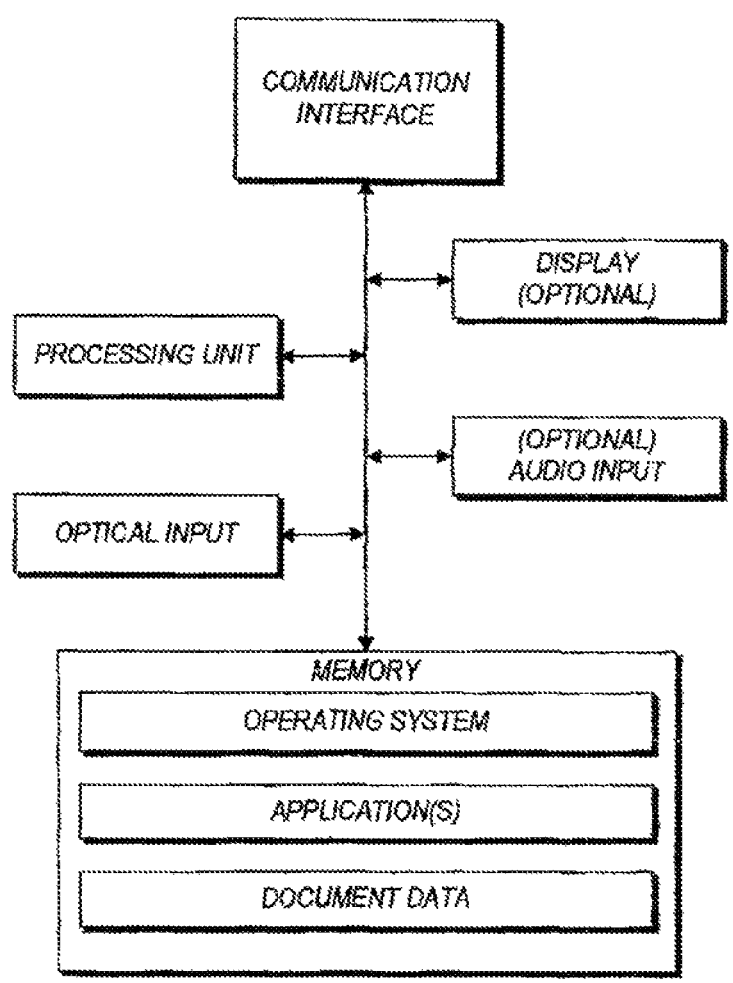
FIG. 10 is a block diagram of a capture device.

Annotations represent a special kind of results. Annotations may be in the form of (among others) voice annotations, written text (either authored by the system user, or excerpted or copied from another source), graphics (in the form of pictures, drawings, etc.), Web links, etc. The described system may predictively create or enhance these annotations. One example is if a user signals that they want a link in a region by pushing a button, one embodiment of the described system may create a link to a relevant website by querying the nearby text through a search engine such as Google's. One example is a capture device that also serves as a voice recorder in addition to its other functions (FIG. 10). With this feature, system users can enter voice annotations via an audio input, for which the default association might be either the previous or next location or region indicated/scanned in the rendered document. The described system would be able to use this as metadata, as well as the text if a speech to text technology is employed. The system may be able to provide the user with the text, sound or a combination thereof. Another related publishing application occurs in education (or anywhere it is useful to know when and how a document was read, and how the reader interacted with the document). In this instance, the system user might be a student, and the document in question a textbook. The student's assignment is to read a specific chapter in the text, indicating items of interest or importance. They might be further instructed to scan any topic not understood, and perhaps to answer questions at the back of the chapter by scanning the correct multiple-choice answers. The answers may be printed with small barcodes to identify them. As mentioned earlier, there are a number of ways a user or the system can signal something about the text (from the Web log discussion). In some embodiments, a student could optionally use these to signify what they found interesting, hard to understand, important, clarifying, or a combination of these.

Academic Applications

The ordering (sequence) and time of each mark made by this student can be noted by the capture device or described system along with many other types of metadata. If desired, this information can be published by the user—e.g., sent to or otherwise made available a third party, for example, the student's teacher. This information might include, among other things, when the material was read, in what order, how fast it was read, what items the user indicated were of interest, what items the user indicated caused difficulty, how the test or review questions were answered. From various combinations of these (and other) sources of information, some embodiments of the described system can determine, or help the teacher to determine, how well the student understood the material, how diligent they were in studying it, etc.

The described system can be a powerful tool for the student. Notes can be taken (e.g., excerpted) simply by scanning or indicating them. Scanning a word can cause it to be pronounced aloud, or display its definition, or cause it to be added to a glossary of newly learned terms. With one embodiment, a user may scan a word. When this word is retrieved, the source copy may have associated with it a recording of the pronunciation (possibly from a text to speech engine). This recording may be sent across a network and then played by a speaker attached to the scanning device. Scanning a word or a topic can place a bookmark at that location (if a context can be determined), or search for that item in a table of contents and/or index. Scanning an item can cause it to appear in a sequential list of study notes. When these notes are accessed via a computer, they can be interactive—for example, by clicking on them the user can view the context in which they were marked or indicated. Some embodiments of the system may provide the student with data as to where, when or what they were the most efficient studying (e.g. most scans). Students may have the option to compare these, or to query a system for other students who have indicated that they are working on the same documents or assignments.

As can be seen from the above discussions, it is often useful (but not necessarily required) to have access to a general-purpose computer, PDA, network or other display and/or computing subsystem when using the described system. Note that the capture device generally has the ability to optically recognize patterns (e.g. text, markings, images) in rendered documents. The capture device may often be associated with users who are working with paper documents. However, the capture device may also be capable of interacting with documents rendered on displays—e.g., flat panel or CRT displays—including displays on small portable devices.

Dynamic Displays, Digitizing Pads

If used in a dynamic display environment, the capture device could function much like a light pen—it would be able to interact with the computer or display by indicating a location or region on the display (or a location in a document). In one embodiment, the capture device obtains its location information from the rendered material itself, i.e., it establishes its location in a document by scanning text or other rendered data, extracting a signature from this scanned data, and locating the signature in the source document. In this embodiment, a computing device operatively connected to this monitor may be able to retrieve the coordinates for this text. In another embodiment, the capture device used location information provided by another source, for example from a touch screen, or timing signals like those often employed in light pens, to determine its spatial location. If the relative location of the rendered document is also known with reference to the spatial location, these two systems can be related, and the capture device's location in the document can be determined. Another example of this would be using an x-y digitizing tablet or digitizing pad—where a document is placed in known relation to the coordinate system of the digitizing device, so that the actions of the user can be translated to actions in the document.

In the cases where the capture device can obtain location information from a non-scanning technology, for example a digitizing pad, most of the functions can be performed without optical scanning of the text or features of the rendered document. Thus, simply having access to location information within the document is enough to enable many of the functions and abilities of the described system. This information could also be determined with more than just the device. The device's position could be determined based on triangulation (e.g. from a radio signal that it transmits) or from very advanced GPS technologies.

Supplemental Data and Markings

In some instances, it will be helpful if the content being scanned by the capture device contains supplemental information. An example would be supplemental markings in a region of text that cause some or even every phrase or word or line or sentence of text to be unique—even if the features extracted for a signature would otherwise be ambiguous. One example would be where two portions of text in the same document are identical in that they contain the same words. Another example would be when two or more copies of a document are rendered, such as magazines at a newsstand. In these and similar cases, the described system may wish to determine which instance or copy of the text or document a particular user is indicating.

Figure 11:
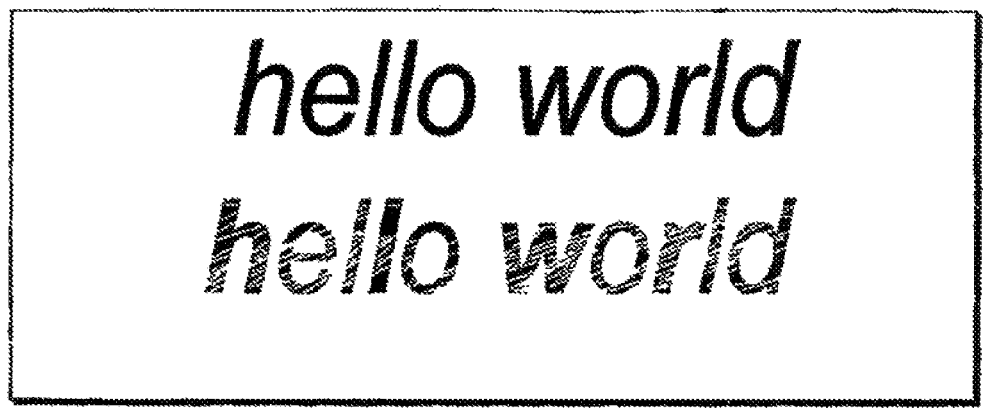
FIG. 11 shows two identical phrases that have been rendered slightly differently.

Supplemental markings that help to identify a location in a document can be provided in many ways. One way, which is illustratively referred to as "watermarking," involves making slight changes to the font, character spacing, word spacing, layout, etc. or a combination thereof, to a document region or regions within a document (or the substrate of a document), so that the document or region can be distinguished from other, similar documents or regions. In one embodiment, there may be two software routines. One is able to recognize characters, and is these watermarks appear as noise. A second routine is able to record the alterations made, and extract data from them. This extraction may be similar to extracting data from a bar code or symbol. To illustrate this notion of regions, a publisher may have a separate region for each article, and articles that continue on different pages could still be the same region. A part of a document could belong to multiple regions; for instance, an advertisement could be a part of the advertising region and part of the region associated with that company. In many cases these markings can be made such that they do not interfere with the user who is reading the document—indeed, in some cases they may be made unlikely to be noticed to the reader (e.g., due to their small size, or through the use of non-visible inks and the like). FIG. 11 shows two identical phrases that have been rendered slightly differently so as to be distinguishable via watermarks (the differences are enhanced to illustrate the distinction, and may be less noticeable in other embodiments of the present invention). These watermarks could also be chemical, some capture devices may have special sensors to detect trace amounts of materials, chemicals or other substances in the document, what the document is rendered on, on from what is used to render the document.

Another form of marking (or watermarking) involves printing special marks beneath, beside, next to, etc. a region of interest, such that these marks are read with and associated with the region in question. Examples include underlining which includes variations (such as Morse Code-like dashes and dots), special codes at the end of lines or in the document margins (such as 1-dimensional or 2-dimensional barcodes), or infrared/ultraviolet or any detectable type of ink printed under, over, or near a region of interest. Note that infrared/ultraviolet ink can carry a great deal of information, but may be invisible to the human eye. These special marks may be identified by their location in relation to an identifiable character or region. Data may be extracted in a manner similar to other bar codes or symbols.

In some cases where supplemental markings are used, it is sufficient to identify a region merely to distinguish it from another similar region. That is, the supplemental marks may not alone identify the region or location being scanned; rather, they serve to distinguish this region from another region which otherwise might be confused with it. To illustrate, imagine a document with four regions. Two are primarily blue, and the other two are primarily red. A red region would not be mistaken from a blue region, but a system may need assistance distinguishing two regions of the same color. One blue and one red region may both be marked with a symbol indicating '1'. A system would need both the '1' (or the lack thereof) and the color to determine which region is being interacted with. Another example would be a document where it is desirable (for whatever reason) for the described system to be able to recognize each individual rendered word in the document, such as phone numbers in a phone book. This technology could allow someone in an office to scan a name and the described system could match that to an email address, phone or fax number. Some embodiments of the system may allow it to be linked such that the phone is dialed. Nevertheless, duplicate words in the document all appear the same. To address this, a simple infrared/ultraviolet ink (or even infrared/ultraviolet depicting display device) barcode might be printed over each word; this would be invisible to a user, but would, alone or in combination with the visible text, uniquely identify each individual word (possibly down to it specific position on a page or location within a document). This concept could be used with anything that a sensor could detect. Even if the substance cannot be placed finely enough to only cover the word, a combination of substances could be placed with the document in such a pattern that a sensor or combination of sensors could find where in the document the user was. One example would be a page that has a decreasing amount of ultraviolet ink verticality and infrared ink gradiated horizontally across the page. A pair of sensors could determine the amount of ink to produce coordinates as to where on the page the scan is being made. This could be useful to allow users to annotate what looks like blank paper.

Rights Management

Permissions, copyrights and digital rights management generally, have an intersection with the described system. Embodiments described above illustrate how one user's markings in a rendered document can be published so that others can view the markings. In some embodiments, these other people may not have access to a scanning device.

Assume that a system user is marking a printed publication, perhaps today's issue of a newspaper. The system user would like to publish their marks, and perhaps some associated voice and written annotations at the marked locations, to an audience beyond themselves, including perhaps other readers of the newspaper. Assume further that the system user has a valid right to personal use of the document in question—e.g., that their copy of the newspaper was legally made with permission of the copyright holder.

Note that, generally speaking, the system user's right to own and read the paper does not always extend to publishing large portions of that document—marked or otherwise—for other readers to see. Also, note that the marks made by the system user may not themselves necessarily an infringement of copyright laws. When published separately, with little or no content from the original publication, these marks may be considered a separate work. On the other hand, a second user might take these notes, use them with a legally acquired copy of the underlying rendered document, and so reconstruct the combination of document+notes.

It is important to note that at no time in this process was a copy of the underlying rendered document made. The user who originated the annotations or notes or markings was the sole source of these materials, they are published unaccompanied by the associated rendered document, and they can only be seen in context when a valid copy of the associated document is obtained. The relation between these supplemental notes and the associated documents can be based entirely on relative position within the document, e.g., as offsets, and no portion of the associated document needs to be published along with the notes. This system could also be used to present one user with annotations of other users at the same time. In one embodiment, this may appear with a first user's annotations in blue and a second set in red. One way to choose these annotations may be by selecting user groups. Another embodiment would allow users to rank or score annotations such that future users are able to request annotations based on feedback from other users (e.g. all annotations that received at least ⅘ with at least 80 responses). One user could weight the scores of users based on any available metadata, such as who they are or where they were. The system could use feedback: (either explicit or implicit) to determine which annotations the user will be presented. For instance, the system may use morning annotation downloads to determine that this user likes the have the annotations of a particular columnist appear on his morning newspaper's sports section. In one embodiment, this may be computed with Bayesian statistics (e.g. given this paper at this time, what is the likelihood of selecting these annotations), and once a threshold is met, these annotations could be automatically retrieved.

Publishing Models

A further optional refinement on this system is where the published notes are not generally visible to the public. Rather, they are only released to a user who provides evidence that they do, indeed, have rights to a rendered document to which the notes apply. One way to accomplish this is to place these materials behind a secure, protected firewall, and only release them when the requesting party provides the correct authentication (e.g., through some form of identity verification system, such as a cryptographic smart card system or biometric authentication system). In one example, this authentication may be a capture device scan of the region of text with which a particular note, annotation, or piece of supplemental material is associated. Note that the scanning device can encrypt or otherwise encode the material being scanned—with the result that only a valid capture device, which has been presented with the rendered document (or a replica thereof), can gain access to any related materials.

The enhancement described above can be applied to other situations as well. For example, the source of the supplemental materials might well be the author or publisher of the rendered document, and they wish to provide supplemental materials (including, perhaps, materials contributed by the readers of the document)—but only to readers who have access to a capture device. This could occur, for example, if the document's publisher was entitled to some compensation when these supplemental materials were accessed or used—such compensation being triggered when a system user scans the related regions of the document, or otherwise identifies the document to the described system, and agrees (explicitly or implicitly) to pay for this additional access. The capture device may be able to accept payment. It may have the ability to connect to a network because of the described system and may be able to provide a secure, encrypted, connection. One way the device could collect the data is by scanning the credit card itself (which may also have the watermarks referenced earlier for security). It could also be a situation where the system has this information and the user scans something, possibly a fingerprint, for biometric identification. In one embodiment, a user may hold down a button while scanning to indicate that the scanner is imaging a fingerprint. This image may then be compared to a known fingerprint image.

Figure 18:
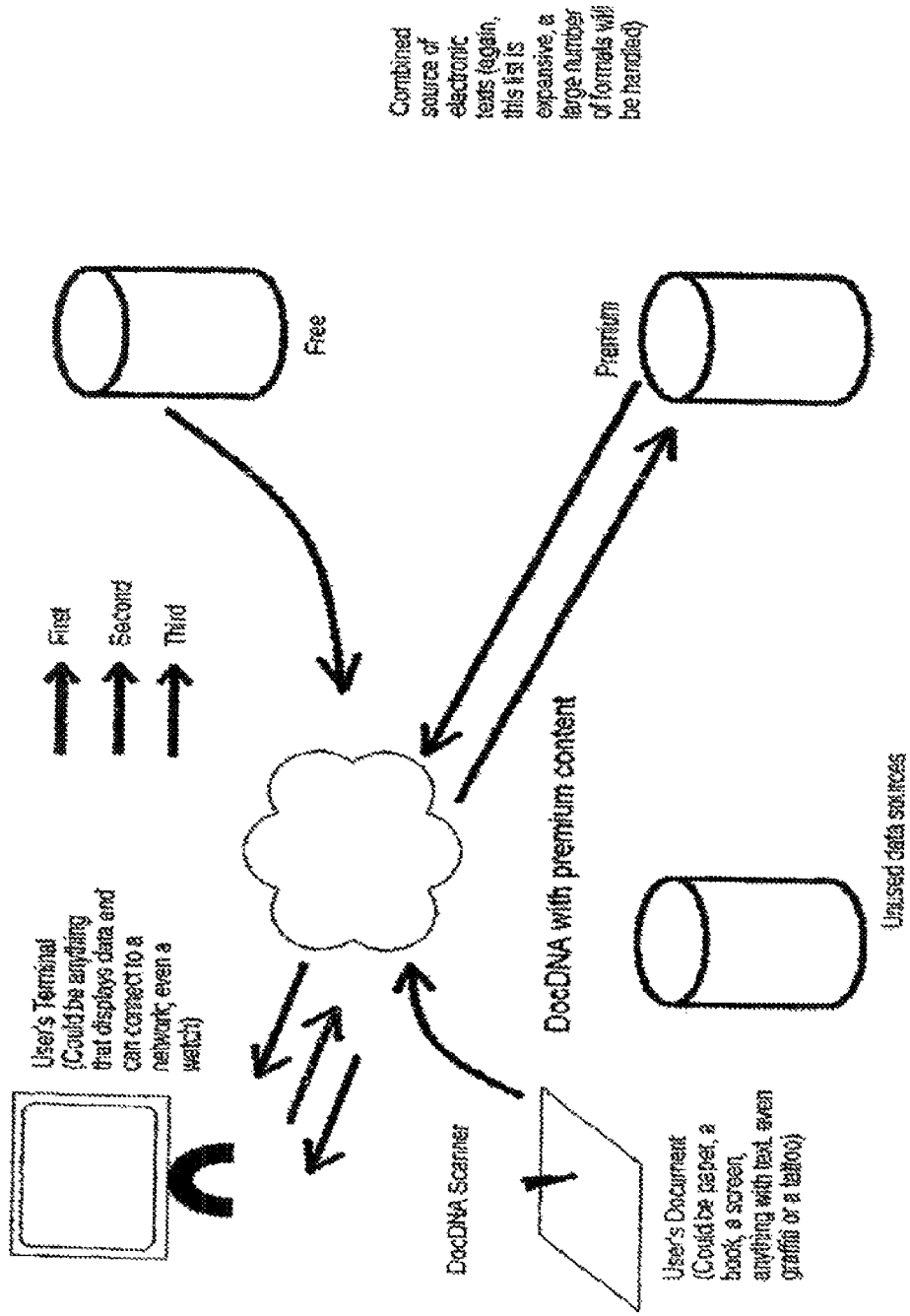
FIG. 18 is a block diagram of a system that provides premium content.

This concept of supplemental materials also leads to the concept of documents whose access rights expire, begin or a combination thereof, or which have additional aspects not available without special access or permissions—in some cases requiring an additional fee to be paid. For example, a book or magazine may be published with additional materials available to users who have the correct permissions. One example is where the user scans a document, the system determines that it only exists as premium content. The user could then opt to purchase it and the system would deliver the content (FIG. 18). Another example would be a soon to be released movie, scans of advertisements for it may be enabled later. If a user scans an advertisement, they may not be able to retrieve certain supplemental materials from their account until a later date. In some cases, the initial purchase of the rendered material would include access for a single user account to the supplemental materials, perhaps for a limited time—but a subsequent user would need to pay a fee to gain access to these materials. This control of access permission could utilize a centralized server model, or may actually be integrated into rendered document or the capture device. For example, in one system, the rendered documents are printed on special paper that is modified by the scanning process of the capture device. Once a document has been scanned in such a manner, its permissions may thereby be changed (either by no longer providing access, or by only providing access to the specific capture device that performed the scan). This system could draw on all models of e-commerce for ways to allow purchases. The accesses could be bought in bulk (such as with a cell phone plan), by time, by location (e.g. in a shopping mall) or any other way that might be of interest to a rights holder. The payments could also draw on the full range of the art, from one-time payments, to micro-payments, bargaining of other rights, to payment plans and every other payment scheme. The price could be determined using any number of schemes, including, fixed price, auctions (any type, Dutch, reverse, etc.), based on metadata from the user, system or both (as a document becomes more popular the price could change, or the price could change when a news article comes out).

The users may also be able to sell their information. For instance, a magazine may provide free access to their otherwise premium content if the user will give the publisher information as to what they scan with time-stamps, but the user can withhold the GPS coordinates of where it was read. This exemplary magazine may issue a password to a user. This user in turn allows their time-stamped scans to be forwarded to the publisher. If the user changes these permissions, the magazine publisher may be notified electronically, and disable this password.

Capture Device, Capture, and Document Identities

In the above example, the concept of individual users is assisted by the capture device having a unique identity. That is, when the described system receives scan data from a capture device, that data may include the specific identity of the capture device being used. This data may also include additional information about the user of the capture device, or such additional information might (in all or part) be determined by looking in a separate data store (i.e., not on the capture device) which associates a distinct capture device with an individual user. Other embodiments may provide non-unique identity information, possibly none. For example, subjects in a psychological study may all have one of two identifications, either control or hypothesis. Some capture devices may be connected to the described system by a wire, in which case no unique information is needed. In one embodiment, a scanner may have hundreds of globally unique identifiers. When a scan is sent to a server, one of these identifiers may be chosen pseudo-randomly and attached to the transmission. Such an embodiment may be able to mark certain identifiers as "compromised" (e.g., they have been stolen). In one embodiment, a server may be able to detect if an identifier comes in out of order (where the server has a copy of the scanner's pseudo-random seed). In one embodiment, a server may be able to detect if one identifier is used too frequently. In these embodiments, a server may be able to identify these identifiers as compromised. Such a system may be able to notify a user or disallow these identifiers.

Similarly, a document being scanned, as well as regions within that document, can have a unique identity to the described system. This identity can be established via embedded watermarks, explicit codes or marks printed on the document (human- or system-readable), etc.

Some embodiments may even assign globally unique identifiers to each scan based on the above techniques, other metadata or a combination thereof. In one embodiment, an identifier may be calculated based on a time-stamp, a GPS reading, the text captured and a pseudo random number.

If capture devices have identities that associate them with users, it will be useful if this association can be changed when desired. For example, if a user borrows your capture device to make marks in a document, it would be helpful if the user could indicate this temporary assignment of identity to the capture device or system, so that their marks in the document are correctly delivered to them. This can be accomplished by use of settings in the capture device (or a connected device), or automatically by using biometric (fingerprint sensor, retinal scan, etc.) or other identifying information to conform the device to a particular user. For example, a user may be able to form a special gesture to indicate a change in user. This user may then scan their fingerprint (as described elsewhere). A server may then match this fingerprint to a user account. The scans may then be treated as associated with this account until the user settings are changed back. This can also be accomplished through a system interface, either before, during or after. For instance, a household may set that the living room scanner will be used by their babysitter every other Tuesday night from 7-9 PM. If the babysitter then works until 10 p.m., one of the parents can make that scan data available to the appropriate user group.

There may also be cases when one capture device is used by two or more people, or used for a specific task where multiple people or targets would like to receive and/or have access to the data generated by that device. This gives rise to multiple associations for a capture device, such that any data generated may be delivered, in all or in part, to multiple targets (e.g., accounts, people, email accounts, etc.). Such an association may commonly be set on the business or department level, or may be applied on a "loaner" basis from schools or libraries as providers of the capture devices.

Note the similarity of this concept to the blog publishing earlier. In that example the materials from the capture device were published to the Internet—here they might be delivered directly to the email accounts of multiple users. In general, the data from a capture device can be handled as any data source can—it can be split, broadcast, posted, mirrored, etc.—and these actions can be automatic, or user-initiated, dependent on content, happen unless the user acts, determined by the system, etc.

Publishing Models

As mentioned above, material derived from the capture device, or associated with it, may involve possible licensing issues. It may be the case that an individual system user does not a-priori have the right or permission to excerpt and publish the underlying rendered document with which the system user is interacting. However, it may be advantageous for the copyright owner or licensee, or the document publisher or author, to allow (or even encourage) the re-publishing of excerpted material. To this end, any of these authorized parties may provide permissions to the system user groups. In this case, it will be very useful if the described system itself is aware of these permission and rights issues, so that individual users don't need to be aware of this for each document they use, and also so that publishers or other rights-holders can grant these permissions by dealing with very few (or even a single) entity. In this model the rights holder might notify the described system or system operator that a particular publication—or portions thereof—can be excerpted, or that certain qualifications must be met, or that certain groups can have access, or any other combination of metadata. For instance, a magazine publisher may want to provide access to its latest publication to people in a certain city if they read competing magazines. Conversely, the rights holder might specify that certain documents or portions of documents can not be excerpted (e.g., by adding particular marks to a rendered document, or by registering a document with the described system as "not excerptable"). In either case fees for use of the material, and/or fees for the services provided by the described system, or an exchange of rights or any other type of bargain might be used. For example, say a user scans a political brochure. This scan data may be sent to the server along with a scanner GUID. A server may then retrieve any metadata associated from this account, e.g. this person lives in zip code 98104. Later, this user may want to email a copy of the excerpted portion of this brochure. A server may see that users in zip codes 98104 are allowed to email excerpts, providing the user with a seamless experience.

Note in the above discussion the ability of the described system to be aware of permissions-related issues, to block or allow excerpting/publishing/posting/forwarding/etc., and to notify the system users whether a document or region can be excerpted. The user may be notified by the device, possibly in real time, or later by the system. Earlier discussions provide examples of ways this could be implemented. In some cases, documents themselves will carry human-readable marks that indicate that excerpts from this document are allowed (as well as a mark or indication that the document is known to and/or indexed by the described system). In other cases, this information may be provided by visual or other feedback to the user of the described system in real time. And, optionally, one of the menu items generally available to the system user could include "About This Document"—whose selection might lead to copyright and permissions data, information about the author(s) and publisher(s), date and place of publication, or many other kinds of information relating to the document, or a combination thereof. In such an example, hidden or derived (e.g., from barcodes and the like) text may modify the options and menu choices available within a document.

Of interest to publishers may be the system-related data about how many people are reading a particular document, when and how they are reading it, what marks or interactions they have had with that document, and any citations or marks or annotations the readers have made for themselves or for the use of others.

System and Device Security

Generally, the described system deals with potentially very private data—what documents system users are reading, what they find interesting or important in these documents, etc. When commercial activity is involved (possibly referred to as "Paper Commerce" or "P-commerce"), these transactions also potentially involve privacy concerns. Thus, the described system will benefit if security and privacy concerns are optionally addressed in the system.

The capture device used by the system user may include encryption such that traffic with the device cannot be interpreted without knowledge of a special key or keys, or other encryption means (e.g. can only be viewed in a certain place). If this key, physical or virtual is securely in the literal or figurative hands of the service provider/server, then the user's actions are only known to this party. Many forms of conventional networked and storage security may be employed at both the capture device level and through other devices in the described system. The described system may employ combinations of security techniques, and some embodiments may allow for security upgrades.

Similarly, the data returned to the system user—perhaps directly to their capture device, or to their online user account, or to their email account, etc.—can be encrypted so that a party without the key would find it hard or impossible to determine the content.

The described system may also transmit data with no content. Among other reasons, this prevents those without the key from knowing how much the user is using their capture device. It would also create obfuscation to make it harder to break the encryption.

Overview

Generally, the described system involves a user who is interacting with a rendered (e.g., printed, displayed, etc. as discussed elsewhere) version of a document. In addition, generally, the described system works by separately making reference to a digital "source" or "reference" document associated with the rendered document being accessed by the user. This reference version may exist prior to and/or during the user's interactions, or it may be acquired by the described system at a later time—in which case, various interpretations of the user's interactions can be applied after the fact. The reference document could even come into being later; for example, a user may use their device on an old book. Later, conventional OCR (e.g. a flatbed scanner) could be used to create a reference copy of the book. The reference document may indeed be the "source" from which the rendered version is produced; it might be a scanned-in copy (and perhaps have been converted to ASCII text via an OCR process); or it might have been obtained some other way (a copy of the original source, a full or partial composite derived from overlapping scans by capture devices/users, converted to text from a reading, etc.).

The described system can also optionally make use of many sources of additional information to enhance the interactions with documents—such as, prior and subsequent behavior of this particular user, the actions and behaviors of other users in this and in other, related documents, the time of day, the location and environment of the user, what equipment the user has at hand, whether the user has a communications connection between their capture device and their local PC, PDA, cellular telephone, corporate intranet and/or corporate server and described system, centralized described system, etc. and any other metadata, including that provided by other parties. In one embodiment, these system interactions may be stored on a hard disk drive after being received from a scanner. With such an embodiment, a user may be able to view scan results on a website. While viewing a retrieved document, a user may be presented with the option to view a summary. This summary maybe composed of the sentences or paragraphs most frequently scanned by other users, In many cases, the described system is concerned with "navigation." That is, the described system strives to determine where in a document the user is (and in which document)—and then, based on this location information, to provide the user with a host of useful services. Often these services are immediately related to marking or manipulating text—e.g., mark this passage, excerpt this phrase, place a bookmark here. However, the derived service can become quite abstract—e.g., pronounce this word, post this to my blog, introduce me to other users who also marked this passage, etc.

Many of the services, actions, results available to the user of the described system (as well as to content authors, publishers, advertisers, instructors, etc.) are derived from the document location-based data which forms part of the described system. In many cases these services (which sometimes comprise a literal or figurative "menu" of choices for the user, some of which may be enabled and acted on by default) are associated with locations or regions within a document. These regions may sometimes conveniently be thought of as having geographical, two-dimensional extent—wherein the regions may be wholly distinct, overlapping, or in complete registration and identical.

As an example, consider the case of advertising and "page geometry." An advertiser might wish to make a special offer to a user, and notify the user of this offer by with a visual or auditory cue, whenever a user scans text which is positioned adjacent to a printed ad in the rendered document. In this instance, the geometric nature of the association is clear, applying to the region of the document in immediate proximity to the advertisement. With one embodiment, a user may scan this adjacent text. This scan is sent to a server. When this text is retrieved, there may be data associated with it indicating that qualifies for a special offer. This offer may then be stored or sent to a user's account. In one embodiment, a content owner may be able to submit source copies of documents that embed these offers or other data with XML tags. In another embodiment, a source document may exist on a server and be associated with information about its layout. This exemplary special offer may be communicated to the system with a programming language such as post script.

Figure 12:
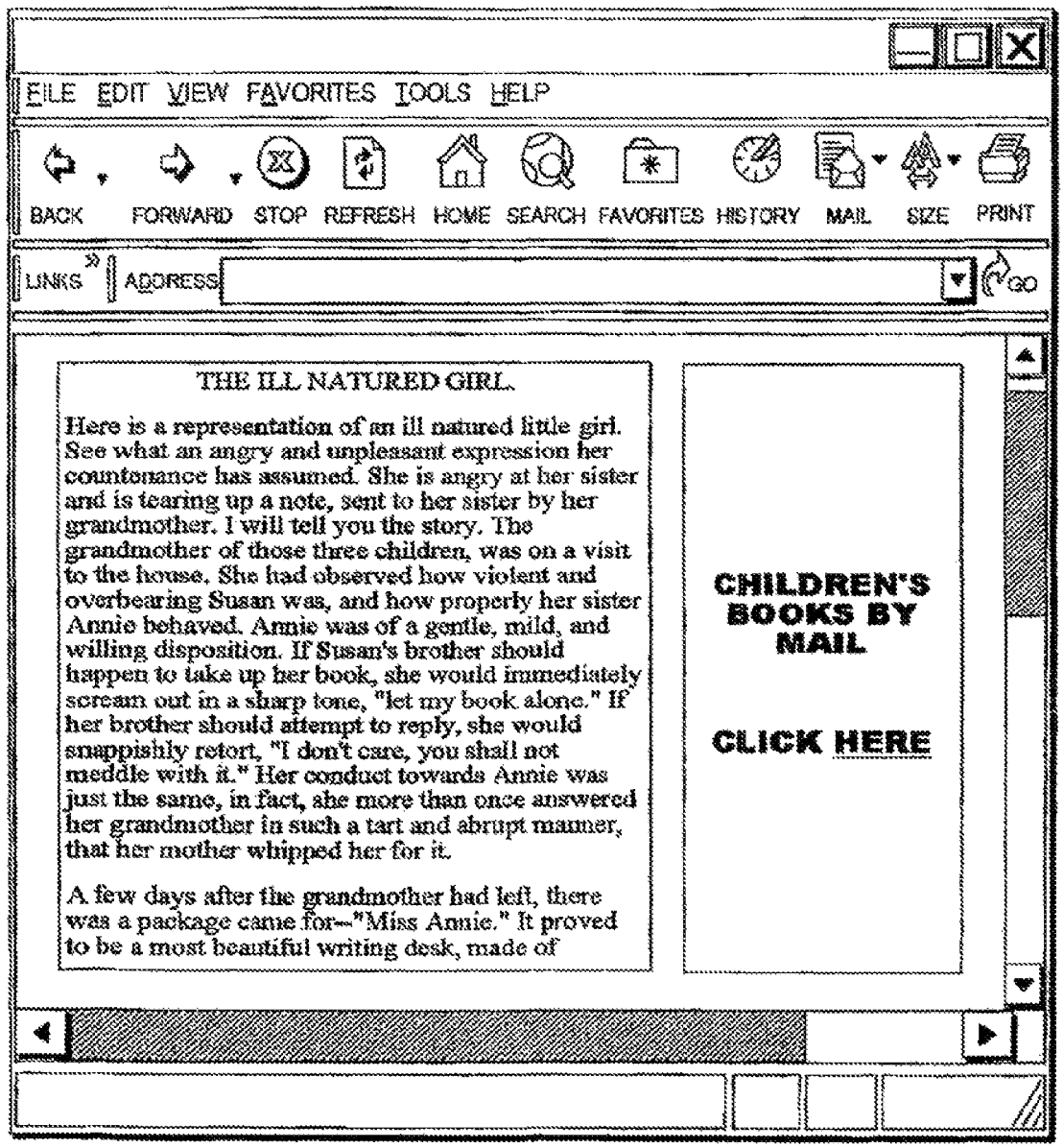
FIG. 12 depicts an offer.

On the other hand, described systems can also make important associations with abstract entities, not directly related to a single physical position, but rather distributed across multiple locations, or derived from logical combinations of elements, rules and other abstract relationships. An example here might be associating the action "offer the user a 10% discount for product X" with the rules/actions: "whenever the user scans a total of 3 or more of these 12 keywords from any of the following regions of text"—(FIG. 12). Alternatively, perhaps, "offer the user the opportunity of coming to our website whenever they scan our corporate name or one of our trademarks or keywords." In one embodiment, software routines may be triggered when a user accesses their account. One of these routines may retrieve from storage elements, rules or other relationships. One of these routines may retrieve the relevant aspects of the scan history. One of these routines may process this usage data in light of these logical combinations. One of these routines may then change how this account is displayed (e.g. adding a special offer in the upper right hand corner of the screen).

The locational basis of the described system, and the potentially rich and complex nature of the derived actions and interactions, serve to distinguish the described OCR from the related field of "document imaging and retrieval."

In one embodiment, the described system uses information coded in the rendered document image, with optional assistance from supplemental markings, to determine a location or document. In many cases, the information available to the described system at any point is obtained from many sources. Indeed, even location information is not necessarily given by each scan, but may, in some cases need to be inferred from prior and subsequent scans—for example, relying on the assumption that scans which occur near in time are likely also near in space, that scans in the same font are likely in the same document (especially if no intervening fonts have been seen), etc. as describe above with regard to aggregate disambiguation.

It is important to note that the system user is interacting with a rendered version of a document, but their actions are interpreted in relation to a reference or source version, or a copy derived from these sources, or markup data or processes.

An example of this might be where a user is reading a newspaper article in their morning paper. As they read, they are also indicating items of interest with a capture device (which has the ability to optically scan the text and other features the user is indicating). However, the capture device may not know more about the newspaper being read than it has scanned.

In the described system, data scanned with a capture device are optionally referenced to a source document, in this example a digital copy of the newspaper or article being read.

Thus, data is not necessarily taken in isolation, but rather looked up in and employed or interpreted with reference to source (or reference) materials. Because these source materials optionally include the entire text of the document, as well as, in some cases, supplemental information (e.g., knowledge about layout, related documents, hyperlinks to the internet, separate annotations, copyright and permissions data, updates, errata, etc.), data scanned with the capture device can be further interpreted, and additional actions and interactions are enabled (such as those described above).

Layout Independence, Template Matching

Layout-independent features are those features that are independent of a particular rendering of a document. That is, they do not depend on such issues as font, font size, color, line spacing, margins, etc. In some cases, layout-independent features may be described entirely in terms of the text contained.

One example of a layout-independent feature, and one which is useful in some applications of the described technology, is the relative offset of repeated characters—i.e., how many character positions separate each letter from the next occurrence of that same letter. Note, this property has no dependence of font, character spacing, layout, etc.—i.e., is independent of any particular rendering. By using repeated characters or objects it is possible to effectively use each character to recognize the next occurrence of the same character—and thus remove any consideration of what that particular character is or represents. Similarly, by measuring separation in "character positions", rather than measuring distance, it is possible to remove most or all lay-out constraints ("most" because of a few situations, like hyphenation, where characters may be added or removed depending on lay-out—these can be treated as special cases, and the described system can be given special knowledge to handle them when they arise).

Figure 13:
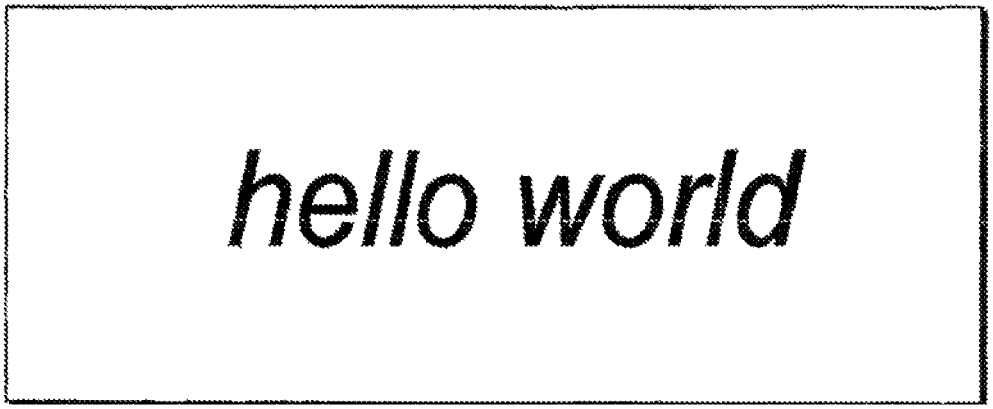
FIG. 13 depicts a phrase.

By way of further explanation, Consider the phrase, "hello world" shown in FIG. 13. Imagine having no knowledge of the meanings of the individual characters—but instead viewing them as simple symbols or objects. It is possible to see that the "h," "e," and "l" are different and distinct—without associating them with a letter in the alphabet.

One way of recognizing location in a document, which the described system might employ, is template matching. In this technique, the described system is not required to have any special or advanced knowledge of fonts, character shapes, word shapes, etc. Rather, it only requires some basic general knowledge and a few rules. In this template matching approach, individual characters found in the scanning process are used as templates to identify subsequent occurrences of the same character. This process is very similar to, and can benefit from many of the same algorithms and procedures as convolution or auto-correlation.

In one implementation of auto-correlation, a region of text is figuratively "slid" horizontally by itself. The process watches for when entire connected regions exactly or nearly match each other—these are considered to be matching tokens or objects.

Each of these objects (which may be letters, digits, etc., but which the described system may choose to simply consider an unknown, but unique, entity) creates a pattern according to the spacing between its repeating occurrences; and the aggregate pattern, formed by the separation between all of the characters which repeat, forms a signature which the described system can use to identify, or help identify, the text being scanned. See below for a further discussion of one type of signature identification.

The pattern and/or signature formed by this sliding template self-matching technique is remarkable in several ways. First, these patterns are a very useful signature. It turns out that the pattern of offsets generated by sliding template matching is nearly as good an identifier of a location of text as the original text itself. That is, if a particular phrase is unique, the character offsets between its repeating characters is also likely to be unique, or nearly so. If "hello world" is unique in a document, there is a good chance that the offsets derived from this phrase (e.g., hello world=>0016360000— where the middle and trailing spaces match with offset 6), or a slightly longer phrase (e.g., "hello world is unique"=>001636000003607400000) is unique as well.

Figure 14:
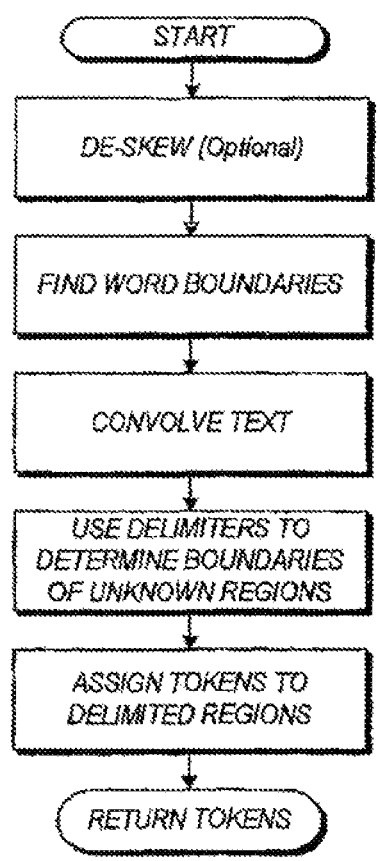
FIG. 14 is a flow chart of a process for assigning tokens to delimited regions.

Second, these signatures can be generated without specific knowledge about letter shapes, fonts, etc. In one embodiment the steps involved are:

1) Establish the base line.
2) De-skew (optional, some systems may be able to work with skewed figures because skewed matching figures may be able to match other similarly skewed figures).
3) Find word boundaries (optional if system uses indexes starting at every character position).
4) "Convolve" or "auto-correlate" text, find matching regions.
5) Use any matched regions as delimiters to identify left and right boundaries of new, unknown regions.
6) Taking delimited regions as tokens or objects, calculate (i.e., count) the character position offsets—(FIG. 14).

OCR from Templates

Figure 15:
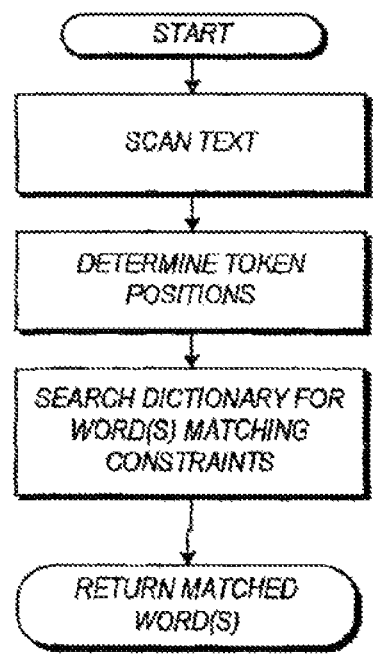
FIG. 15 is a flow chart of a process for searching a dictionary for word(s) that match constraints of a phrase.

Third, is that these offset signatures can, in many cases, be turned back into the text from which they were derived. That is, this offset-based approach, with no regard to, or knowledge of, fonts or character shapes, can nonetheless be used for character recognition if so desired. The process involved in this character recognition or text regeneration is, in one embodiment, the following:

1) Scan text.
2) Obtain character positions as detailed above.
3) Search a dictionary of the appropriate language for words that would meet all constraints of the phrase. (FIG. 15)

These constraints are derived by examination of the matching character positions found in the sliding template matching process above. The constraints follow from the observation that for each character position, without knowing what the letter at that position is, it is possible to know where in the phrase the letter does and does not occur—since that is the data derived from embodiments of template matching.

Figure 20:
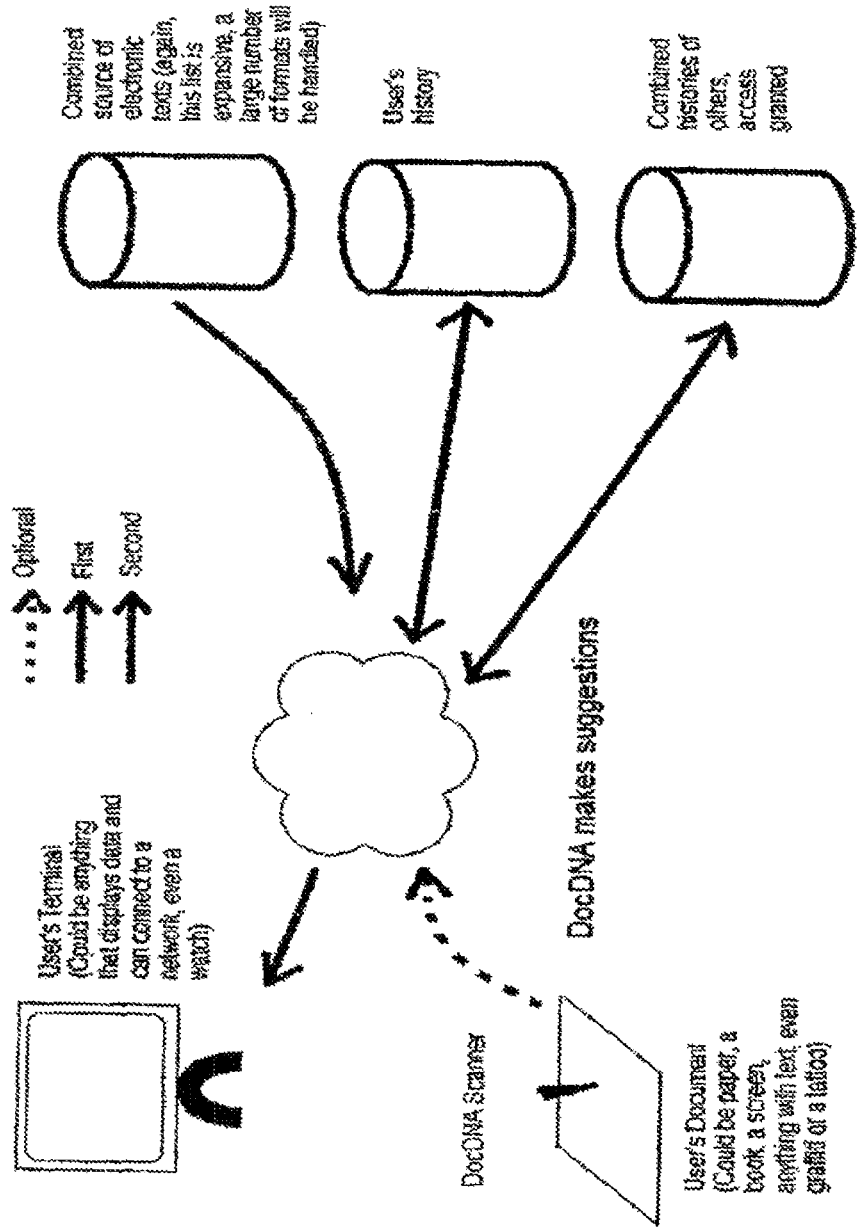
FIG. 20 is a block diagram of a system that includes a combined source of electronic texts and user's history.

It is helpful if the dictionary includes word frequency data, e.g., the relative frequency of each word in the language, or the frequency each word occurs in a large corpus (FIG. 20). In considering various words for the various word positions in the phrase, it is helpful to first consider the most frequent words—as these have a higher likelihood of being correct than lower frequency words.

In fact, it is actually very helpful for any trial phrase (collection of words to be tested to see whether they meet all the necessary constraints) to calculate the aggregate probability of that phrase, defined for this purpose as the product of the probabilities of each of its constituent words. It is possible to then process candidate phrases in order of decreasing probability (i.e., most probable first)—this adds great efficiency to the process described.

It is also helpful, in cases of ambiguity, where more than one phrase matches all the constraints, to consider word and phrase probabilities. Here grammar is useful to help decide among candidate phrases (the chances of an arbitrary collection of candidate words both matching the offset constraints and being grammatical is quite small). In one embodiment, a server may store text strings that are known to be grammatically incorrect (e.g. "and but"). If a server determines that this phrase is a candidate phrase for an identifier sequence, a software routine may be run to see if this phrase is on a known bad list and then removed from the list of candidate phrases. In one embodiment, candidate phrases may be sorted by their frequency in usage. In one embodiment frequencies may be stored for fixed length word strings (e.g. "patent bar" may comprise 0.003% of the two word phrases in English).

Given a set of candidate phrases, it is useful to process them in order of decreasing frequency. This suggests that the trial phrases be constructed and evaluated in order of decreasing probability. This is not entirely trivial, since each word position involves candidate words having their own distinct probabilities—and the choice of any candidate word impacts the choice of other words by virtue of the limitations each letter present at any position in a phrase places on all other letter positions. These limitations or constraints can be simply stated: if letter "i" is selected for position "j" in a phrase, all matching letter positions (as determined by the template matching/character offset process) must also be filled in with letter "i" and letter "i" cannot appear in any of the other character positions of the phrase.

One approach is to begin with longest words first, since they are likely to have the most constraints and internal structure (i.e., repeated internal letters)—hence the fewest candidate matches. On the other hand, if word n-gram data is available, it is possible to can profitably begin by searching for the possible matches to the longest n-gram.

Note, in many respects, the space represented by repeated letter positions within longer words is rather sparse when 2-grams, 3-grams, etc. are employed. To see this, consider a seven-letter word that appears next to a 9-letter word. For each of these words, it is useful to consider how many ways different letter-objects could be assigned to create a word pattern having internal matching structure (the same character(s) appearing at two or more locations). Starting with no knowledge whatsoever of language and word structure, it is possible to observe that the possibilities range from having all the characters identically the same (which we can represent as 111111111) to having every character different (which may be represented as 123456789). Of interest are all possible variations between these extremes. Note that, because no knowledge of letters is assumed, letter shapes, etc., it is not necessary to distinguish between the cases 111112222 and 222221111—that is, letters are the same or different, and it is not necessary to determine what the characters actually are (though also note that such knowledge can be subsequently added to the described system to good advantage—having the ability to actually recognize the difference between an "a" and an "e", e.g., by recognizing shapes of these letters, can add a great deal to the described system—though it is not required in the embodiment being described here).

Continuing on the topic of sparse spaces: It is possible to determine that the number of permutations of 9 items, where unique identities are not assigned to each item, but rather note is taken whether any of the 9 items is the same or different from items in the other 8 positions.

Consider the 10-letter word "reasonably." Note the occurrence of each symbol as encountered from left to right, and give each encountered symbol a sequential number, the representation is obtained:

reasonably=>1234563789

Note that the third symbol encountered, the "a" is repeated in the seventh position; all other characters are unique in this word.

In the model wherein symbols are recognized when they repeat, but otherwise simply noted that they are unique, it is possible to re-represent "reasonably." Using the character "u" for the position of each unique letter (letters which occur only once in the word) and assign sequential integers ('1', '2', etc.) to each character that repeats. In this alternate notation "reasonable" would be represented as:

reasonable=>u12uuu2uu1

Academic Applications

In various embodiments, the described system can be used in academic settings. A test can be given to students printed on paper, and these students can indicate their answers via scanning. These answers may be True/False, multiple choice, find all correct answers, or other evaluative formats. A student may be asked to find instances of incorrect or correct grammar, spelling errors, words or phrases having a specific property, or other text. For example, a student might be asked to scan all verbs, nouns, independent clauses or other elements of a language. With some embodiments, such as multiple choice, students may select answers by scanning an icon. With some embodiments, such as finding grammar elements, students may scan text. Given a context, a student may have to scan only a short phrase. With one embodiment a teacher may be able to enter the correct answers into a server. Students could then upload their answers and receive a score immediately.

A student might be given a reading assignment and asked to underline important aspects in some written material. Alternatively, to annotate and comment on a written passage by scanning at one or more points and then adding written or voice comments (e.g., with a word processing pro gram).

A data stream from a capture device may be automatically or manually analyzed. In an educational or academic context, this data (or its analysis) might be given to a student's teacher. This teacher would be able to see whether a student marked the important passages, read this material carefully (or at all), or other aspects of their performance. With one embodiment, a student may start (and end) an assignment by scanning a symbol for this assignment. A server may interpret this encoded data to signal not only a given assignment, but also permission to send these scans to an account accessible by the teacher. In one embodiment, a teacher may be able to view these scans in the same manner as a system user views other user's scans. In one embodiment, a teacher may be able to receive a score for each student.

In one embodiment, questions, quizzes, or tests may be printed with some material. For example, questions may be printed in the middle of this material, and a student may be able to answer these questions via scanning while reading. Alternatively, questions may be printed at the end of this material, for example at the end of a chapter. This same tool which this student uses for highlighting, excerpting, bookmarking, or otherwise interacting with documents, may also be used to answer questions, indicate understanding, or other academic functions. In one embodiment, a user may use a button or gesture to indicate that certain scans are academic feedback.

In classroom settings, it may be useful for students reading an assignment to be asked to mark various passages, answer questions embedded in some material, or perform other assignments. By receiving scans from these students, an instructor may be able to see in real time which students are having difficulty with an assignment. Software may also be provided to watch for students who are falling behind, or not understanding, and automatically bring these students to the attention of a teacher. In this instance, a teacher might have a display which shows the progress of each student. Results of individual students may be stored for later analysis or consideration. With one embodiment, each student in a classroom may have a scanner with a wireless internet connection. Each student may be asked to scan phrases that create suspense. A teacher may have entered into a server which phrases create suspense. As users scan, these may be stored to an account for this class. This account may have a software routine to compare scans with the phrases selected by the teacher. With this embodiment, a software routine may display on a monitor the name of any student whose scans do not overlap with a selected phrase at least 40% of the time.

Teachers and students using the described system may be linked to other teachers or students. For example, a data stream from many students (perhaps in multiple locations) working on a particular assignment may be stored and analyzed. This data of an individual student, class, school, or other group of students, may then be compared with how other individuals or groups performed. With one embodiment, students may agree to share their scans with an instructional development center. Their teacher may then ftp the scans from the teacher's account to the center who will compile scans across many courses. This center may find patterns between number of correct answers per section of reading and student performance. A teacher may be informed which of their techniques are most or least effective at increasing percentage of correct answers or in decreasing time to completion.

Supplemental Material, Supplemental Markings

The described system may be used to display and make supplemental materials available. For example, when a student scans a particular word a system may offer this user a definition of that word, or speak its pronunciation. If a topic or concept is involved, this described system may offer a user supplemental material related to this topic. In children's books, scanning words or phrases (in some cases having special marks, colors, etc.) may bring up pictures, sounds, videos, or other content, to teach the meaning of this concept, or for entertainment. These supplemental materials may be dynamic; varying when this user scans this material again. In one embodiment, these materials may be retrieved when a user accesses their account. In such an embodiment, these materials may be altered before or after this access. In one embodiment, these materials may be altered or substituted based on user scans.

Material in the described system for which there is associated supplemental content may have special markings.

There might be a margin mark indicating to a user that such material is available. These margin marks may carry enough coded information for them to be scanned alone and bring up additional content—or they may simply indicate content is available, so that a user may scan the relevant text to access this content. In one embodiment, a margin mark may be a two dimensional bar code and the scanner has an LCD display, similar to a cell phone. This two dimensional bar code may encode ASCII text containing a bibliographic footnote. In one embodiment, a margin mark may encode a GUID that references supplemental content. A user may scan this mark. Later, when they access their account, they may be able to follow a hyperlink to this additional content.

One implementation may be to indicate supplemental content in text or material itself. For example, supplemental content could be associated with any phrase printed in red, or underlined, or printed in a special font, or otherwise demarcated. Scanning these items may bring up related content, either on a local display or when the user accesses their account. Here, a user may know which items have associated content. There may be a limited number of items which must be understood (disambiguated) by the described system, so it may be easier to assure that each item is unique when a document is rendered or printed. For example, only a subset of text will be printed in red, so a red phrase may be more likely to be identifying. Additionally, if template-matching techniques, described elsewhere, are used, the described system may be able to assure that each marked item is recognizable with this approach (i.e., a pattern of matching chars contained within each indicated item is unique among all such items). In other words, if two phrases would otherwise be indistinguishable, they may be printed in different colors.

A further aspect to specifically indicating supplemental content is that a scanning device and/or system may be able to recognize the nature of these items, e.g., that this text being scanned is tied to supplemental content. Thus, a scanner or system would identify a font, color, or other attribute and recognize a meaning and required action. In one embodiment, a scanner may have a software routine that performs scanned image preprocessing. This routine may perform feature extraction to determine if the scanned characters have serifs, or belong to particular font. In one embodiment, a software routine may analyze segmented images (i.e. the dynamically determined character templates) for coloration. One of these routines may be able to store data as to what was found or initiate a process to handle it.

When we refer to supplemental content, this may include any material, system action, or system behavior. Thus, text in blue with an underline might represent a web link which may bring up a website on a nearby screen, whereas text in bold may be associated with audio content, which plays when scanned. Further, text in green may indicate a discussion group is occurring on this topic. With one embodiment, a software routine may detect blue letters in a scan. This routine may then designate which characters form a URL. This data, along with the scan, may be sent to a server. This server may retrieve the scan results. From there, it may select the text identified as a URL and retrieve the corresponding internet resource. The scan results, including a website, may then be sent to this user's account. With such an embodiment, this user may have a display connected to a computing device to receive this data and present it on a monitor. In a similar fashion, results from a scan determined to be in bold may be routed to a speaker.

Alternatively, a scanner may be used with ordinary text. In this case, these same behaviors and action may be associated with these same regions as in the above example, but there may not be visual indications of supplemental content to a user, or a scanning device or system may not be able to determine a correct action solely from this scanned material. However, these associations may be made in (or associated with) a digital source document, and made available to a scanner or system. For example, a table of special text fragments and their related content/actions could be available to a scanner or system. This table could be consulted on any scan; if a match were found, an action could be taken or some content could be provided. For example, a server may have a list of currently playing movie titles. Once a scan is resolved to text, it may be searched for text strings matching these titles. For each title found, a user may receive a review or movie trailer in their account.

Printing or otherwise "rendering special, active portions of a document may make them visible to a user and may also make them readable/accessible to a scanner or system—i.e., a system/scanner can determine a "meaning" of this material being scanned and take an appropriate action.

Retained Images

A scanner/system may be able to perform conventional OCR and/or may use template matching/offsets to identify a scanned text fragment. If template matching is used, a dictionary look-up processing step may be used to reconstruct some of the text scanned, or some of the raw offsets (template match locations) may be used to locate this text in a database indexed for, or searchable for, this template data.

A scanner may begin by acquiring an image of text or other rendered material being scanned. Even after this image has been processed (e.g., by template matching or OCR), it may retain an original image in some form. One application of this may occur when OCR data is not located in a search/look-up—for example, because this document is not recognized or because of an OCR or scanning error. In these cases (and others) the described system may be able to show a user what this system scanned, i.e., an original image. In another situation, image data may be stored to ensure that it available if a system needs to perform further analysis on it In some cases, this derived OCR or template-based data may be sent from a scanning device to the described system and an image may remain cached on this scanner.

If a scanner incorporates either a wireless (e.g., Bluetooth) or a wired (e.g., USB) interconnect to a system, then images from various scans might be saved on this scanning device until it can communicate with a host (e.g., docked via USB), at which time these images may be transferred.

Text and Machine Readable Codes

A scanner may have processing abilities such that it can perform template matching and/or conventional OCR, or these processes may be performed on another system resource (e.g., a remote server). One embodiment is for a scanner or described system to incorporate both an ability to handle normal rendered text and also machine-readable codes (e.g., 1- and 2-dimensional barcodes, special machine-readable fonts).

Note that in general a barcode or other code may be used at least two ways. When a small amount of data is involved (e.g., an amount of a retail purchase, a name/identity of a product) this code may carry complete information. In many cases, however, this amount of data is too large for this (a list of may items, a complex bank transaction, etc.); in these cases a code may be a unique reference to additional electronic/digital data. Scanning as code in this case captures a reference—which may then be used to fetch or access related data—for example, from an internet-based server.

This data may then be presented to a user when they access their account.

In one embodiment, a store may print these barcodes on their receipts. A user may be able to scan this barcode and have an electronic receipt deposited in their account. A user may be able to import this into an accounting program. With one embodiment, these barcodes may be placed on products or packages, possibly by printing them on stickers. A user could scan these barcodes to track inventory at a warehouse, or products that they own. These barcodes could be used to replace or complement library classification and tracking systems. A user may be able to check out a book by scanning the barcode. With one embodiment, scanning a product barcode may cause a server to retrieve a product registration form and deposit it to a user's account.

Re-Purchases

Scanning rendered data associated with, or printed on, a product may trigger an opportunity to purchase another of the same item, perhaps at a later date (for example by taking a user to a website which recognizes this product code, original vendor, or other vendor). These subsequent purchases may be directed to an original vendor (e.g., retailer), or they may be handled by a new merchant. In one embodiment, this opportunity to purchase something may come as a hyperlink on a page displayed as part of this user's account.

Note that scanning a code or text item may cause an exchange of data both to and from a user. For example, scanning a product registration form may store in a user's data a purchase date and serial number of a product. This same scan may also cause this user's data to be submitted (ideally with explicit permission of this user).

Forms

The described system may be used to fill out or submit forms. To accomplish a system may recognize that it is being used in a form or data submission context. One way this may be accomplished is for a rendered form document to carry an identifier by which the described system recognizes this document. This may indicate an identity of this document, which fields it contains, a version of this document-optionally a user or other target context it was intended for, or other data. In one embodiment, a server may have stored this user's relevant information and XML tags to describe it with a user's account. Scanning this product bar code may authorize a server to submit a product registration. This server may retrieve the form identified by the barcode. The form may be associated with XML tags specifying the requested information. This server may retrieve this information from the user's account by searching for the requested XML tags. This server may then send this information to an address denoted on the source copy of the form.

In some embodiments, submission of forms-based data may be accomplished in various ways. A system user might, for example, scan a form identifier, and then request this same form be printed out on a local printer with some or all of the fields filled in with some of this user's data. In one embodiment, this may be accomplished where a user visits their account and selects the fields to be filled in. This user may then direct that this form be printed. In another instance, a user might request that a form be submitted electronically, for example by email, via the internet, or any another electronic channel between this described system and a target recipient of this form information. Alternatively, a system user might request that a particular form be printed on paper and submitted via mail. In one embodiment, someone may have to put the document in the mail. Any means of rendering and/or submission might be set as a default for a particular form, or for a particular user, or for a group of users, or other entity. In some circumstances a system user may not want and/or need to specify how a form or how form data is to be delivered—these methods may be specified as system defaults, or by an organization or entity receiving this form, or by another means which does not require a system user's input.

In some cases, the described system may be able to recognize a specific form by scanning a portion of a form containing unique text or a unique mark or symbol which only appears on this form. Alternatively, this scan might encounter data which could identify more than one document. In this case, a user might be asked to specify which document was scanned. In one embodiment, a scanner may have an LCD display. A list of potential forms may be retrieved by a server and displayed on the scanner. A user may use buttons on the scanner to select an item from the list. This selection may then be sent back to a server for further processing.

In some cases a publisher or printer or author, or other interested party, of a form may register a form for use with the described system. This may be done by uploading a SGML encoded document to a secure website. Such a registration might include data such as where and how to send certain data, specific fields on this form, which fields are required or optional, how these form-submitting services are to be paid for, security and/or privacy and/or credit and/or other qualifications or ratings of the entity(s) receiving this data, a copy of this entity's privacy policy, specific instructions for handling various processes and/or circumstances in this form-filling and form-submitting process (optionally as computer code or instructions) and optionally other data as well. In one embodiment, this data would need to be encrypted with a trusted key. In such an embodiment, this information would be verified (possibly by Verisign) before it could be registered. Other data associated with or registered with a form may include information about a code or identifier on this form, an image or other representation of some graphical element or elements by which this form may be recognized, which individual system users or groups of system users or situations or contexts this form is intended for, an electronic copy of this form (for example, in printable PDF format) or where to locate such a copy, valid dates, times, or other qualifying circumstances in which this form may be submitted. Other data may be associated or submitted with a form as well, optionally including all data which is useful or necessary to various parties participating in a forms-completion process.

In one embodiment, a system user may complete a part of a form or an entire form simply by scanning (or otherwise entering) an identifier associated with this form. In some cases a form identifier may also be readable by a human, for example as a serial number or URL, so that users who cannot or do not want to scan this form may still complete it by entering an identifier manually. In these instances, it may be helpful if a form or accompanying material includes information about how to submit data by other means. Such means may include going to a specific URL with a web-browser and entering data into forms on the website. Another means may be via a phone call to a specific number and keying in data with a touch-pad. These last two examples indicate how it may be possible in some cases for individuals to have means to identify themselves separately from a scanning device or user account. Such an identifier may associate an individual with a collection of data so that an individual may respond to or complete all or part of a particular information request by submitting or relating only their identifier. In one example, a user could respond to a printed form by dialing a number associated with this form and then entering their (possibly numeric) identifier via voice or DTMF or other phone commands or actions. In one embodiment, a user might be able to use their email address, social security number, or other pre-existing data item as a key associated with data to be submitted with a form.

Completion Via Phone

Optionally, a password, PIN, or other private code may be associated with a user's identifier. For example, a user might place a telephone call to a phone number associated with a data request or form, enter their social security number to identify themselves, and then be prompted for and enter their PIN or password to confirm their identity. In one embodiment, a user may call a phone number that is routed to an Interactive Voice Response system. This system may be connected to a database on a server. This server may be able to authorize this user and complete a transaction such as sending a form to a form owner. This phone and optional AVR system can also be used for completing purchases of items related to captures.

A system user with a scanner may optionally enter selected fields or groups of fields on forms by individually scanning field labels or title text associated with a field(s). This might allow a user to choose which items to submit and which to skip. Required items may carry visible and/or machine-readable indications of their required status, such as a red star. The described system may have an ability to recognize various frequently used field names or titles, such as "address" or "work number." Optionally, an association between a title or other mark and a meaning of a particular field or group of fields may be separately established by a party setting up a form for use with the described system. With one embodiment, a user may fill out a field entitled "home address." A user may later specify that a product is to be shipped to their home. A server may then copy this home address to the shipping address field.

In some cases, special marks (such as bar codes) may accompany fields, field names, or other entities which the described system may want or need to recognize. These marks may be recognizable by a scanner and system. Optionally they may have a form which is recognizable by a system user. In some cases, only these special marks will need to be scanned to indicate an item or object to the described system. In some cases it may be helpful if these marks appear next to or near a given field name.

In some cases, a form or information request used with the described system may be represented as one or more icons. In these cases, a conventional model of field-names plus space for written responses may optionally be omitted. One example would be an information request which is a simple icon recognizable by a user. In some cases, different icons can indicate different kinds of information being requested. For example, there might be a different icon for a person's name, for their phone number, or other personal information. These icons might be combined into a group representing a complete information request. Optionally, individual field names may also be printed, or a statement or text description of this data requested may be part of a form request. A scanner may interpret each icon as a bar code. This bar code may uniquely identify the information request, which may be processed by retrieving the data from a user account.

A form used with the described system may carry additional coded, machine-readable, or human-readable data. This data might include a specific user for whom this form was intended to be sent to or filled out by. Such additional data may be incorporated in a form identity object or mark such that this additional data is included when a user scans this object or mark. Optionally, a form or group of forms may comprise a unique identifier. Data may be separately associated with this identifier. Such data might be stored in a database, stored on, or associated with a forms-processing server or system. If a form is registered with the described system, such data might be entered and/or associated with a form when this form is registered.

There may be a fee or other financial transaction associated with various steps of completing a form in the described system. For example, a system user might be filling out a form to ship a package. The shipping charge might be automatically billed to a credit card or deducted from a debit card or bank account or prepaid account associated with a particular system user or with a scanning device. In one embodiment, a user may use their scanner to authorize a transaction. A server may then process this transaction by retrieving the associated financial information (e.g. credit card number). And/or such a charge might be levied on and paid by a recipient of this information or a party in association with them. In one embodiment, a user may need to authorize a financial transaction when they access their account in order to have the submitted data sent to them. Such an embodiment may allow a user to click a button to signify "bill me later."

In some cases, for example when a system user is not connected to a network, and a local scanning device or other resources (e.g. PDA, phone, PC) do not have information about this user's context (for example a copy of a document being scanned, or an index of a document's contents), or when a system user does not have access to a display—then resolving questions about which document was actually scanned can be resolved at a later time. For example, a form-submission process might be finished by directing a system user to a website at a later time, or by sending them an email which requests further action—possibly confirming by clicking on or otherwise following a hyperlink. Such an email-based completion process might include an explanation or list of data items being requested.

When a system user scans a form, e.g. by scanning a form identifier or other identifying text or marking, this user may be presented with options. This presentation may occur at some later time, for example, when this user connects to a system user account, or when they check their email or a system-related website. Options available to a system user might include:
  get additional information about this form offer or other entity in this context;
  get additional information about a company/organization/entity associated with this form;
  contact other system users who have responded to this offer (e.g., via chat room, discussion group, listserv);
  view various demographics and/or statistics about others who have commented on, or otherwise participated in, this offer, form, or other entity in this context.

Forms encountered by a system user, and optionally processed in some way by the described system, might include: contests; subscriptions (e.g. to magazines); registration (e.g. to win prizes or vote); government forms; postal forms; shipping forms; customs forms; product ordering forms as in a catalog order sheet; financial documents, credit applications, or other documents related to commerce; or any situation where an entity wants or requires information from an individual or entity (note that a scanner or account might be associated with a group of people (e.g. a club, a company, or other association).

One means of submitting form-based data in the described system may be via phone. Optionally, scanning a form identifier or some part of a form may cause a phone call to be placed between a system user and an entity requesting data. Such a phone call might be originated by either party. Data might be exchanged verbally during such a call, or coded information might be sent or exchanged. For example, a system user may print an address book from their account. Just to the left of each name a bar code may be printed. If a user scans one of these bar codes, a scanner may interpret it as a command to dial a phone, and a phone number to dial. In one embodiment, a scanner may be integrated with a cell phone. Placing the phone call may be accomplished by providing this phone number to a cell phone application programming interface.

Optionally, a system user may request that a particular form, or a data-request which a form represents, be presented or delivered in another fashion. For example, a user might request that a separate paper copy of a form be mailed to their home or work address, that information shown on a form be requested via an email, or that a URL identifying a web-based version of this form be sent to this user by email or another means. A user may submit such a request by scanning an icon. The encoded data may be extracted and sent to a specified URL (e.g. the form publisher's ftp site could be encoded in the bar code). A software routine may email a copy of the form or place a copy of the form in a mailing queue.

The described system also may allow users who encounter missing forms to nonetheless submit this same data. For example, a tear-out form in a magazine might have an accompanying description and/or identifier, either of which might be recognized by a scanner, even after this accompanying form was removed. Such a description or identifier might, for instance, be printed on a tab remaining in a magazine insert after this form had been removed. Alternatively, a description or other identifier might be printed nearby, for example on a nearby page. In one embodiment, the user only needs to interact with an icon, and a hard copy of a form may be irrelevant.

Some individual fields, or groups of fields, in a system-compatible form may be recognized in various ways. Special identifiers may establish a meaning, purpose, or other aspects of fields or groups of fields, possibly including specifications concerning types of data required, format of this data, or other descriptors. For example, an embedded symbol may signify that a given field is a five digit zip code.

It may be useful for a system user to have information on file so that some or all of the fields of a rendered form may be submitted without a user having to input data when a form is encountered. This may be helpful with especially common data elements such as name, address, phone number, email address, social security number, driver's license number, date of birth, or other possible identifier. Less common fields, such as parent's name, date of high school graduation, astrological sign, registered political party, or other personal information, may also be stored within the described system and optionally made available to complete forms.

Stored data might be located on a terminal scanning device, on a PDA, cell phone, personal computer, or other device near to or associated with an individual user. And/or stored data might be located in other components of the described system—for example, on a server associated with a user's system account. Data may be stored encrypted, and/or with other security measures to prevent theft and/or accidental release of data. In some embodiments, a system user may need to enter a password, or perform other verification or security tasks, before their data is released. With one embodiment, a user may scan a form icon. The extracted data is sent over a network to a server which determines which fields are required. The server queries the user's account which routes the server's request to the user's home computer. This server may then authenticate itself and retrieve the desired fields.

In one embodiment, different types of data may be handled differently by the described system. A system user's data may, for example, be grouped into classes or categories. These groups might optionally have names or titles, such as, for example, "level-1, level-2, level-3," or possibly "very private, semiprivate, public." Optionally, certain types of data may be flagged for special processing. For example, when a form requests or requires a social security number, a specific authorization might be required by a user. A specific handling of each element of data in a form-submission process might be specified by a system user, by system defaults, or by another method. With one embodiment, a user may scan an icon to fill out a form. If the user does nothing else, only "public" data may be used to complete the form. A user may be able to touch a button to indicate that they further authorize "semi-private" data. Such a user may need to scan their fingerprint to authorize the release of private data.

In some situations, when data is to be supplied or submitted by the described system, it may be useful if a recipient of this data can be analyzed, evaluated, confirmed, or otherwise assessed. For example, a potential recipient might be checked to confirm that their published privacy policy is in accord with the described system requirement, or perhaps with an individual user's specific instructions for data submission. For example, a system user might specify that personal data is only to be released to organizations having a privacy rating or trust rating above a certain threshold. Such a rating might be established by an independent party, such as Verisign. And/or such a rating might be established by voting or other indications from individuals who have experience with an organization or entity being rated (for example, system users who have previously participated in this or previous offers from this entity or organization).

A system user might establish data-handling procedures via a set of rules or options. One such rule might be "only submit level-2 and higher data to organizations having a privacy rating of at least 3." Another rule might be: "always contact me via phone call to confirm a request for my social security number." Another rule might be: "always send me an email record showing all data submitted by the described system." Another rule might be: "enter each data submission into my chronological log of data releases." Rules for directing email in common personal computer email clients are an example of how rules may be employed to customize a system or determine system behavior for an individual user.

If completing or submitting printed forms using the described system, this completed form and data may be transmitted electronically. In one embodiment, a system user could respond to a mailed postcard offer by scanning a card to identify a form and then submitting this data electronically.

Note that the described system may be configured such that scanning a form identifier conveys that a system user specifically wants information sent—e.g., this user is giving consent. In such a case, the described system may preserve a record of this scan, for example by preserving a captured image, time, date, or other meta data, from this event. In some cases, a form identifier may include encoded data which in some measure verifies that a system user scanned a form. In one embodiment, this might be a unique code associated with each individual form. This code might be associated with a specific form mailed or otherwise delivered to a specific individual. This code might optionally only be readable by a machine programmed with specific data or a specific algorithm.

An organization or entity might participate in this form completion arena. For example, an office manager may have a scanning device that is associated with a company account. This employee may use this scanner in a manner similar to a personal scanner. In this example, the information retrieved would refer to the company, not the individual. Similarly, financial transactions may be from a company credit card.

In one embodiment, scanning a received document may cause an acknowledgment, confirmation, or receipt to be transmitted or sent to a party who sent a document. This may be implemented as a form with no fields to be filled out, only an identifier and a form recipient.

A system user may have stored information organized multiple ways. A user might have multiple profiles or persona, where different profiles or persona have different data associated with them. Profiles or persona might have associated titles or names. Examples might include "John at Work" and "John at Home." In one embodiment, the described system may have no knowledge that "John at Work" is connected to "John at Home." In one embodiment, each account may be associated with a different scanner. In one embodiment, a scanner may be set to a given account through a built in user interface or by synchronizing the scanner to a personal computer.

In one embodiment, steps involved in completing a form might include these steps:

- An author or publisher of a form registers their form with the described system and receives a unique form identifier to render on or associate with a form. A system user scans some portion of this form, possibly with a scanning device.
- This scanned data is analyzed, possibly on this user's device, possibly elsewhere within the described system, to identify this user's context (e.g., a document being scanned). If some data scanned is ambiguous, this user may be queried to resolve this ambiguity. With one embodiment, this user may have to select a form the next time they access their account. In some embodiments, possible matching items may be prioritized with a most probable in the first, most prominent, or most easily accessible position when presented to this user. In some embodiments, a most likely document or match may be taken as a default and may be assumed to be a chosen item if this user takes no action. In some embodiments, the described system may proceed with a form-submitting process to determine whether any remaining ambiguity is removed by subsequent steps in this process. For example, if two forms are returned, and one can be completed and the other only 10% can be completed, a system may select the first form as the intended one.
- When this form has been uniquely identified, this form and data associated with this form may be fetched from a database of forms.
- If no form matches data input by this user, they may be prompted to supply additional information about this form. In some cases, a user may scan other elements of a form via a handheld scanning device. Optionally, a user might fax, mail, or otherwise deliver a copy of this form (possibly an original) to the described system for analysis. Such a form, or image of a form, may be analyzed (e.g. converted to a source copy via OCR) and made known to the described system, including any recognizable and/or unique scannable features (e.g., a document ID or version number printed by this form's publisher). In one embodiment, all, or nearly all, distinguishing or unique features of a particular form may be analyzed and noted, so that when a subsequent user scans this same form the described system may be able to locate it. Such features may include logos, return addresses, instruction text, field titles, general layout and markings, version numbers, colors, fonts, or other properties. In one embodiment, this form may be treated like any other source document. The form may have layout independent and dependent data associated with it, possibly collected when the form was input to a server. When the form is selected, a server may determine that this document is a form and retrieve identifiers for the requested data.
- In some embodiments, the first user to submit a copy of a form previously unknown to the described system may be rewarded in some way, for example by receiving a small payment when subsequent users interact with this form. In one embodiment, this may occur by crediting an account stored on a server. In some systems, these incentive payments might instead appear as credits to form authors or publishers who submit and/or register their form directly with the described system before a user submits it—for example, these credits might be used to reduce a per-user charge which registered form publishers may be assessed for use of this system.
- When fields of a form are understood, e.g., the described system recognizes which specific information is being requested, appropriate user data may be supplied. Various types of data might be handled differently, for example, according to a user's profile. Some types of data may result in a query to a system user to request specific permission before releasing this data.
- A completed form may be forwarded directly to a publisher and/or intended recipient of this information. This data and/or completed form may be transmitted electronically, mailed, faxed, or sent by another means. A system user whose data is being sent may also receive a copy or record of this form, data, and/or other information—which may also be sent via some of the methods mentioned above, among others. According to one embodiment, when a user authorizes a form transmission, a server may use a built-in electronic fax to send a copy of the completed form to the phone numbers associated with both the sender and receiver's accounts.
- the described system may maintain a record of this user's data releases in some fashion, for example as chronological entries in a journal or log, optionally associated with this user or a user account. With one embodiment, a server may store to a text file a description of each transaction, possibly comprising a time-stamp, the information, a security level, a privacy policy (or summary) and a recipient.

In one embodiment, a registry or database of form images may be stored. When a user of this forms system encounters a printed or otherwise rendered form, they may request that this forms system complete this form for them. This user's data necessary to complete this form might be transmitted to this forms system at the time of this request, or, in another of many embodiments, this user's data might already be on file within this forms system, in which case this user may only need to identify themselves to this forms system, for example by submitting a user ID, and password or PIN.

Forms known to this forms system may carry a visible mark or indication which informs a user that this particular form is known to this system and may be able to be automatically completed if desired. According to one embodiment, this may be a system logo placed in the bottom left hand corner of a rendered document.

If this user encounters a form not known to this system they might mail, fax, email, or otherwise deliver this form so that it may be filled out for them. This system may optionally contain expert knowledge and instructions for automatically analyzing and recognizing various elements commonly used on forms. Thus, a new form may be analyzed and made available to be automatically filled out if subsequent users request it.

Completed forms may be delivered in various ways. For example, they might be faxed, emailed, or mailed back to a user. Optionally, they might be delivered by these or other means to an entity to which they are addressed or intended (e.g., this form's author or publisher).

In some cases, a user's data may not need to be physically printed on a form in order to deliver it back to a publisher. For example, if this publisher has agreed to allow and accept electronic data exchanges, a forms system may communicate information to them via a network.

This forms system being described may handle sensitive or private information on behalf of users, form publishers, and others. It may be useful if communications with a forms system are private and/or secure. For example, encryption may be employed in some or all parts of data communication. Optionally, an auditing system, perhaps involving outside parties, may be used. This may ensure, among other things, that all data is kept secure and properly handled.

One possible interface to such a system is via telephone. A user who encounters a form may phone a number associated with this forms system. With an Interactive Voice Response (IVR) system, operator assistance, or other approach, a form may be completed with a user's data, and/or data may be submitted directly to a publisher of this form or another party. In some implementations, a user's data may be stored in a forms system so that it is available in future. In some situations, a user may speak or otherwise transmit their information. In one embodiment a user may submit their relevant data via a web interface, and then request a particular form be completed and/or submitted via a phone call (possibly between modems).

In another implementation a forms system user may complete a paper or rendered form using auto-complete capabilities of a web browser. In this situation, a user may browse to a website where they can enter identifying information about a required form. Optionally, a form or associated materials may indicate a URL or other web address which a user may use to locate and connect to a correct form-completion service. For example, such a form might indicate, "To complete this form online go to www.form-fill.com/ID2372893." Such a system then might present this user's browser (or any tool capable of completing a web-based—e.g., HTML—form) with an HTML or other web-based version of this form, which can then be completed manually (e.g., with keyboard and mouse), and/or with auto-fill, if desired, and submitted electronically by a user (e.g., by clicking on a submit button with a computer mouse). Here, it may be helpful for forms which are enabled for this service to carry a specific mark indicating this fact, and optionally a means for indicating this form's identity and/or an internet location for a completion service for this form.

One advantage of these approaches over completing forms manually and submitting them, for example, via mail, is that with this proposed system an electronic version of a form, and/or an electronic record of the exact data submitted, may be kept by a system after this data has been submitted. This data may be made available to a user at a later date if desired.

Additional Functions

In one embodiment, a scanning device might be used to confirm signature of a document. For example, a signature line or lines of a legal document might be marked by a watermark or pattern or other design. This design might include or incorporate a serial number or other identifier unique to this specific document. After a person has signed a document, a scanner may be used to image this signature and underlying or nearby identifying marks. This data may be transmitted to a separate location. A time, date or other information related to a transaction may be recorded. This signature image may be verified later for authenticity (possibly manually).

In one embodiment, two or more capture devices may be able to exchange information when brought into proximity. This might happen via an IR exchange (e.g. IRDA), a Bluetooth wireless exchange, or other close range communication standard. Data coming from two or more scanners which have exchanged data in some form (or which each scan or sense some common signal or data) may be correlated by the described system. A record of these inputs may be saved as evidence of this exchange. This record may include some or all of the data input to these scanners. Such a record may be used as evidence of transactions, meetings or other events. This evidence may be delivered to various parties interested in these activities. In one embodiment, a scanner's GUID may function as a public key to a secret private key. Such a scanner may be able to encrypt a time-stamp using the first scanner's private key. The second scanner may then receive this encrypted data and further encrypt it using the second scanner's private key. The second scanner may then store this and send a copy to the first scanner to store. This data may be decrypted using these scanner's public keys. This decryption may be used to show that this data (the time-stamp) was passed between these two scanners.

As has been described previously, a scanner or system may employ template-matching and/or offsets to locate a text fragment and/or to convert a rendered image of text to ASCII or another digital or electronic representation. A scanner may also employ more conventional OCR techniques to recognize and/or convert rendered text. In one embodiment, these two techniques may be combined: template matching may be used to at least partially convert an image of text to electronic form, and conventional OCR (e.g., using knowledge about character shape, ascenders, descenders, fonts, typefaces, and other elements known in the art of OCR) may also be employed so as to, for example, increase efficiency, or reduce errors.

A scanner or system may include special recognition capabilities for a limited number of fonts. For example, a system and/or scanner may be able to directly read or recognize special, machine-readable fonts (e.g., like those used to print numbers on bank checks). In some embodiments, these recognition capabilities may be restricted to a certain known size (or limited number of specific sizes) in order to simplify this process, increase recognition abilities, or other improvements. In one embodiment, a scanner may have stored images of characters (including numbers) in this font. These fonts may be stored in a scalable vector graphics format, so that they can be resized to match the text. In one embodiment, these fonts may be compared with images along with other templates. If one of these font templates matches, a software routine may be employed to match each segmented image with font templates. Such a process may produce a Unicode string.

It may be helpful if a machine-readable font is also readable by people using the described system. It may also be useful if this typeface or font is associated in a user's mind uniquely, or almost uniquely, with described systems, so that a user may recognize text (including letters, numbers, symbols) as specifically intended for scanning or other input to the described system. Thus, when a user sees this font they will know what to scan or input, even though there is no other indication or data associated with an item. As an example, a document identifier might be printed at the bottom of a document using such a unique, system-associated font. Even if this information is surrounded by other data (e.g" footnotes, page number, other document data), with a recognizable font a user may know what should be scanned or input. Similarly, if there are special text items in a document, for example embedded hyperlinks, keywords, ordering codes or product identifiers (as in a catalog, for example), text which has associated supplemental content, or items which are available for purchase, these special text items can be rendered in one or more special fonts (machine readable, human readable, or both) so that a user may determine by inspection which items are intended for input. For example, in one embodiment, a system font may resemble Verdana. A user may read: "Intel has reported that the Itanium 4 will be shipped ahead of schedule. Craig Barrett, Intel's CEO, noted that . . . ." A user may note that some of the phrases in the previous sentence are in a different font. A user may be able to scan just one word. Because this result is in a special font, it may be uniquely resolved to at least one result. For example, scanning "Intel" in any document may automatically retrieve a copy of Intel's home page or a stock quote. If a scan has further context, e.g., a source copy of this article is retrieved, further results may returned as well.

In one embodiment, these special items may be distinguished by color. Note that different colors, typefaces, fonts, highlighting, underlining, bold, italics, and/or other text attributes or features, or other demarcations may be associated with different purposes, actions, categories of items, or other intentions. A table or other instruction or set of instructions might be rendered in a document, or associated with it, with explanations to a user regarding meanings of these various rendering choices. In some cases, supplemental instructions may themselves employ some or all of the text attributes they refer to. For example, a catalog instruction might read, "choose one CAPITALIZED item and then select the/italicized quantity." Optionally, an instruction might be conveyed by example: "Choose one ITEM and then select the/quantity/." (Where "quantity" is italicized).

In one embodiment, scanned data determined to belong to one of these groups (i.e. bolded, italicized, etc.) may be stored with meta data identifying it as such. When a server receives such a scan, it may perform certain software routines corresponding to the format of the scanned text.

In some circumstances, it may be useful if text scanned with a scanner carries supplemental information in addition to characters (e.g., ASCII) being scanned. Such information may be conveyed via ink which is not visible to a human eye (but visible, for example, in an IR spectrum). Alternatively, it may be conveyed with visible ink which also carries a magnetic pattern (for example, using technology similar to a tape recorder to write a signal in this ink during or after printing). In one embodiment, two or more types of ink may be employed, where they appear very similar to a human eye, but may be sensed or detected (e.g., magnetically, optically, via florescence, chemically) differently.

Another option may be to incorporate changes into rendered text. For example, an underline or underlines might be added, where these lines are periodically broken, and so represent a code (e.g., -..----...-..-...). In one embodiment, such a series of symbols may be treated as a narrow, one dimensional bar code. Alternatively, these character shapes may themselves be altered to carry information, for example by varying the width of individual character's baselines.

A special, human and machine readable font, optionally specifically associated with scanning or input, might also employ techniques to carry additional information. In one instance, a baseline of this font is a code-carrying element, whose elements vary in width, color, or some other attribute.

There might be at least two variants in the encoding and rendering of supplemental information—techniques which are apparent to a user (perhaps even explicitly noting that there is supplemental embedded data, and so possibly indicating a specific region to scan or input)—and techniques which are invisible or nearly invisible to a user (e.g., ink which looks ordinary but carries information magnetically, ink which has special attributes in an invisible parts of this spectrum).

One application for supplemental data is to ensure that data is scanned or input correctly. In this embodiment, this additional data may function much like a checksum (for example, representing a numeric sum of various ASCII values of some or all of the text being scanned). Optionally, supplemental information may include redundant data or other means to perform error correction on part or all of the text or image being scanned.

In cases where supplemental information is employed, it may be helpful to use a scanner which may be able to receive two or more different types of data. For example, a scanner might employ optical means for detecting human readable text (e.g., via a CIS sensor, or an optical system connected to a CCD array), and also employ a magnetic sensor (e.g., similar to a sensing head in a tape recorder or computer floppy drive or hard disk) which may pick up signals from magnetic properties in or near a rendered image (e.g., of text) being scanned. In one embodiment both may be placed such that they point down. In another embodiment one or both may be placed near the bottom but pointing out, across the document.

An advantage of a human recognizable font, typeface, highlighting, underlining, or other attribute associated with an item to be scanned or input is that these items may also tell a user how far to scan. That is, a distinctive appearance of an item may, if it is distinctive for the entire extent of this item, also indicate this extent to a user. Thus a user may be able to determine how far to scan in order to complete an input (for example, in this sentence, scanning THESE THREE WORDS will cause one kind of action, while scanning EXACTLY THIS FIVE WORD PHRASE will cause another kind of action—and a user doesn't need to be told where to start or end these scans).

In performing text input, it may be useful if certain special fonts are known to a system. For example, if template matching (described elsewhere) is being used, it may be helpful if individual character templates are already available and do not need to be found empirically from a rendered text/document itself. In one embodiment, these templates may be created empirically when a new font or typeface is encountered, and then they may be kept (e.g., cached or otherwise stored) for later use. In one embodiment, when a new font or typeface is encountered a system may search a library of templates in an effort to find a templates for this particular font. As described herein, a scanner may be preprogrammed with a font, such that it can interpret this font character by character. In one embodiment, a scanner may be able to collect these fonts. For example, a scanner may save recognized templates throughout a document or between document captures. If one character is repeated with some frequency, it may be stored as a recognized character and treated as a preprogrammed font.

Stored templates need not necessarily be limited to those scanned by a system user. It may be helpful to have available templates which were previously generated from specific knowledge about a particular font. As an example, a description of a font which is used by a computer (e.g., employed in printing) might be also used to generate a stored template, even though this user has not actually scanned this font. Stored templates may be fixed size or variable (e.g. scalable). Templates might be stored on a scanning device, on a nearby associated device (for example, a user's PDA, cell phone, personal computer), on a remote server or other storage medium. This process of template matching also might occur at various places—on a scanning device, on a nearby associated device (for example, a user's PDA, cell phone, personal computer), on a remote server or other processing facility.

Font Independent Character Recognition

Characters in a particular font or typeface often have common elements. For example, a lowercase letter "c" and a lowercase letter "o" may share elements having similar or identical curvature, width, or other properties. Therefore it may be efficient or otherwise useful to store representations of fonts or typefaces parametrically—for example, by only storing a limited number of constituent elements (or instructions for creating these elements), plus instructions for combining these elements into characters.

Some characteristics of characters may also be somewhat font independent. In particular, relative or comparative shapes of various characters may sometimes be similar across multiple fonts. A lowercase letter "h" in a particular font may sometimes be at least approximately constructed by combining some elements of a lowercase "l" and a lowercase "n" in this same font. Since this rule applies across multiple fonts, it may be useful, in this process of constructing a lowercase letter "h", to begin by combining elements of letters "l" and "n" according to a standard or somewhat general set of rules. In cases where this resultant construction is not sufficiently accurate, additional correction data may be applied to create a reasonably accurate result.

Stored Templates

One application for stored templates may be when a system user is likely to read documents in a particular typeface or font. For example, a user might be known to be a subscriber to the New York Times. Thus, a font or fonts which are frequently used in this publication may specifically be kept available (e.g., in some instances cached near a user, perhaps available when this user is disconnected from a network). In one embodiment, a user may synchronize their scanner with their account. According to one embodiment, this may occur by accessing their account via a personal computer and connecting the scanner to the personal computer via USB. A software routine run by a server may have detected that this user reads the New York Times at least once a week (or above some other threshold). This account may then have a New York Times font deposited in it. When the user requests a synchronization, this font may be downloaded to the scanner and stored in non-volatile memory.

Feedback on Captures

It may be useful for a system user to receive a confirmation, acknowledgment, or other communication when a particular scan has been completed successfully. In one embodiment, a scanner may have be able to communicate with a server (e.g. over a wireless Ethernet connection across the internet). Such a scanner may capture a scan and send it to a server. Such a server may attempt to retrieve a source document. This server may send back the scanner a retrieval result (e.g. found, ambiguous, not recognized). The scanner may indicate this result to the user, possibly by vibrating. Alternatively, a user might receive a warning indication when there are known or probable errors in a scan or input (for example, when supplemental data such as a checksum indicates an error, or when a template matching algorithm encounters difficulty). These indications might be audible tones, visual indicators such as from an LED, tactile feedback such as from a vibration, or other sensory feedback. Additional indicators may be employed to inform a user that a document or specific indicated/scanned item was or was not found and/or not recognized.

Optionally, a user may be informed regarding how unique a scanned item is. This might include an indication of how many possible or known matches have been located. In one embodiment, a scanner may be connected to a personal computer via a serial cable. This computer may perform a software routine to transmit a scan image to a server. This server might determine that the scanned phrase matches five documents and communicate this back to the scanner via the computer. This number may be displayed on an LED for the user.

In some cases, a system user will scan text or other data which is not unique to a particular document because other authors have independently chosen these same identical words, created this same rendered image, or other identical content. In other cases text or other data which will not be unique to a particular document because this item, or items, in question were copied or quoted from another document (i.e., they have these same author or authors). These two circumstances may be of distinct interest to a system user, so functionality may be provided to distinguish them (e.g., different audible tones, different visual indications, different coloring when search results are displayed on a screen. In one embodiment, a server may differentiate these two, quotes and identical text, by determining if the source document surrounds the text in question in quotation marks. This result may be sent over a network to a scanner.

Integration with Associated Devices

A scanning or input device may be used to select items from a list. A scanning device may be used to select or de-select items, for example to enable or disable an option. In some cases where a system user encounters static rendered material (e.g., a form printed on paper), a system may employ an auxiliary device to enhance or supplement or assist a user in interacting with rendered material. Such an auxiliary device might include a personal computer, a PDA, a cell phone, or other device. With one embodiment, a user may be operating a scanner and use a personal computer to access their account at the same time. This user may scan a movie title. This scan is sent to a server via the internet, and the result, including show times, is deposited in the user's account. The computer may be running a java application on a website such that it frequently refreshes the data displayed. This user may soon notice that show times are displayed on their computer monitor. A scanner may be used to select show times and add then to a personal calendar. This user may use their scanner instead of a digital pen to select a show item and then perform a gesture to perform a "copy" function and a second gesture to perform a "paste" function.

As an example, consider a system user who scans a document identifier which appears on a printed paper form. If a user is near their personal computer, they may have also scanned an identifier on their computer, or a computer display screen, or otherwise indicated that this computer and/or display should be used in conjunction with their current scanning activity. In one embodiment, this computer may already be executing a software routine that can receive, process and display information from a server. Upon receiving a paper form document identifier, this described system might look up and retrieve a digital version of this form and any other related instructions and information. Optionally, a server may send image of this form to a computer to be displayed. In one embodiment, an image of this form on a display screen would show each data field with this user's data filled in (even though, in one embodiment, a form may be submitted electronically, not as an image or printed form). In some cases, a user may be able to further interact with this displayed form—for example, changing any of these fields with conventional personal computer editing techniques (e.g., using mouse and keyboard to navigate and edit a displayed form). Optionally, this user might interact with a version of this form displayed on a computer screen by scanning data directly off of this screen with their scanner. In some embodiments, the optical elements in a scanner, which detect rendered images on, for example, paper, may also be able to detect images rendered on a CRT or flat panel display. Thus, for example, a user might scan a title of an address field (perhaps labeled "Your Address") or, optionally, a user might scan particular data (e.g., this user's address) which is shown inside this field. In one embodiment, a default behavior when either of these items is scanned by a user might be to present an on-screen drop-down list of various alternative addresses retrieved from a user's account, such as a shipping address, billing address, home address or work address. A user then might select an address of choice, either with conventional computer selection techniques (e.g., by clicking on an item with a mouse), or by scanning a chosen selection with their scanning device directly from a display.

In one embodiment, when a user changes the data in a field in a displayed form, the described system captures and remembers these changes. In one embodiment, a personal computer may send them to a server to store with a user's account. A user might be offered a choice of adding this new data as another option for this field (for example an alternative address), or replacing existing data stored by this system (e.g., when a user has relocated to a new address). Similarly, whenever a user changes an item of information they may be given an option to make this new data their default.

Since many actions, types of data, documents, personal data items, or other information are common both to a user's conventional computing and communications environment (e.g., employed, stored or otherwise occur on their PDA, cell phone, personal computer), it may be helpful if at least some of these systems and data items are integrated with the described system. Thus, for example, personal data which the described system uses to complete a form might come from a user's address book or other directory of information used in conjunction with their personal computer. In one embodiment, a user may be able to interact with their user account via their personal computer, e.g. with a website. On the personal computer, a software routine may be able to extract data and then send it to a server to store in a user's account. This software routine may be authorized by a user when it is initiated. This software routine may be able to convert data from known formats (e.g. Palm OS's™ address book database, Microsoft's Outlook™ email database) to a format used by a server.

In one embodiment, completing a rendered form scanned by a capture device might occur by software on a user's computer—for example, by pointing a user's web browser to a location on the internet where a requested form resides as an HTML document, with this user then completing a form as they do other online forms via their browser.

Catalogs of Related Items

The described system may allow catalogs of related materials, or materials of possible interest, to be associated with or printed/rendered in, another document. Thus, for example, a section could be printed at the end of a novel showing other books by this same author, on similar topics, by this same publisher or other grouping. A system user might scan these items and choose to create a memo about them, add them to a wish list, purchase them immediately (e.g., directly from a publisher, or from a third-party such as Amazon.com) or otherwise interact with them. Similarly, an offer to send a reader a full catalog of a publisher's materials might appear at the end of a book. Such a catalog might be requested by scanning some part of an offer.

Confirming Capture Actions

This last circumstance, where a scan results in an immediate action or consequence, is one example of a range of possible results from a scan. Other items may require a confirmation before any action is taken (for example before a purchase is finalized). Such a confirmation may be requested by an LED and fulfilled by a using depressing a button. In some circumstances, scanning an object or item may result in a system user being presented with a range of choices, for example as a menu of items on a nearby, associated display screen.

It will be appreciated that although particular embodiments of the invention has been described in detail, various modifications and improvements can be made by a person skilled in the art without departing from the scope of the present invention. It will also be appreciated that the frequency of use of letters varies in situations where users predominately use languages other than English, or where geographical or cultural differences result in different corpuses of use. In these situations, other embodiments, in accordance with the present invention, may be desirable.

CONCLUSION

It will be appreciated by those skilled in the art that the above-described system may be straightforwardly adapted or extended in various ways. While the foregoing description makes reference to particular embodiments, the scope of the invention is defined solely by the claims that following and the elements recited therein.

What is claimed is:

1. A computer implemented method of identifying a document, the method comprising:
   obtaining document context data for one or more documents, wherein the document context data includes supplemental information used to identify the document and includes temporal information for one or more previous scans of portions of the one or more documents, the temporal information specifying a time at which each previous scan occurred;
   receiving data specifying a portion of the document captured using a handheld capture device;
   identifying a digital document associated with the document using the document context data including the temporal information and the captured portion of the document;
   identifying, using the captured portion of the document, a location of the captured portion within the digital document;
   identifying a location-based action to be performed based on the identified location of the captured portion and data specifying one or more location-based actions associated with one or more locations within the digital document; and
   performing the identified location-based action.

2. The method of claim 1, wherein identifying the digital document associated with the document comprises receiving data specifying a second scan of a second portion of a second document and using the second portion to identify the digital document associated with the document.

3. The method of claim 2, wherein the second document is the document.

4. The method of claim 3, wherein the second portion of the second document is the same as the captured portion of the document.

5. The method of claim 1, wherein identifying location of the captured portion within the digital document comprises identifying the location in a layout independent manner using features of the captured portion that are independent of a rendering format of the document.

6. The method of claim 1, wherein the document context data comprises geographic data specifying a geographic location at which each previous scan occurred.

7. The method of claim 6, wherein the geographic data specifies global positioning system coordinates.

8. The method of claim 1, wherein identifying the digital document associated with the document comprises identifying the document in a layout independent manner using features of the captured portion that are independent of a rendering format of the document.

9. The method of claim 1, wherein the captured portion comprises a plurality of line portions of the document.

10. The method of claim 1, wherein a typographic change indicates a change in document context.

11. The method of claim 1, wherein identifying the location-based action to be performed comprises determining similar actions from other captures of portions of documents.

12. The method of claim 1, wherein identifying a digital document comprises:
    identifying a plurality of digital documents; and
    identifying the digital document from among the plurality of identified digital documents.

13. The method of claim 12, wherein the plurality of identified digital documents are ranked according to similar captures of portions of documents.

14. The method of claim 1, further comprising posting text related to the identified digital document to a computer accessible location.

15. A computing system having a processor coupled to a memory containing computer executable instructions for performing functions of:
    obtaining document context data for one or more documents, wherein the document context data includes supplemental information used to identify the document and includes temporal information for one or more previous scans of portions of the one or more documents, the temporal information specifying a time at which each previous scan occurred;
    receiving data specifying a portion of a document captured using a handheld capture device;
    identifying a digital document associated with the document using the document context data including the temporal information and the captured portion of the document;
    identifying, using the captured portion of the document, a location of the captured portion within the digital document; and
    identifying a location-based action to be performed based on the identified location of the captured portion data specifying one or more location-based actions associated with one or more locations within the digital document; and
    performing the identified location-based action.

16. The computing system of claim 15:
    wherein the document context data further comprises data specifying frequencies with which portions located within a plurality of digital documents are captured, and
    wherein identifying the digital document associated with the document using the document context data and the captured portion comprises:
    identifying a plurality of digital documents that include the captured portion;
    ranking the plurality of digital documents based on the frequencies; and
    selecting a digital document having a maximum frequency of the frequencies from among the plurality of digital documents.

17. The computing system of claim 15:
    wherein the document context data further comprises data specifying frequencies with which portions located within a plurality of digital documents are captured, and
    identifying a location of the captured portion within the digital document comprises:
    identifying a plurality of locations within the digital document;
    ranking the plurality of locations based on the frequencies; and
    selecting a location having a maximum frequency of the frequencies from among the plurality of locations.

18. A non-transitory computer readable storage medium having storied therein instructions executable by a computing device to cause the computing device to perform functions of:
    obtaining document context data for one or more documents, wherein the document context data includes supplemental information used to identify the document and includes temporal information for one or more previous scans of portions of the one or more documents, the temporal information specifying a time at which each previous scan occurred;

receiving data specifying a portion of a document captured using a handheld capture device;

identifying a digital document associated with the document using the document context data including the temporal information and the captured portion of the document;

identifying, using the captured portion of the document, a location of the captured portion within the digital document;

identifying a location-based action to be performed based on the identified location of the captured portion and data specifying one or more location-based actions associated with one or more locations within the digital document; and performing the identified location-based action.

* * * * *

UNITED STATES PATENT AND TRADEMARK OFFICE
CERTIFICATE OF CORRECTION

PATENT NO. : 9,811,728 B2
APPLICATION NO. : 13/966236
DATED : November 7, 2017
INVENTOR(S) : King et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*